US008175291B2

(12) United States Patent
Chan et al.

(10) Patent No.: US 8,175,291 B2
(45) Date of Patent: May 8, 2012

(54) SYSTEMS, METHODS, AND APPARATUS FOR MULTI-MICROPHONE BASED SPEECH ENHANCEMENT

(75) Inventors: Kwok-Leung Chan, San Diego, CA (US); Erik Visser, San Diego, CA (US); Hyun Jin Park, San Diego, CA (US); Jeremy Toman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 722 days.

(21) Appl. No.: 12/334,246

(22) Filed: Dec. 12, 2008

(65) Prior Publication Data

US 2009/0164212 A1 Jun. 25, 2009

Related U.S. Application Data

(60) Provisional application No. 61/015,084, filed on Dec. 19, 2007, provisional application No. 61/016,792, filed on Dec. 26, 2007, provisional application No. 61/077,147, filed on Jun. 30, 2008, provisional application No. 61/079,359, filed on Jul. 9, 2008.

(51) Int. Cl.
*H04B 15/00* (2006.01)

(52) U.S. Cl. ............................... 381/94.7; 704/E15.039

(58) Field of Classification Search .............. 381/92–94, 381/94.7; 704/233, E15.039
See application file for complete search history.

(56) References Cited

U.S. PATENT DOCUMENTS 4,649,505 A 3/1987 Zinser, Jr. et al.
4,912,767 A 3/1990 Chang
5,208,786 A 5/1993 Weinstein et al.
5,251,263 A 10/1993 Andrea et al.
5,327,178 A 7/1994 McManigal
5,375,174 A 12/1994 Denenberg
5,383,164 A 1/1995 Sejnowski et al.
5,471,538 A 11/1995 Sasaki et al.
5,675,659 A 10/1997 Torkkola
5,706,402 A 1/1998 Bell
5,770,841 A 6/1998 Moed et al.
5,999,567 A 12/1999 Torkkola
5,999,956 A 12/1999 Deville
6,002,776 A 12/1999 Bhadkamkar et al.
6,061,456 A 5/2000 Andrea et al.
6,108,415 A 8/2000 Andrea
(Continued)

FOREIGN PATENT DOCUMENTS

DE 19849739 5/2000
(Continued)

OTHER PUBLICATIONS

Amari, S. et al. "A New Learning Algorithm for Blind Signal Separation." In: Advances in Neural Information Processing Systems 8 (pp. 757-763). Cambridge: MIT Press 1996.

(Continued)

*Primary Examiner* — Nathan Ha
(74) *Attorney, Agent, or Firm* — Espartaco Diaz Hidalgo

(57) ABSTRACT

Systems, methods, and apparatus for processing an M-channel input signal are described that include outputting a signal produced by a selected one among a plurality of spatial separation filters. Applications to separating an acoustic signal from a noisy environment are described, and configurations that may be implemented on a multi-microphone handheld device are also described.

50 Claims, 49 Drawing Sheets

U.S. PATENT DOCUMENTS

| | | | |
|---|---|---|---|
| 6,130,949 | A | 10/2000 | Aoki et al. |
| 6,167,417 | A | 12/2000 | Parra et al. |
| 6,381,570 | B2 | 4/2002 | Li et al. |
| 6,385,323 | B1 | 5/2002 | Zoels |
| 6,424,960 | B1 | 7/2002 | Lee et al. |
| 6,462,664 | B1 * | 10/2002 | Cuijpers et al. ............ 340/573.1 |
| 6,496,581 | B1 * | 12/2002 | Finn et al. ................ 379/406.01 |
| 6,502,067 | B1 * | 12/2002 | Hegger et al. ................. 704/216 |
| 6,526,148 | B1 | 2/2003 | Jourjine et al. |
| 6,549,630 | B1 | 4/2003 | Bobisuthi |
| 6,594,367 | B1 | 7/2003 | Marash et al. |
| 6,606,506 | B1 | 8/2003 | Jones |
| 7,027,607 | B2 | 4/2006 | Pedersen et al. |
| 7,065,220 | B2 | 6/2006 | Warren et al. |
| 7,076,069 | B2 | 7/2006 | Roeck |
| 7,099,821 | B2 | 8/2006 | Visser et al. |
| 7,113,604 | B2 | 9/2006 | Thompson |
| 7,123,727 | B2 | 10/2006 | Elko et al. |
| 7,155,019 | B2 | 12/2006 | Hou |
| 7,203,323 | B2 | 4/2007 | Tashev |
| 7,295,972 | B2 | 11/2007 | Choi |
| 7,424,119 | B2 | 9/2008 | Reichel |
| 7,471,798 | B2 | 12/2008 | Warren |
| 7,474,755 | B2 | 1/2009 | Niederdrank |
| 7,603,401 | B2 | 10/2009 | Parra et al. |
| 7,941,315 | B2 * | 5/2011 | Matsuo ......................... 704/226 |
| 2001/0037195 | A1 | 11/2001 | Acero et al. |
| 2001/0038699 | A1 | 11/2001 | Hou |
| 2002/0110256 | A1 | 8/2002 | Watson et al. |
| 2002/0136328 | A1 | 9/2002 | Shimizu |
| 2002/0193130 | A1 | 12/2002 | Yang et al. |
| 2003/0055735 | A1 | 3/2003 | Cameron et al. |
| 2003/0179888 | A1 | 9/2003 | Burnett et al. |
| 2004/0039464 | A1 | 2/2004 | Virolainen et al. |
| 2004/0120540 | A1 | 6/2004 | Mullenborn et al. |
| 2004/0136543 | A1 | 7/2004 | White et al. |
| 2004/0161121 | A1 | 8/2004 | Chol et al. |
| 2004/0165735 | A1 | 8/2004 | Opitz |
| 2005/0175190 | A1 | 8/2005 | Tashev et al. |
| 2005/0195988 | A1 | 9/2005 | Tashev et al. |
| 2005/0249359 | A1 | 11/2005 | Roeck |
| 2005/0276423 | A1 | 12/2005 | Aubauer et al. |
| 2006/0032357 | A1 | 2/2006 | Roovers et al. |
| 2006/0053002 | A1 | 3/2006 | Visser et al. |
| 2006/0083389 | A1 | 4/2006 | Oxford et al. |
| 2006/0222184 | A1 | 10/2006 | Buck et al. |
| 2007/0021958 | A1 | 1/2007 | Visser et al. |
| 2007/0053455 | A1 | 3/2007 | Sugiyama |
| 2007/0076900 | A1 | 4/2007 | Kellermann et al. |
| 2007/0088544 | A1 | 4/2007 | Acero et al. |
| 2007/0165879 | A1 | 7/2007 | Deng et al. |
| 2007/0244698 | A1 | 10/2007 | Dugger et al. |
| 2008/0175407 | A1 | 7/2008 | Zhang et al. |
| 2008/0201138 | A1 | 8/2008 | Visser et al. |
| 2008/0260175 | A1 | 10/2008 | Elko |

FOREIGN PATENT DOCUMENTS

| | | | |
|---|---|---|---|
| EP | 1006652 | A2 | 6/2000 |
| EP | 1796085 | | 6/2007 |
| JP | 07131886 | | 5/1995 |
| WO | WO0127874 | | 4/2001 |
| WO | WO2004053839 | | 6/2004 |
| WO | WO2005083706 | | 9/2005 |
| WO | WO2006012578 | | 2/2006 |
| WO | WO2006028587 | | 3/2006 |
| WO | WO2006034499 | | 3/2006 |
| WO | WO2007100330 | | 9/2007 |
| WO | WO2007103037 | | 9/2007 |

OTHER PUBLICATIONS

Amari, S.et al. “Stability Analysis of Learning Algorithms for Blind Source Separation,” Neural Networks Letter, 10(8):1345-1351. 1997.

Araki S et al: “A Robust and Precise Method for Solving the Permutation Problem of Frequency-Domain Blind Source Separation” IEEE Transactions on Speech and Audio Processing, IEEE Service Center, New York, NY, US, vol. 12, No. 5, Sep. 1, 2004, pp. 530-538, XP011116331, ISSN: 1063-6676, DOI: DO1 : 10.1109/TSA. 2004. 832994 * paragraph [II. B] * * paragraphs [ III. A ] , [ III. B ] * * figure 5 *.

Bell, A. et al.: “An Information-Maximization Approach to Blind Separation and Blind Deconvolution,” Howard Hughes Medical Institute, Computational Neurobiology Laboratory, The Salk Institute, La Jolla, CA USA and Department of Biology, University of California, San Diego, La Jolla, CA USA., pp. 1129-1159.

Cardosa, J-F., “Fourth-Order Cumulant Structure Forcing. Application to Blind Array Processing.” Proc. IEEE SP Workshop on SSAP-92, pp. 136-139. 1992.

Cohen, I., et al., “Real-Time TF-GSC in Nonstationary Noise Environments”, Israel Institute of Technology, pp. 1-4, Sep. 2003.

Cohen. I., et al., “Speech Enhancement Based on a Microphone Array and Log-Spectral Amplitude Estimation”, Israel Institute of Technology, pp. 1-3. 2002.

Comon, P.: “Independent Component Analysis, A New Concept?,” Thomson-Sintra, Valbonne Cedex, France, Signal Processing 36 (1994) 287-314, (Aug. 24, 1992).

First Examination Report dated Oct. 23, 2006 from Indian Application No. 1571/CHENP/2005.

Griffiths, L. et al. “An Alternative Approach to Linearly Constrained Adaptive Beamforming.” IEEE Transactions on Antennas and Propagation, vol. AP-30(1):27-34. Jan. 1982.

Herault, J. et al., “Space or time adaptive signal processing by neural network models” Neural Networks for Computing, In J. S. Denker (Ed.). Proc. of the AIP Conference (pp. 206-211) New York: American Institute of Physics. 1986.

Hoshuyama, O. et al., “A robust adaptive beamformer for microphone arrays with a blocking matrix using constrained adaptive filters.” IEEE Transcations on Signal Processing, 47(10):2677-2684. 1999.

Hoshuyama, O., et al., “Robust Adaptive Beamformer with a Blocking Matrix Using Coefficient-Constrained Adaptive Filters”, IEICE Trans, Fundamentals, vol. E-82-A, No. 4, Apr. 1999, pp. 640-647.

Hua, T.P. et al., “A new self calibration-technique for adaptive microphne arrays,” International workshop on Acoustic Echo and Noise Control Eindhoven, pp. 237-240, 2009.

Hyvarinen, A. et al. “A fast fixed-point algorithm for independent component analysis” Neural Computation, 9:1483-1492. 1997.

Hyvarinen, A.. “Fast and robust fixed-point algorithms for independent component analysis.” IEEE Trans. On Neural Networks, 10(3):626-634. 1999.

International Search Report/Written Opinion—PCT/US08/087541—International Search Authority EPO—Jun. 4, 2009.

Jutten, C. et al.: “Blind Separation of Sources, Part I: An Adaptive Algorithm based on Neuromimetic Architecture,” Elsevier Science Publishers B.V., Signal Processing 24 (1991) 1-10.

Lambert, R. H. “Multichannel blind deconvolution: FIR matrix algebra and seperation of multipath mixtures.” Doctoral Dissertation, University of Southern California. May 1996.

Lee, Te-Won et al., “A contextual blind separation of delayed and convolved sources” Proceedings of the 1997 IEEE International Conference on Acoutsics, Speech, and Signal Processing (ICASSP’ 97), 2:1199-1202. 1997.

Lee, Te-Won., et al., “A Unifying Information-Theoretic Framework for Independent Component Analysis” Computers and Mathematics with Applications 39 (2000) pp. 1-21.

Lee, Te-Won et. al.: “Combining Time-Delayed Decorrelation and ICA: Towards Solving the Cocktail Party Problem,” p. 1249-1252, (1998).

Lee. T.-W., et al., “Independent Component Analysis for Mixed Sub-Gaussian and Super-Gaussian Sources.” 4th Joint Symposium Neural Computation Proceedings, 1997, pp. 132-139.

Molgedey, L. et al., “Separation of a mixture of independent signals using time delayed correlations,” Physical Review Letters, The American Physical Society, 72(23):3634-3637. 1994.

Mukai, R., et al., “Blind Source Separation and DOA Estimation Using Small 3-D Microphone Array,” in Proc. of HSCMA 2005, pp. d-9-10, Piscataway, Mar. 2005.

Mukai, R., et al., “Frequency Domain Blind Source Separation of Many Speech Signals Using Near-field and Far-field Models,”

EURASIP Journal on Applied Signal Processing, vol. 2006, Article ID 83683, 13 pages, 2006. doi:10.1155/ASP/2006/83683.
Murata, N. et. al.:"An On-line Algorithm for Blind Source Separation on Speech Signals." Proc. of 1998 International Symposium on Nonlinear Theory and its Application (NOLTA98), pp. 923-926, LeRegent, Crans-Montana, Switzerland 1998.
Parra, L., et al.,. "An adaptive beamforming perspective on convolutive blind source separation" Chapter IV in Noise Reduction in Speech Applications, Ed. G. Davis, CRC Press: Princeton, NJ (2002).
Parra, L. et. al.: "Convolutive Blind Separation of Non-Stationary Sources," IEEE Transactions on Speech and Audio Processing, vol. 8(3), May 2000, p. 320-327.
Platt, et al., "Networks for the separation of sources that are superimposed and delayed." In J. Moody, S. Hanson, R. Lippmann (Eds.), Advances in Neural Information Processing 4 (pp. 730-737). San Francisco: Morgan-Kaufmann. 1992.
Serviere, Ch., et al., "Permutation Correction in the Frequency Domain in Blind Separation of Speech Mixtures." EURASIP Journal on Applied Signal Processing, vol. 2006. article ID 75206, pp. 1-16, DOI: 10.1155/ASP/75206.
Supplementary European Search Report—EP07751705—Search Authority—Munich—Mar. 16, 2011.
Taesu, K., et al., "Independent Vector Analysis: An Extension of ICA to Multivariate Components" Independent Component Analysis and Blind Signal Separation Lecture Notes in Computer Sciene; LNCS 3889, Springer-Verlag Berlin Heidelberg, Jan. 1, 2006, pp. 165-172, XP019028810.
Taesu K I M et al: "Independent Vector Analysis: An Extension of ICA to Multivariate Components", Mar. 5, 2006, Independent Component Analysis and Blind Signal Separation Lecture Notes I N Computer Science;;LNCS, Springer, Berlin, DE, pp. 165-172, XP019028810, ISBN: 978-3-540-32630-4 * paragraph C02.21 *.
Taesu Kim, et al., 'Independent Vector Analysis: Definition and Algorithms,' ACSSC'06, pp. 1393-1396, Oct. 2006.
Tatsuma, Junji et al., "A Study on Replacement Problem in Blind Signal Separation." Collection of Research Papers Reported in the General Meeting of the Institute of Electronics, Information and Communication Engineers, Japan, The Institute of Electronics, Information and Communication Engineers (IEICE), Mar. 8, 2004.
Tong, L. et al., "A Necessary and Sufficient Condition for the Blind Identification of Memoryless Systems." Circuits and Systems, IEEE International Symposium, 1:1-4. 1991.
Torkkola, K.: "Blind Separation of Convolved Sources Based on Information Maximization," Mortorola, Inc., Phoenix Corporate Research Laboratories, 2100 E. Elliot Rd. MD EL508, Tempe AZ 85284, USA, Proceedings of the International Joint Conference on Neura; p. 423-432.
Torkkola, Kari. "Blind deconvolution, information maximization and recursive filters." IEEE International Conference on Acoustics, Speech, and Signal Processing (ICASSP'97), 4:3301-3304. 1997.
Van Compernolle, D. et al., "Signal Separation in a Symmetric Adaptive Noise Canceler by Output Decorrelation." Acoustics, Speech and Signal Processing, 1992, ICASSP-92., 1992 IEEE International Conference, 4:221-224.
Visser, E., et al., "A Spatio-temporal speech enhancement for robust speech recognition in noisy environments." University of California, San Diego. Institute for Neural Computation. White Paper. pp. 1-4, doi:10.1016/S0167-6393(03)00010-4 (Oct. 2003).
Visser, E. et al. "Speech enhancement using blind source separation and two-channel energy based speaker detection" Acoustics, Speech, and Signal Processing, 2003. Proceedings ICASSP'03 2003 IEEE International Conference on, vol. 1, Apr. 6-10, 2003, pp. I.
Visser, E. et. al.: "Blind Source Separation in Mobile Environments Using a Priori Knowledge" Acoustics, Speech, and Signal Processing, 2004 Proceedings. (ICASSP '04).
Yellin, D. et al. "Multichannel signal separation: Methods and analysis." IEEE Transactions on Signal Processing. 44(1):106-118, Jan. 1996.
Yermeche, Z., et al., A Constrained Subband Beamforming Algorithm for Speech Enhancement. Blekinge Institute of Technology. Department of Signal Processing, Dissertaion ( 2004). pp. 1-135.
Yermeche. Zohra. "Subband Beamforming for Speech Enhancement in Hands-Free Communication." Blekinge Institute of Technology, Department of Signal Processing, Research Report (Dec. 2004). pp. 1-74.

* cited by examiner

SYSTEMS, METHODS, AND APPARATUS FOR MULTI-MICROPHONE BASED SPEECH ENHANCEMENT

CLAIM OF PRIORITY UNDER 35 U.S.C. §119

The present Application for patent claims priority to Provisional Application No. 61/015,084, entitled "SYSTEM AND METHOD FOR MULTI-MICROPHONE BASED SPEECH ENHANCEMENT IN HANDSETS," filed Dec. 19, 2007; Provisional Application No. 61/016,792, entitled "SYSTEM AND METHOD FOR MULTI-MICROPHONE BASED SPEECH ENHANCEMENT IN HANDSETS," filed Dec. 26, 2007; Provisional Application No. 61/077,147, entitled "SYSTEM AND METHOD FOR MULTI-MICROPHONE BASED SPEECH ENHANCEMENT IN HANDSETS," filed Jun. 30, 2008; and Provisional Application No. 61/079,359, entitled "SYSTEMS, METHODS, AND APPARATUS FOR MULTI-MICROPHONE BASED SPEECH ENHANCEMENT," filed Jul. 9, 2008, which applications are assigned to the assignee hereof.

BACKGROUND

1. Field

This disclosure relates to speech processing.

2. Background

An information signal may be captured in an environment that is unavoidably noisy. Consequently, it may be desirable to distinguish an information signal from among superpositions and linear combinations of several source signals, including a signal from a desired information source and signals from one or more interference sources. Such a problem may arise in various acoustic applications for voice communications (e.g., telephony).

One approach to separating a signal from such a mixture is to formulate an unmixing matrix that approximates an inverse of the mixing environment. However, realistic capturing environments often include effects such as time delays, multipaths, reflection, phase differences, echoes, and/or reverberation. Such effects produce convolutive mixtures of source signals that may cause problems with traditional linear modeling methods and may also be frequency-dependent. It is desirable to develop signal processing methods for separating one or more desired signals from such mixtures.

A person may desire to communicate with another person using a voice communication channel. The channel may be provided, for example, by a mobile wireless handset or headset, a walkie-talkie, a two-way radio, a car-kit or other communication device. When the person speaks, microphones on the communication device receive the sound of the person's voice and convert it to an electronic signal. The microphones may also receive sound signals from various noise sources, and therefore the electronic signal may also include a noise component. Since the microphones may be located at some distance from the person's mouth, and the environment may have many uncontrollable noise sources, the noise component may be a substantial component of the signal. Such substantial noise may cause an unsatisfactory communication experience and/or may cause the communication device to operate in an inefficient manner.

An acoustic environment is often noisy, making it difficult to reliably detect and react to a desired informational signal. In one particular example, a speech signal is generated in a noisy environment, and speech processing methods are used to separate the speech signal from the environmental noise. Such speech signal processing is important in many areas of everyday communication, since noise is almost always present in real-world conditions. Noise may be defined as the combination of all signals interfering or degrading the speech signal of interest. The real world abounds from multiple noise sources, including single point noise sources, which often transgress into multiple sounds resulting in reverberation. Unless the desired speech signal is separated and isolated from background noise, it may be difficult to make reliable and efficient use of it. Background noise may include numerous noise signals generated by the general environment, and signals generated by background conversations of other people, as well as reflections and reverberation generated from each of the signals. For applications in which communication occurs in noisy environments, it may be desirable to separate the desired speech signals from background noise.

Existing methods for separating desired sound signals from background noise signals include simple filtering processes. While such methods may be simple and fast enough for real-time processing of sound signals, they are not easily adaptable to different sound environments and can result in substantial degradation of a desired speech signal. For example, the process may remove components according to a set of predetermined assumptions of noise characteristics that are over-inclusive, such that portions of a desired speech signal are classified as noise and removed. Alternatively, the process may remove components according to a set of predetermined assumptions of noise characteristics that are under-inclusive, such that portions of background noise such as music or conversation are classified as the desired signal and retained in the filtered output speech signal.

Handsets like PDAs and cellphones are rapidly emerging as the mobile speech communication device of choice, serving as platforms for mobile access to cellular and internet networks. More and more functions that were previously performed on desktop computers, laptop computers, and office phones in quiet office or home environments are being performed in everyday situations like the car, the street, or a café. This trend means that a substantial amount of voice communication is taking place in environments where users are surrounded by other people, with the kind of noise content that is typically encountered where people tend to gather. The signature of this kind of noise (including, e.g., competing talkers, music, babble, airport noise) is typically nonstationary and close to the user's own frequency signature, and therefore such noise may be hard to model using traditional single microphone or fixed beamforming type methods. Such noise also tends to distract or annoy users in phone conversations. Moreover many standard automated business transactions (e.g., account balance or stock quote checks) employ voice recognition based data inquiry, and the accuracy of these systems may be significantly impeded by interfering noise. Therefore multiple microphone based advanced signal processing may be desirable e.g. to support handset use in noisy environments.

SUMMARY

According to a general configuration, a method of processing an M-channel input signal that includes a speech component and a noise component, M being an integer greater than one, to produce a spatially filtered output signal includes applying a first spatial processing filter to the input signal and applying a second spatial processing filter to the input signal. This method includes, at a first time, determining that the first spatial processing filter begins to separate the speech and noise components better than the second spatial processing filter, and in response to said determining at a first time, producing a signal that is based on a first spatially processed signal as the output signal. This method includes, at a second time subsequent to the first time, determining that the second spatial processing filter begins to separate the speech and noise components better than the first spatial processing filter, and in response to said determining at a second time, producing a signal that is based on a second spatially processed signal as the output signal. In this method, the first and second spatially processed signals are based on the input signal.

Examples of such a method are also described. In one such example, a method of processing an M-channel input signal that includes a speech component and a noise component, M being an integer greater than one, to produce a spatially filtered output signal includes applying a first spatial processing filter to the input signal to produce a first spatially processed signal and applying a second spatial processing filter to the input signal to produce a second spatially processed signal. This method includes, at a first time, determining that the first spatial processing filter begins to separate the speech and noise components better than the second spatial processing filter, and in response to said determining at a first time, producing the first spatially processed signal as the output signal. This method includes, at a second time subsequent to the first time, determining that the second spatial processing filter begins to separate the speech and noise components better than the first spatial processing filter, and in response to said determining at a second time, producing the second spatially processed signal as the output signal.

According to another general configuration, an apparatus for processing an M-channel input signal that includes a speech component and a noise component, M being an integer greater than one, to produce a spatially filtered output signal includes means for performing a first spatial processing operation on the input signal and means for performing a second spatial processing operation on the input signal. The apparatus includes means for determining, at a first time, that the means for performing a first spatial processing operation begins to separate the speech and noise components better than the means for performing a second spatial processing operation, and means for producing, in response to an indication from said means for determining at a first time, a signal that is based on a first spatially processed signal as the output signal. The apparatus includes means for determining, at a second time subsequent to the first time, that the means for performing a second spatial processing operation begins to separate the speech and noise components better than the means for performing a first spatial processing operation, and means for producing, in response to an indication from said means for determining at a second time, a signal that is based on a second spatially processed signal as the output signal. In this apparatus, the first and second spatially processed signals are based on the input signal.

According to another general configuration, an apparatus for processing an M-channel input signal that includes a speech component and a noise component, M being an integer greater than one, to produce a spatially filtered output signal includes a first spatial processing filter configured to filter the input signal and a second spatial processing filter configured to filter the input signal. The apparatus includes a state estimator configured to indicate, at a first time, that the first spatial processing filter begins to separate the speech and noise components better than the second spatial processing filter. The apparatus includes a transition control module configured to produce, in response to the indication at a first time, a signal that is based on a first spatially processed signal as the output signal. In this apparatus, the state estimator is configured to indicate, at a second time subsequent to the first time, that the second spatial processing filter begins to separate the speech and noise components better than the first spatial processing filter, and the transition control module is configured to produce, in response to the indication at a second time, a signal that is based on a second spatially processed signal as the output signal. In this apparatus, the first and second spatially processed signals are based on the input signal.

According to another general configuration, a computer-readable medium comprising instructions which when executed by a processor cause the processor to perform a method of processing an M-channel input signal that includes a speech component and a noise component, M being an integer greater than one, to produce a spatially filtered output signal, includes instructions which when executed by a processor cause the processor to perform a first spatial processing operation on the input signal, and instructions which when executed by a processor cause the processor to perform a second spatial processing operation on the input signal. The medium includes instructions which when executed by a processor cause the processor to indicate, at a first time, that the first spatial processing operation begins to separate the speech and noise components better than the second spatial processing operation, and instructions which when executed by a processor cause the processor to produce, in response to said indication at a first time, a signal that is based on a first spatially processed signal as the output signal. The medium includes instructions which when executed by a processor cause the processor to indicate, at a second time subsequent to the first time, that the second spatial processing operation begins to separate the speech and noise components better than the first spatial processing operation, and instructions which when executed by a processor cause the processor to produce, in response to said indication at a second time, a signal that is based on a second spatially processed signal as the output signal. In this example, the first and second spatially processed signals are based on the input signal.

DETAILED DESCRIPTION

Figure 1A:
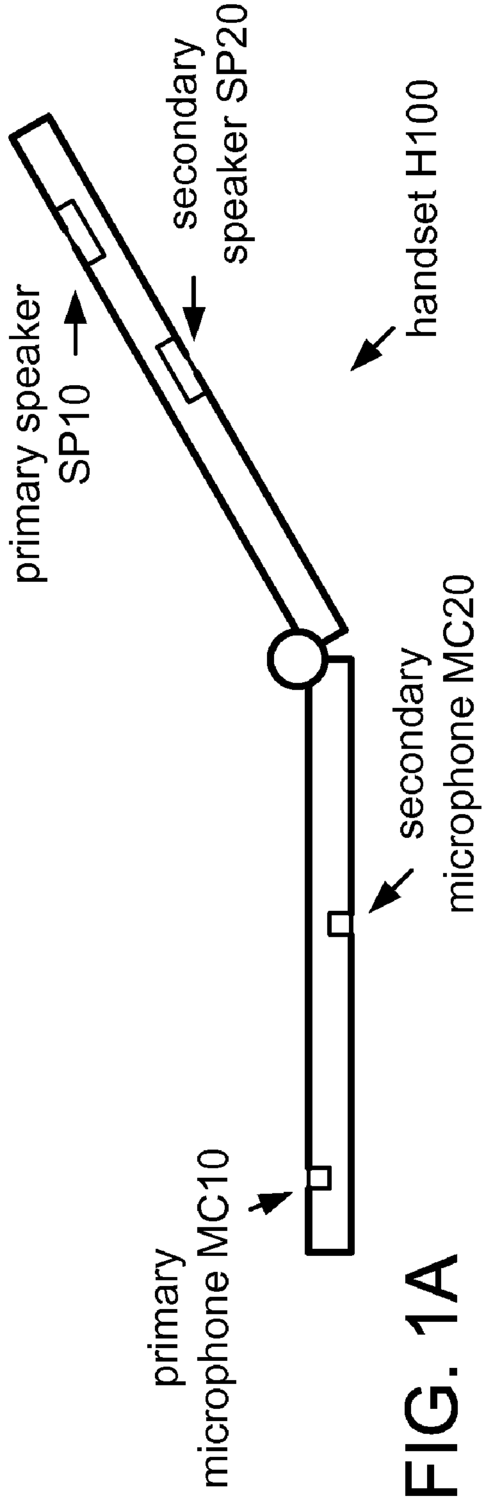
FIG. 1A illustrates an operating configuration of a handset H100 that includes an implementation of apparatus A100.

The present disclosure relates to systems, methods, and apparatus for separating an acoustic signal from a noisy environment. Such configurations may include separating an acoustic signal from a mixture of acoustic signals. The separating operation may be performed by using a fixed filtering stage (i.e., a processing stage having filters configured with fixed coefficient values) to isolate a desired component from within an input mixture of acoustic signals. Configurations that may be implemented on a multi-microphone handheld communications device are also described. Such a configuration may be suitable to address noise environments encountered by the communications device that may comprise interfering sources, acoustic echo, and/or spatially distributed background noise.

The present disclosure also describes systems, methods, and apparatus for generating a set of filter coefficient values (or multiple sets of filter coefficient values) by using one or more blind-source separation (BSS), beamforming, and/or combined BSS/beamforming methods to process training data that is recorded using an array of microphones of a communications device. The training data may be based on a variety of user and noise source positions with respect to the array as well as acoustic echo (e.g., from one or more loudspeakers of the communications device). The array of microphones, or another array of microphones that has the same configuration, may then be used to obtain the input mixture of acoustic signals to be separated as mentioned above.

The present disclosure also describes systems, methods, and apparatus in which the set or sets of generated filter coefficient values are provided to a fixed filtering stage (or "filter bank"). Such a configuration may include a switching operation that selects among the sets of generated filter coefficient values within the fixed filtering stage (and possibly among other parameter sets for subsequent processing stages) based on a currently identified orientation of a communications device with respect to a user.

The present disclosure also describes systems, methods, and apparatus in which a spatially processed (or "separated") signal based on the output of a fixed filtering stage as described above is filtered using an adaptive (or partially adaptive) BSS, beamforming, or combined BSS/beamforming filtering stage to produce another separated signal. Each of these separated signals may include more than one output channel, such that at least one of the output channels contains a desired signal with distributed background noise and at least one other output channel contains interfering source signals and distributed background noise. The present disclosure also describes systems, methods, and apparatus which include a post processing stage (e.g., a noise reduction filter) that reduces noise in the output channel carrying the desired signal, based on a noise reference provided by another output channel.

The present disclosure also describes configurations that may be implemented to include tuning of parameters, selection of initial conditions and filter sets, echo cancellation, and/or transition handling between sets of fixed filter coefficient values for one or more separation or noise reduction stages by the switching operation. Tuning of system parameters may depend on the nature and settings of a baseband chip or chipset, and/or on network effects, to optimize overall noise reduction and echo cancellation performance.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, and/or selecting from a set of values. Unless expressly limited by its context, the term "obtaining" is used to indicate any of its ordinary meanings, such as calculating, deriving, receiving (e.g., from an external device), and/or retrieving (e.g., from an array of storage elements). Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). Similarly, the term "in response to" is used to indicate any of its ordinary meanings, including "in response to at least."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Any incorporation by reference of a portion of a document shall also be understood to incorporate definitions of terms or variables that are referenced within the portion, where such definitions appear elsewhere in the document, as well as any figures referenced in the incorporated portion.

It may be desirable to produce a device for portable voice communications that has two or more microphones. The signals captured by the multiple microphones may be used to support spatial processing operations, which in turn may be used to provide increased perceptual quality, such as greater noise rejection. Examples of such a device include a telephone handset (e.g., a cellular telephone handset) and a wired or wireless headset (e.g., a Bluetooth headset).

FIG. 1A shows a two-microphone handset H100 (e.g., a clamshell-type cellular telephone handset) in a first operating configuration. Handset H100 includes a primary microphone MC10 and a secondary microphone MC20. In this example, handset H100 also includes a primary speaker SP10 and a secondary speaker SP20.

Figure 2:
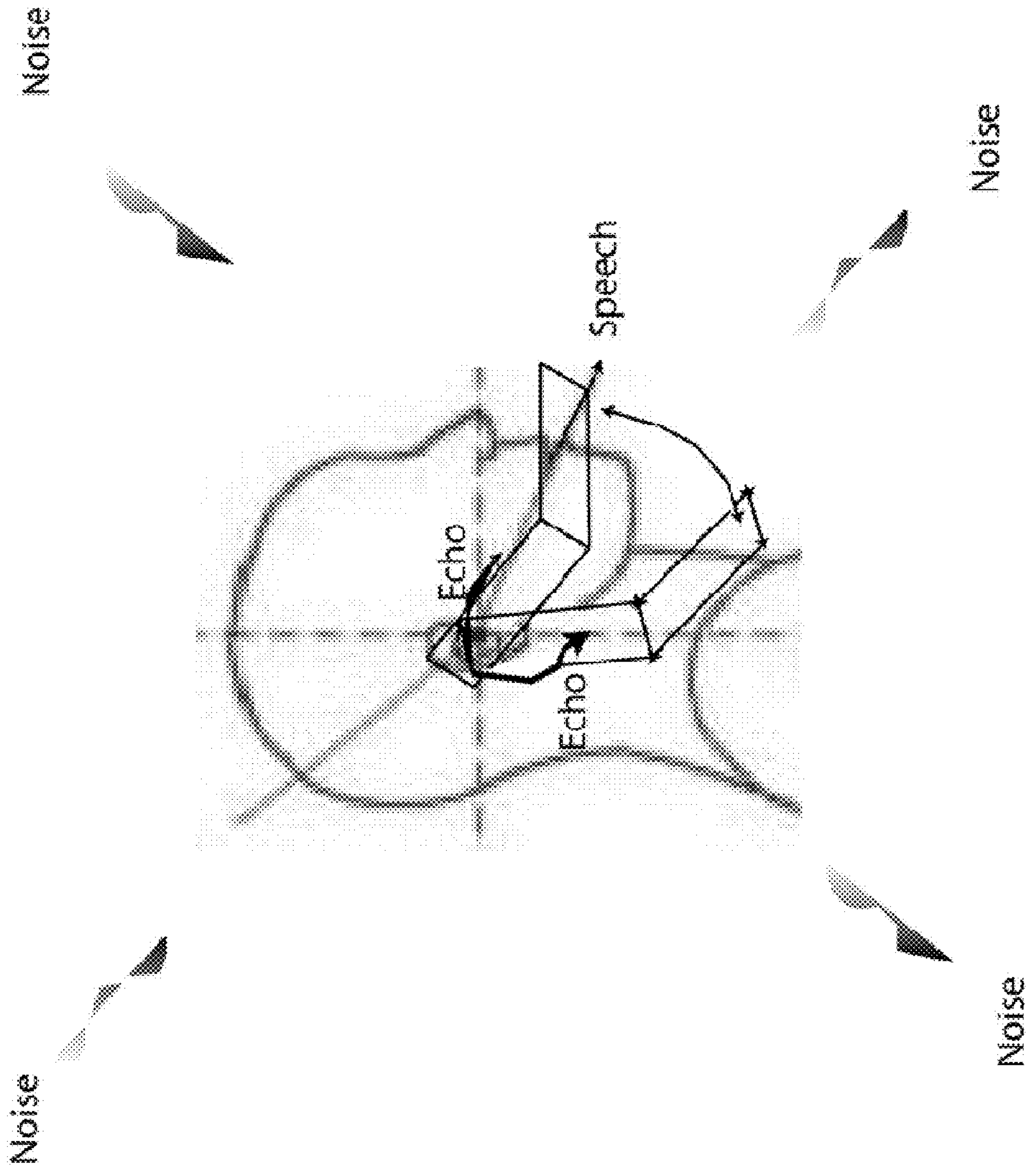
FIG. 2 shows a range of possible orientations of handset H100.
Figure 3B:
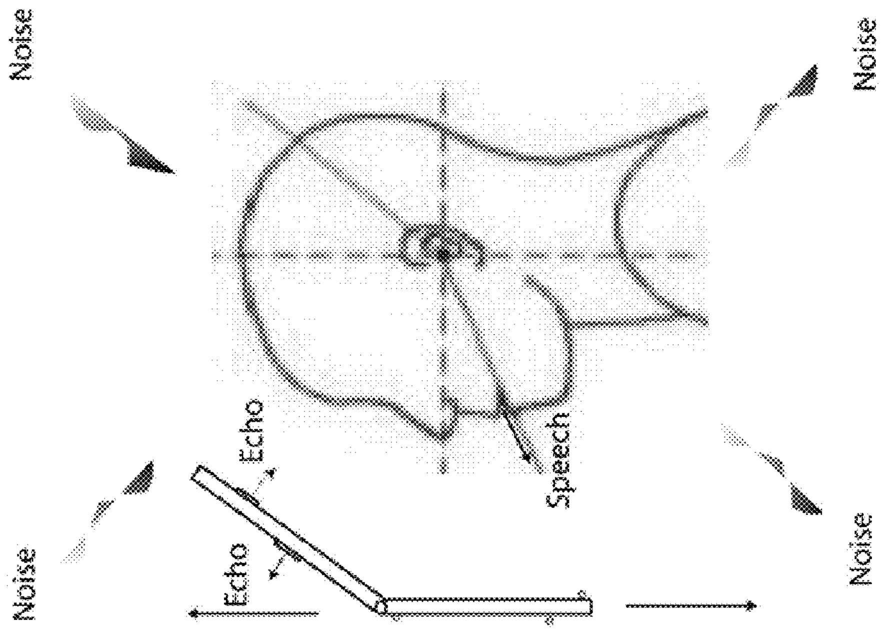
FIGS. 3A and 3B illustrate two different operating orientations for the operating configuration of handset H100 as shown in FIG. 1A.
Figure 3A:
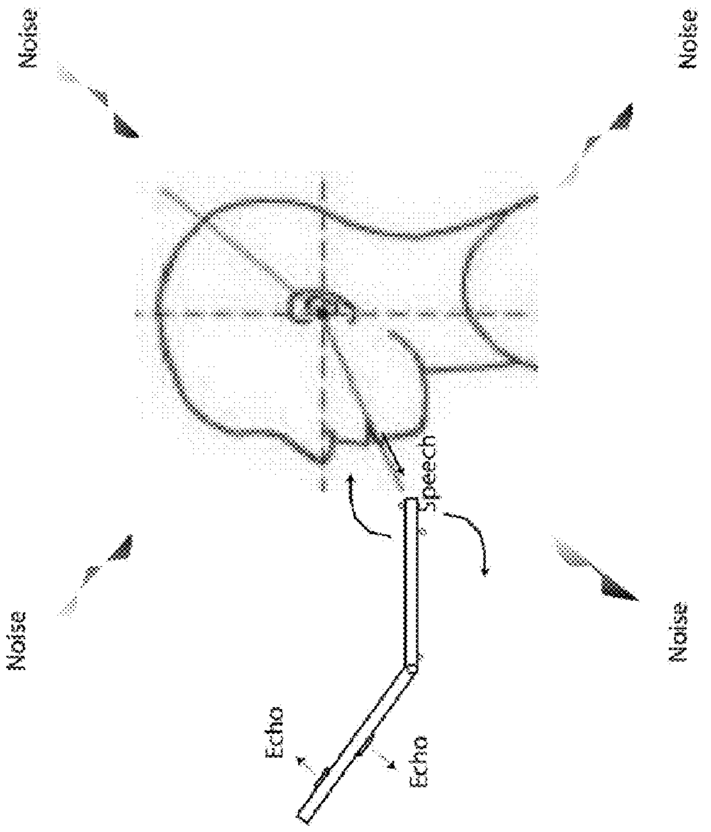

When handset H100 is in the first operating configuration, primary speaker SP10 is active and secondary speaker SP20 may be disabled or otherwise muted. It may be desirable for primary microphone MC10 and secondary microphone MC20 to both remain active in this configuration to support spatial processing techniques for speech enhancement and/or noise reduction. FIG. 2 shows two within a range of possible orientations for this operating configuration. In this range of orientations, handset H100 is held to the user's head such that primary speaker SP10 is close to the user's ear and primary microphone MC10 is near the user's mouth. As shown in FIG. 2, the distance between primary microphone MC10 and the user's mouth may vary. FIG. 2 also illustrates possible interfering sound signals such as echo, which may be produced by primary speaker SP10 in response to a far-end signal, and noise, which may be directional and/or diffuse. FIGS. 3A and 3B show two other possible orientations in which the user may use this operating configuration of handset H100 (e.g., in a speakerphone or push-to-talk mode). When a speakerphone or push-to-talk mode is active in such an operating configuration of handset H100, it may be desirable for secondary speaker SP20 to be active and possibly for primary speaker SP10 to be disabled or otherwise muted.

Figure 1B:
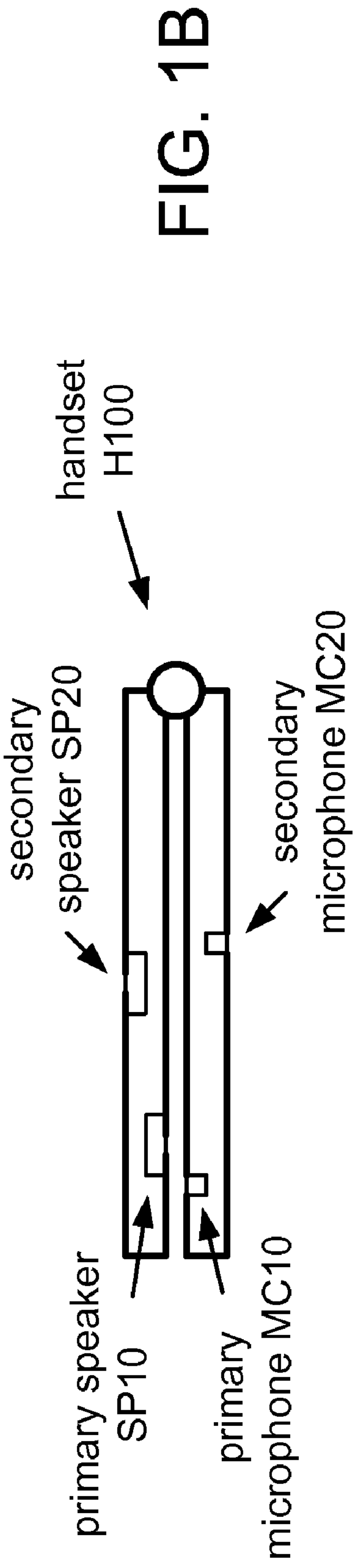
FIG. 1B illustrates another operating configuration of handset H100.
Figure 4B:
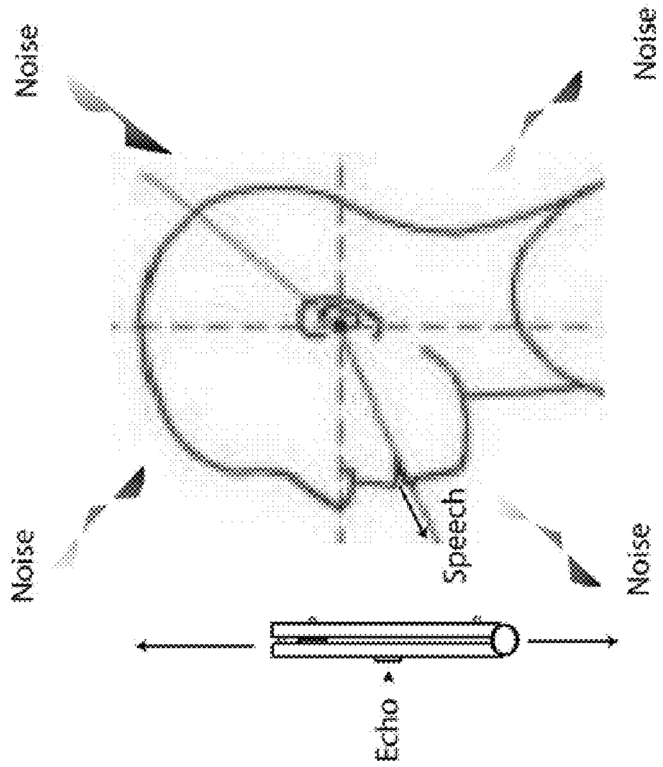
FIGS. 4A and 4B illustrate two different operating orientations for the operating configuration of handset H100 as shown in FIG. 1B.
Figure 4A:
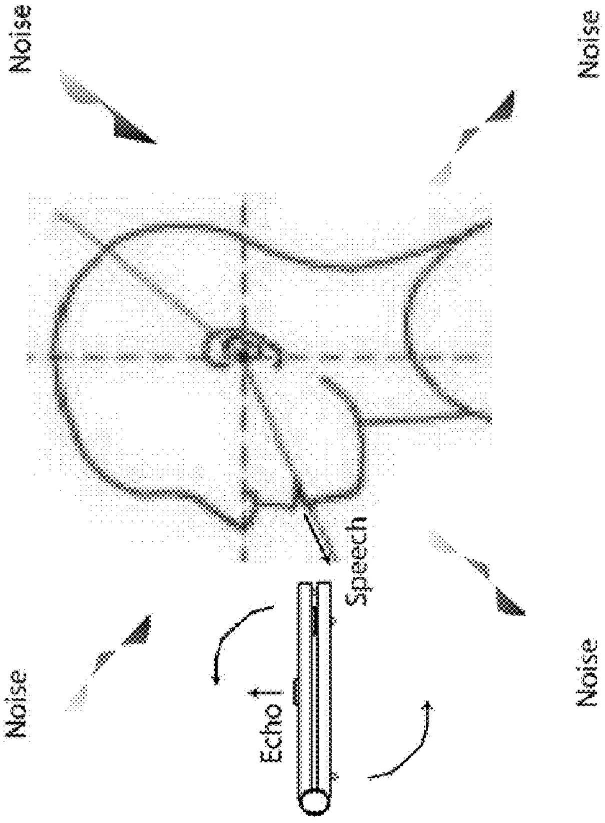

FIG. 1B shows a second operating configuration for handset H100. In this configuration, primary microphone MC10 is occluded, secondary speaker SP20 is active, and primary speaker SP10 may be disabled or otherwise muted. Again, it may be desirable for both of primary microphone MC10 and secondary microphone MC20 to remain active in this configuration (e.g., to support spatial processing techniques). FIGS. 4A and 4B show two different possible operating orientations in which a user may use this operating configuration of handset H100. Handset H100 may include one or more switches whose state (or states) indicate the current operating configuration of the device.

As shown in the above figures, a cellular telephone handset may support a variety of different possible positional uses, each associated with a different spatial relation between the device's microphones and the user's mouth. For example, it may be desirable for handset H100 to support features such as a full-duplex speakerphone mode and/or a half-duplex push-to-talk (PTT) mode, which modes may be expected to involve a wider range of positional changes than a conventional telephone operating mode as shown in FIG. 2. The problem of adapting a spatial processing filter in response to these positional changes may be too complex to obtain filter convergence in real time. Moreover, the problem of adequately separating speech and noise signals that may arrive from several different directions over time may be too complex for a single spatial processing filter to solve. It may be desirable for such a handset to include a filter bank having more than one spatial processing filter. In such case, it may be desirable for the handset to select a spatial processing filter from this bank according to the current orientation of the device relative to the desired sound source (e.g., the user's mouth).

Figure 5:
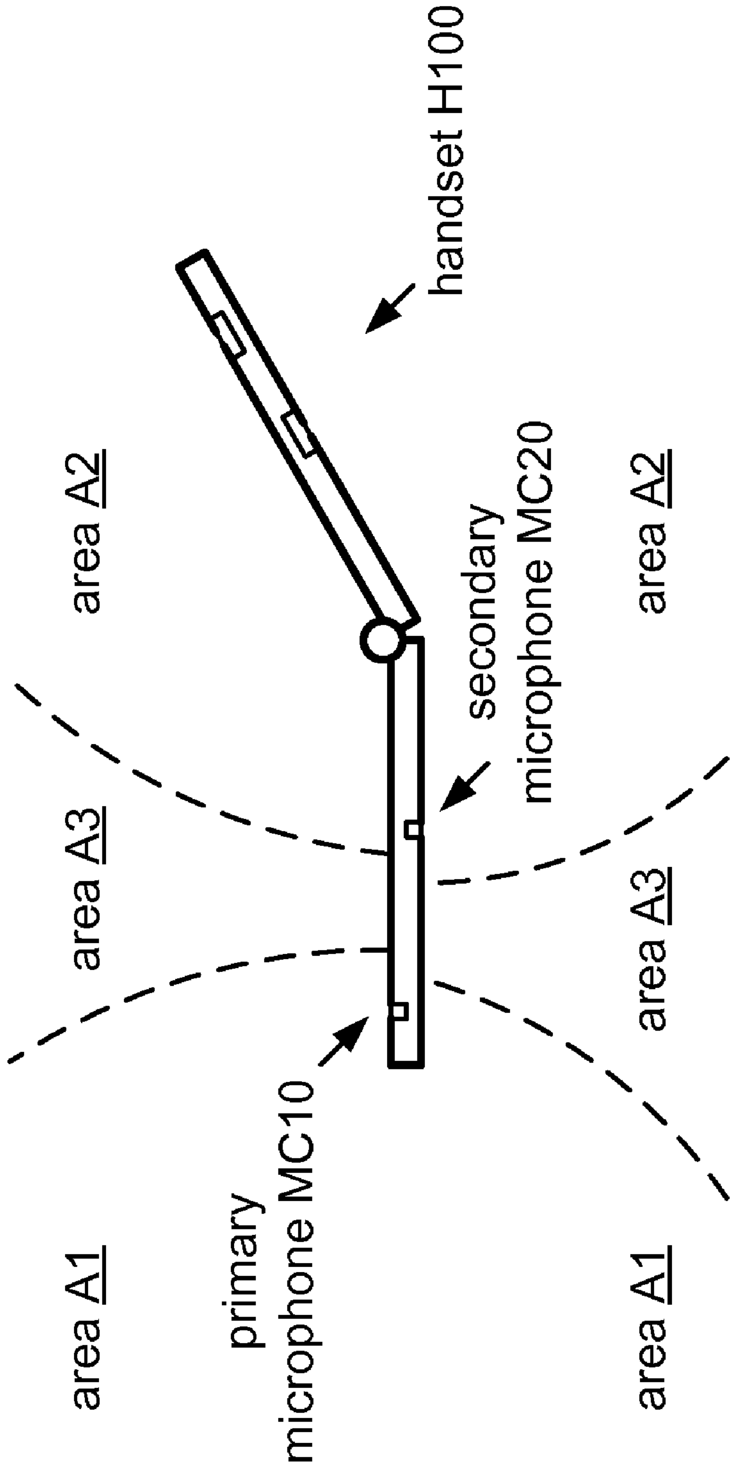
FIG. 5 illustrates areas corresponding to three different orientation states of handset H100.

FIG. 5 illustrates areas that correspond to three different orientation states of handset H100 with respect to a desired sound source (e.g., the user's mouth). When the handset is oriented with respect to the desired source such that the desired sound (e.g., the user's voice) arrives from a direction in area A1, it may be desired for the handset to use a filter that is directional to area A1 and tends to attenuate sounds coming from other directions. Likewise, when the handset is oriented with respect to the desired source such that the desired sound arrives from a direction in area A2, it may be desired for the handset to use a different filter that is directional to area A2 and tends to attenuate sounds coming from other directions. When the handset is oriented with respect to the desired source such that the desired sound arrives from a direction in area A3, it may be desired for the handset to use neither of the first two filters. For example, it may be desirable in such case for the handset to use a third filter. Alternatively, it may be desirable in such case for the handset to enter a single-channel mode, such that only one microphone is active (e.g., primary microphone MC10) or such that the microphones currently active are mixed down to a single channel, and possibly to suspend spatial processing operations.

Figure 6A:
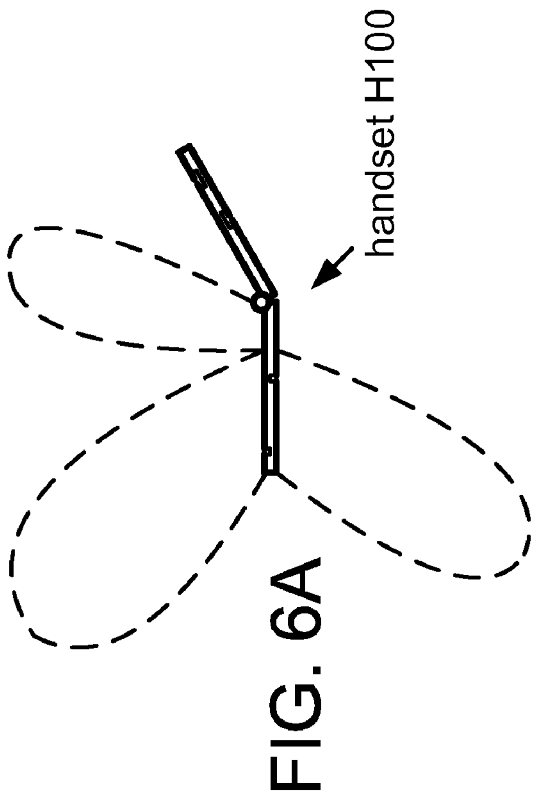
FIGS. 6A-C show additional examples of source origin areas for handset H100.
Figure 6B:
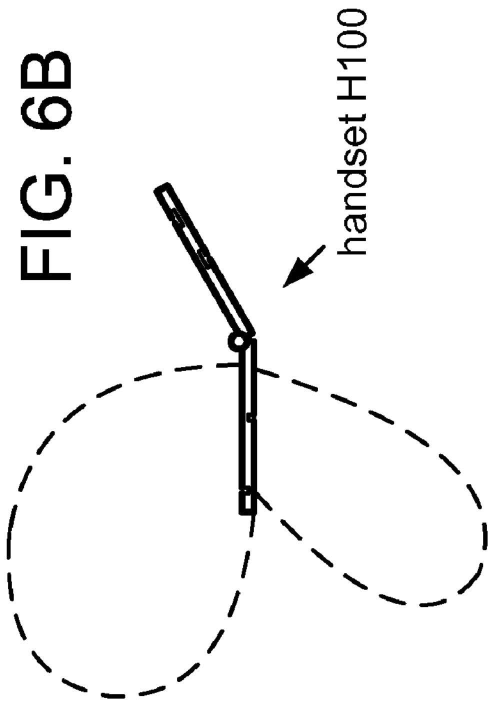
Figure 6C:
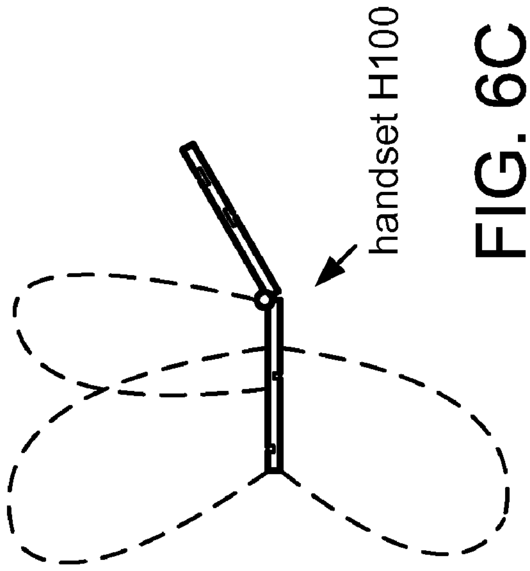

It is noted that the area boundaries shown in FIG. 5 are for visual illustrative purposes only, and that they do not purport to show the actual boundaries between areas associated with the various orientation states. FIGS. 6A-C show three more examples of source origin areas for which one spatial separation filter may be expected to perform better than another. These three figures illustrate that two or more of the filters may perform equally well for a source which is beyond some distance from the handset (such an orientation is also called a "far-field scenario"). This distance may depend largely on the distance between the microphones of the device (which is typically 1.5 to 4.5 centimeters for a handset and may be even less for a headset). FIG. 6C shows an example in which two areas overlap, such that the two corresponding filters may be expected to perform equally well for a desired source located in the overlap region.

Figure 7A:
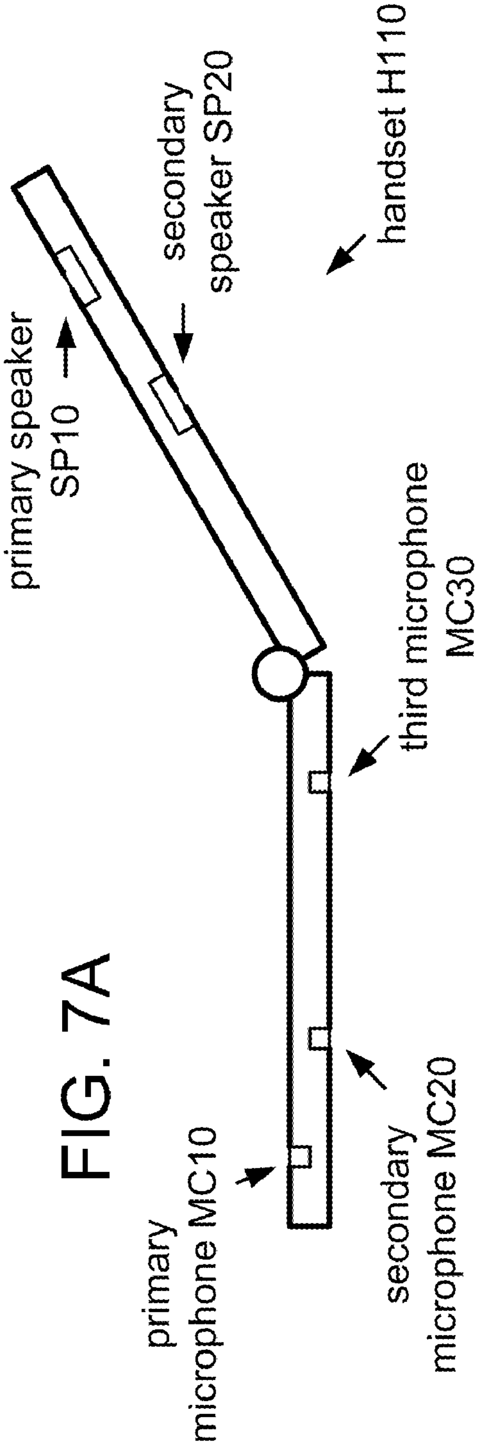
FIG. 7A illustrates an implementation H110 of handset H100.
Figure 7B:
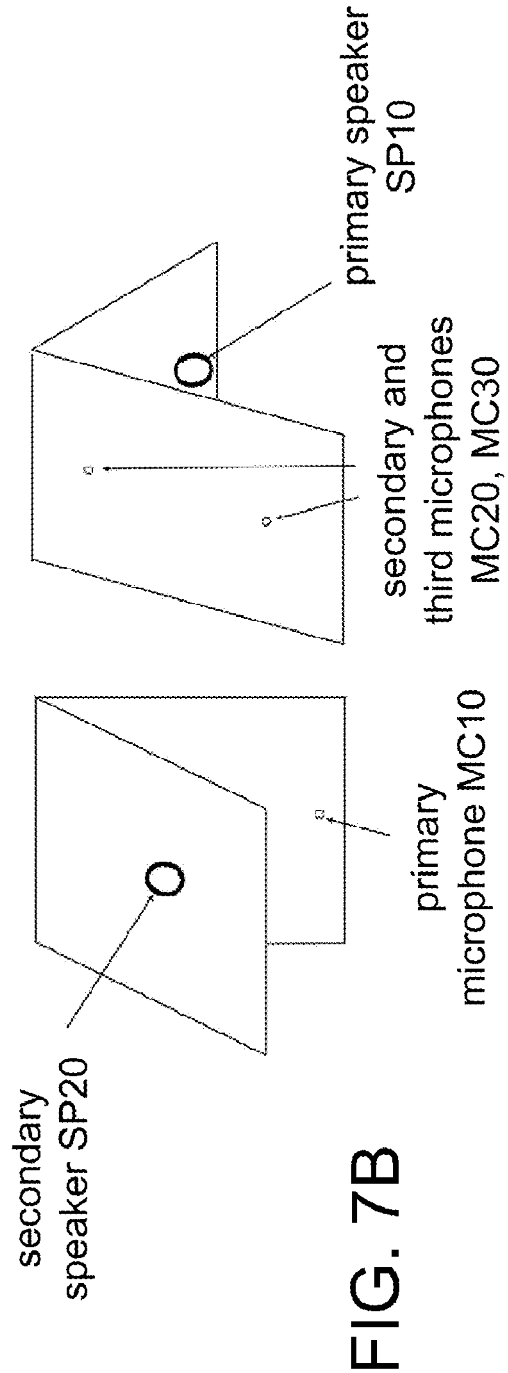
FIG. 7B shows two additional views of handset H110.

Each of the microphones of a communications device (e.g., handset H100) may have a response that is omnidirectional, bidirectional, or unidirectional (e.g., cardioid). The various types of microphones that may be used include piezoelectric microphones, dynamic microphones, and electret microphones. Such a device may also be implemented to have more than two microphones. For example, FIG. 7A shows an implementation H110 of handset H100 that includes a third microphone MC30. FIG. 7B shows two other views of handset H10 that show a placement of the various transducers along an axis of the device.

Figure 8:
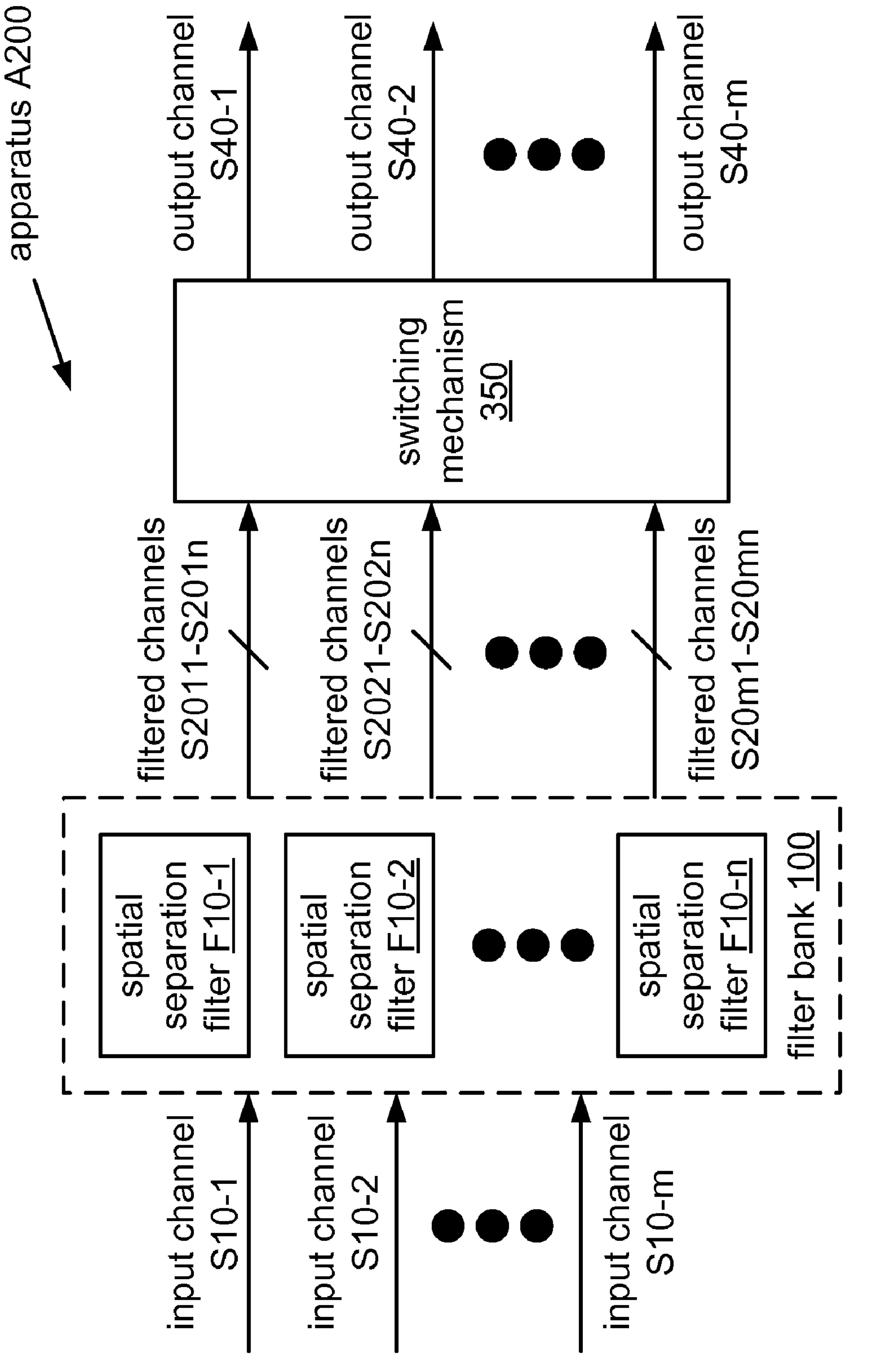
FIG. 8 shows a block diagram of an apparatus A200 according to a general configuration.

FIG. 8 shows a block diagram of an apparatus A200 according to a general configuration that may be implemented within a communications device as disclosed herein, such as handset H100 or H110. Apparatus A200 includes a filter bank 100 that is configured to receive an M-channel input signal S10, where M is an integer greater than one and each of the M channels is based on the output of a corresponding one of M microphones (e.g., the microphones of handset H100 or H110). The microphone signals are typically sampled, may be pre-processed (e.g., filtered for echo cancellation, noise reduction, spectrum shaping, etc.), and may even be pre-separated (e.g., by another spatial separation filter or adaptive filter as described herein). For acoustic applications such as speech, typical sampling rates range from 8 kHz to 16 kHz.

Filter bank 100 includes n spatial separation filters F10-1 to F10-*n* (where n is an integer greater than one), each of which is configured to filter the M-channel input signal S40 to produce a corresponding spatially processed M-channel signal. Each of the spatial separation filters F10-1 to F10-*n* is configured to separate one or more directional desired sound components of the M-channel input signal from one or more other components of the signal, such as one or more directional interfering sources and/or a diffuse noise component. In the example of FIG. 8, filter F10-1 produces an M-channel signal that includes the filtered channels S2011 to S20*m*1, filter F10-2 produces an M-channel signal that includes the filtered channels S2012 to S20*m*2, and so on. Each of the filters F10-1 to F10-*n* is characterized by one or more matrices of coefficient values, which may be calculated using a BSS, beamforming, or combined BSS/beamforming method (e.g., an ICA, or IVA method or a variation thereof as described herein) and may also be trained as described herein. In some cases, a matrix of coefficient values may be only a vector (i.e., a one-dimensional matrix) of coefficient values. Apparatus A200 also includes a switching mechanism 350 that is configured to receive the M-channel filtered signal from each filter F10-1 to F10-*n*, to determine which of these filters currently best separates at least one desired component of input signal S10 from one or more other components, and to produce an M-channel output signal S40.

Figure 9:
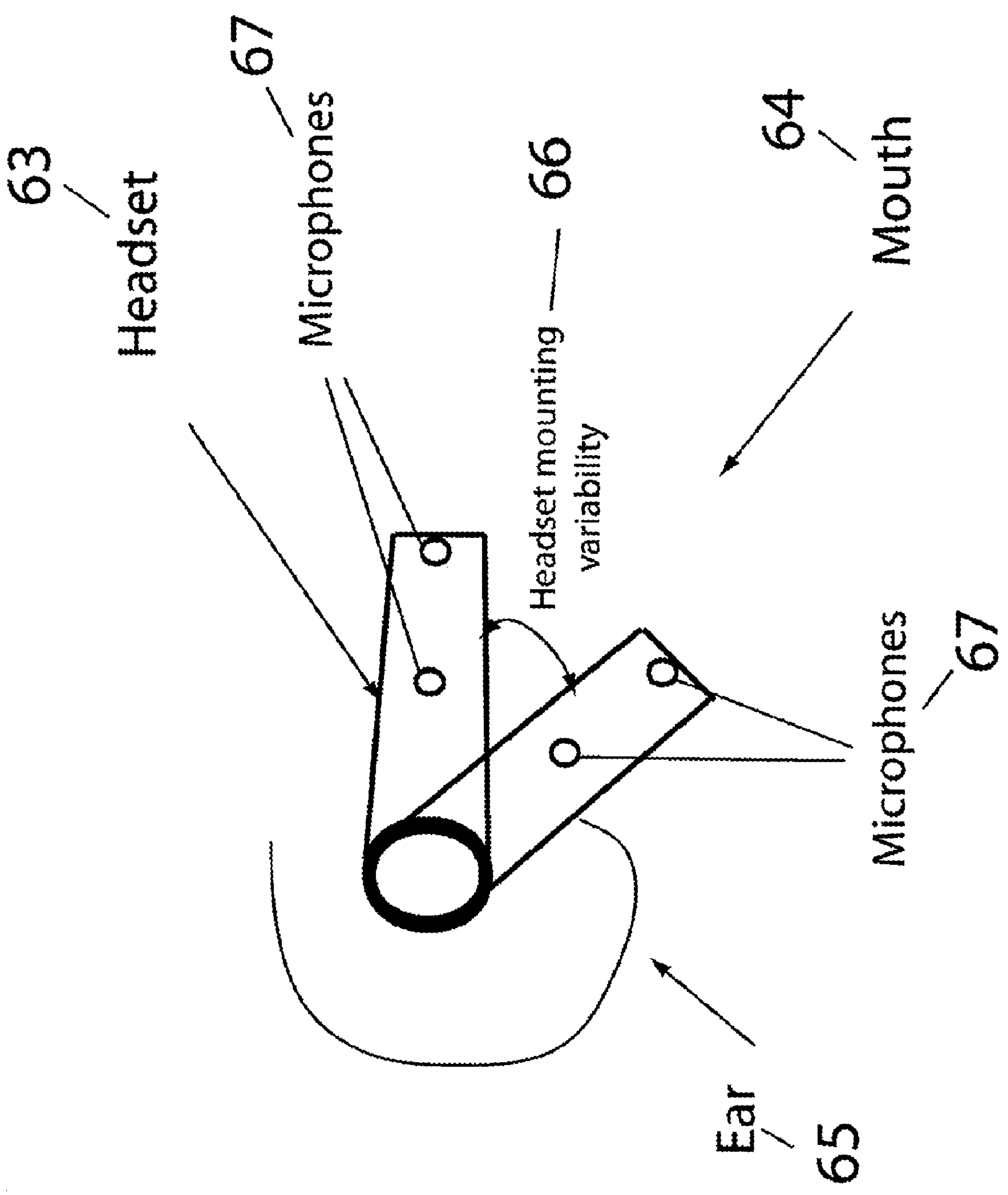
FIG. 9 shows two different orientation states of a headset 63.

An earpiece or other headset that is implemented to have M microphones is another kind of portable communications device that may have different operating configurations and may include an implementation of apparatus A200. Such a headset may be wired or wireless. For example, a wireless headset may be configured to support half- or full-duplex telephony via communication with a telephone device such as a cellular telephone handset (e.g., using a version of the Bluetooth™ protocol as promulgated by the Bluetooth Special Interest Group, Inc., Bellevue, Wash.). FIG. 9 shows a diagram of a range 66 of different operating configurations of such a headset 63 as mounted for use on a user's ear 65. Headset 63 includes an array 67 of primary (e.g., endfire) and secondary (e.g., broadside) microphones that may be oriented differently during use with respect to the user's mouth 64.

To avoid undue complexity in the description, some features of the disclosed configurations are described herein in the context of a two-channel and/or two-filter implementation of apparatus A200, but it will be understood nevertheless that any feature described in the context of such an implementation may be generalized to an M-channel and/or n-filter implementation and that such generalization is expressly contemplated and disclosed.

Figure 10:
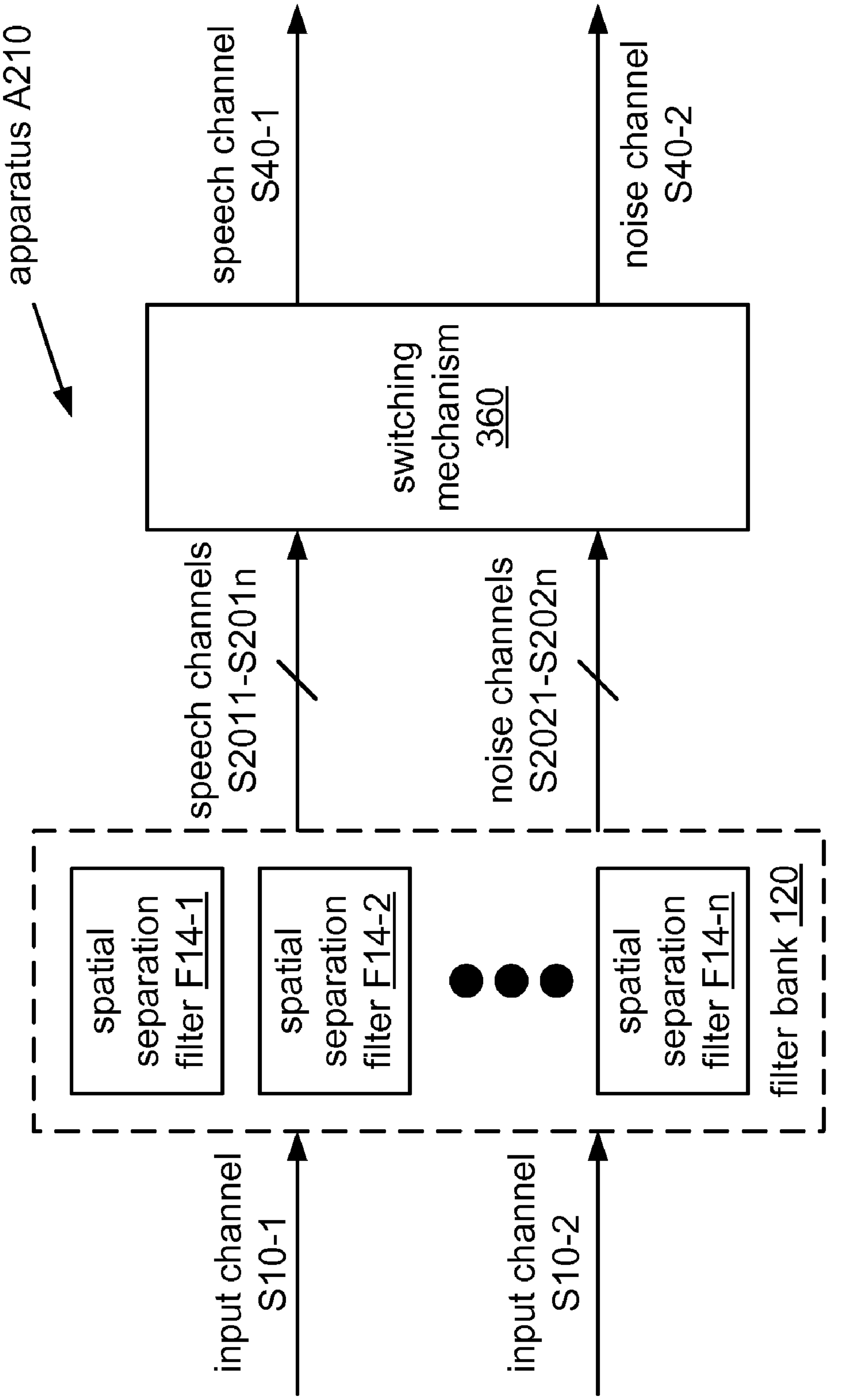
FIG. 10 shows a block diagram of a two-channel implementation A210 of apparatus A200.

FIG. 10 shows a block diagram of a two-channel (e.g., stereo) implementation A210 of apparatus A200. Apparatus A210 includes an implementation 120 of filter bank 100 that includes n spatial separation filters F14-1 to F14-*n*. Each of these spatial separation filters is a two-channel implementation of a corresponding one of filters F10-1 to F10-*n* that is arranged to filter the two input channels S10-1 and S10-2 to produce corresponding spatially processed signals over two filtered channels (e.g., a speech channel and a noise channel). Each of the filters F14-1 to F14-*n* is configured to separate a directional desired sound component of input signal S10 from one or more noise components of the signal. In the example of FIG. 10, filter F14-1 produces a two-channel signal that includes the speech channel S2011 and the noise channel S2021, filter F14-2 produces a two-channel signal that includes the speech channel S2012 and the noise channel S2022, and so on. Apparatus A210 also includes an implementation 360 of switching mechanism 350 that is configured to receive the two filtered channels from each of the filters F14-1 to F14-*n*, to determine which of these filters currently best separates the desired component of input signal S10 and the noise component, and to produce a selected set of two output channels S40-1 and S40-2.

Figure 11:
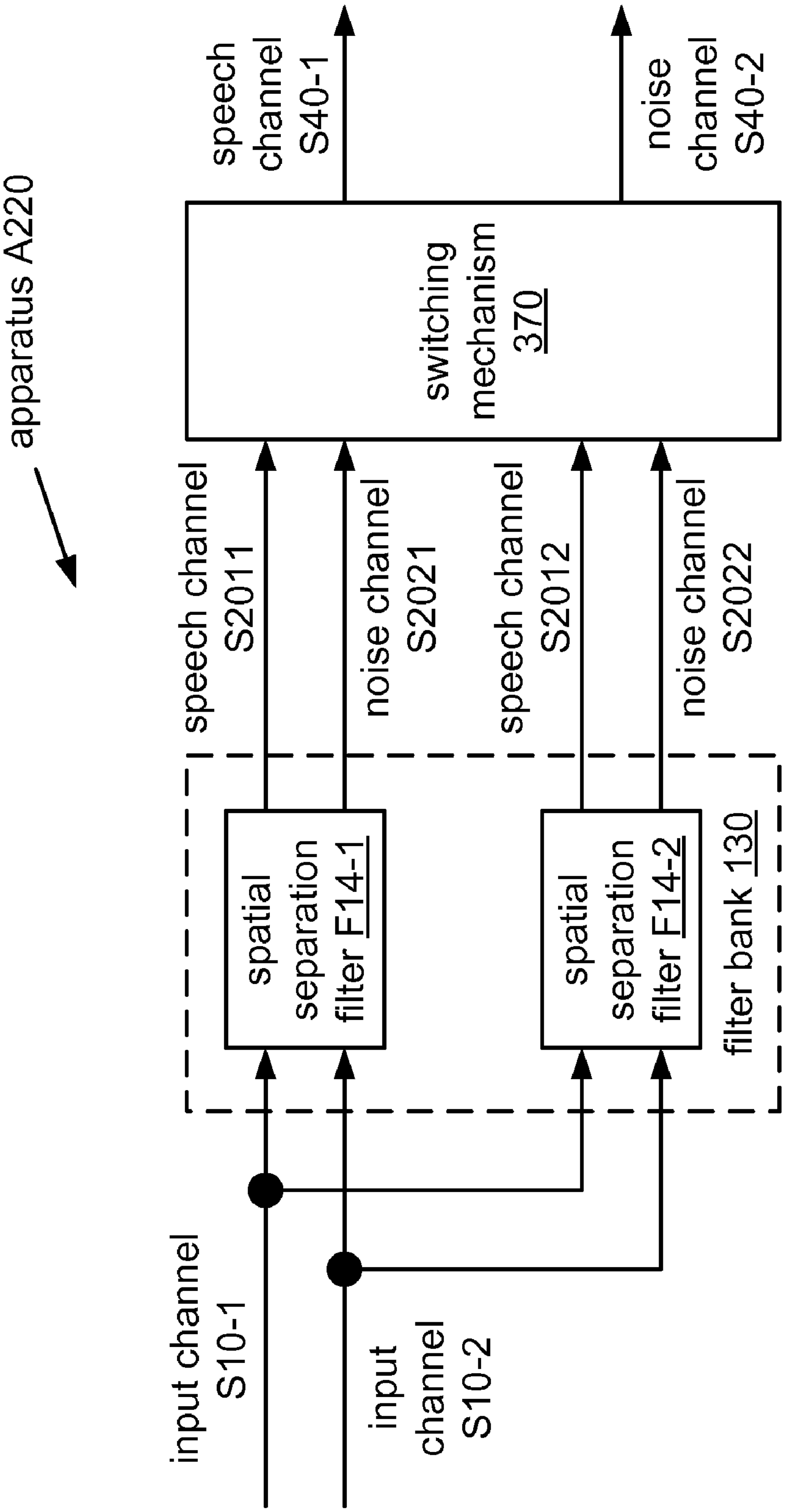
FIG. 11 shows a block diagram of an implementation A220 of apparatus A210 that includes a two-channel implementation 130 of filter bank 120.

FIG. 11 shows a particular implementation A220 of apparatus A210 that includes a two-filter implementation 130 of filter bank 120. Filters F14-1 and F14-2 may be trained and/or designed as described herein. Filter bank 130 may also be implemented such that filters F14-1 and F14-2 have substantially the same coefficient values as each other but in a different order. (In this context, the term "substantially" indicates to within an error of one percent, five percent, or ten percent.) In one such example, filters F14-1 and F14-2 have substantially the same coefficient values as each other but in a different order. (In a particular example, filter F14-1 has a vector of v coefficient values $a_1$ to $a_v$, and filter F14-2 has a v-element vector of substantially the same values in the reverse order $a_v$ to $a_1$) In another such example, filter F14-1 has a matrix of v columns of coefficient values $A_1$ to $A_v$ (each column representing a filtering operation on a respective one of the input channels), and filter F14-2 has a v-column matrix having substantially the same columns in a different order. (In a particular example, the matrix of coefficient values of filter F14-1 is flipped around a central vertical axis to obtain the matrix of coefficient values of filter F14-2). In such cases, filters F14-1 and F14-2 may be expected to have different (e.g., approximately complementary) spatial separation performance. For example, one filter may perform better separation of the desired sound into the corresponding speech channel when the desired sound source is in an area such as area A1 in FIG. 5, while the other filter may perform better separation of the desired sound into the corresponding speech channel when the desired sound source is in an opposing area such as area A2 in FIG. 5. Alternatively, filter bank 130 may be implemented such that filters F14-1 and F14-2 are structurally alike, with each of the coefficient values of filter F14-2 being substantially equal to the additive inverse of the corresponding coefficient value of filter F14-1 (i.e., has the same magnitude and the opposite direction, to within an error of one percent, five percent, or ten percent).

A typical use of a handset or headset involves only one desired sound source: the user's mouth. In such case, the use of an implementation of filter bank 120 that includes only two-channel spatial separation filters may be appropriate. Inclusion of an implementation of apparatus A200 in a communications device for audio and/or video conferencing is also expressly contemplated and disclosed. For a device for audio and/or video conferencing, a typical use of the device may involve multiple desired sound sources (e.g., the mouths of the various participants). In such case, the use of an implementation of filter bank 100 that includes R-channel spatial separation filters (where R is greater than two) may be more appropriate. Generally, it may be desirable for the spatial separation filters of filter bank 100 to have at least one channel for each directional sound source and one channel for diffuse noise. In some cases, it may also be desirable to provide an additional channel for each of any directional interfering sources.

Figure 12:
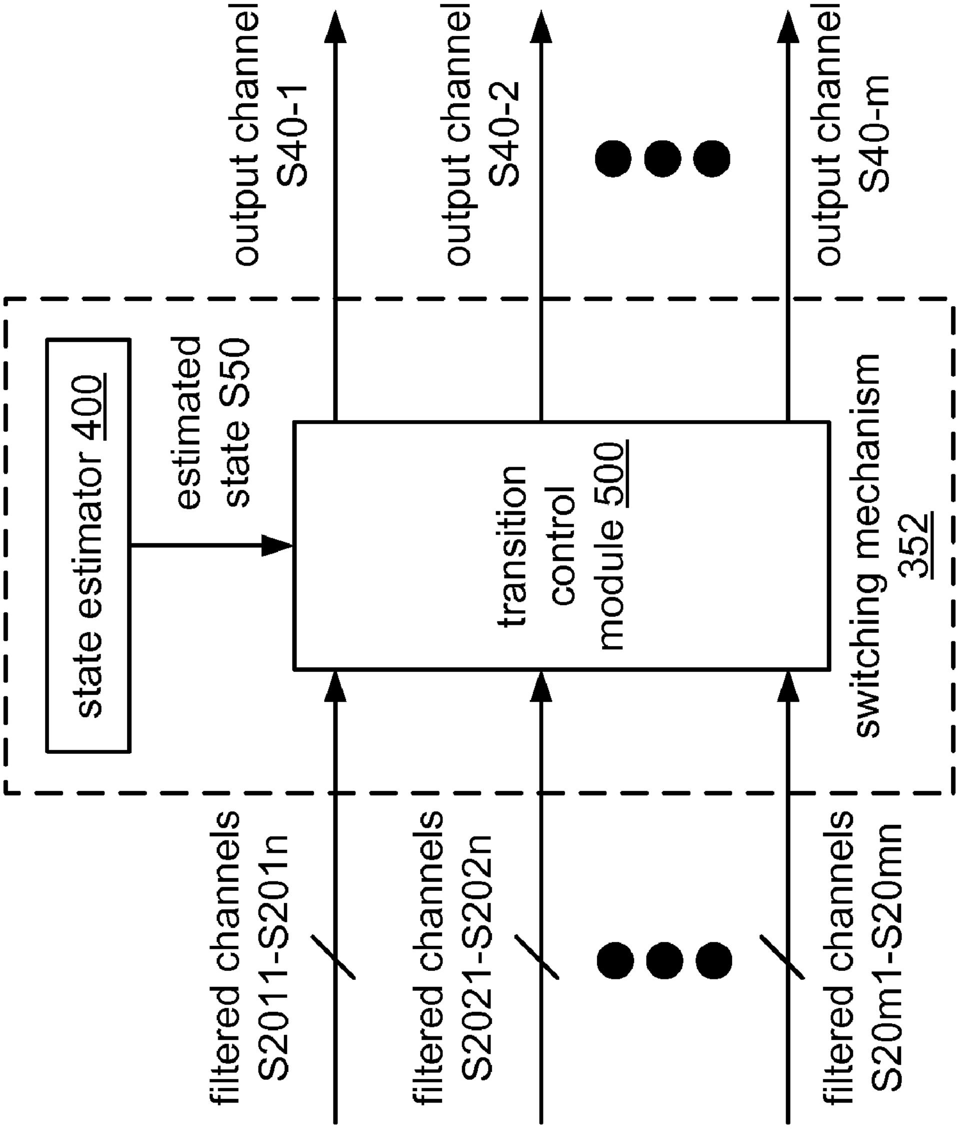
FIG. 12 shows a block diagram of an implementation 352 of switching mechanism 350.
Figure 13:
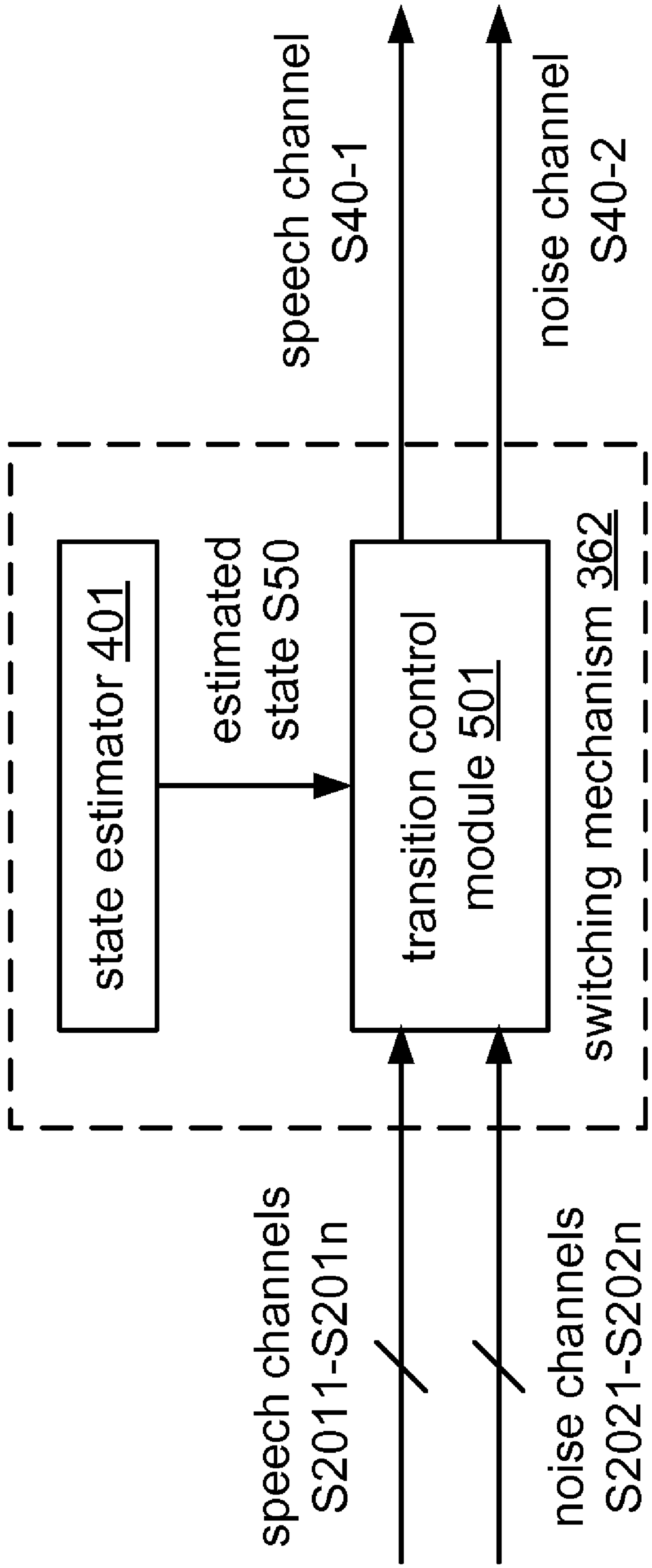
FIG. 13 shows a block diagram of an implementation 362 of switching mechanism 352 and 360.

FIG. 12 shows a block diagram of an implementation 352 of switching mechanism 350 that includes a state estimator 400 and a transition control module 500. In response to an estimated orientation state indication (or "estimated state") S50 from state estimator 400, transition control module 500 is configured to select from among n sets of filtered channels S2011-S20*m*1 to S201*n*-S20*mn* to produce a set of M output channels S40-1 to S40-*m*. FIG. 13 shows a block diagram of a particular implementation 362 of switching mechanism 352, including an implementation 401 of state estimator 400 and an implementation 501 of transition control module 500, in which the value of M is equal to two.

Figure 14A:
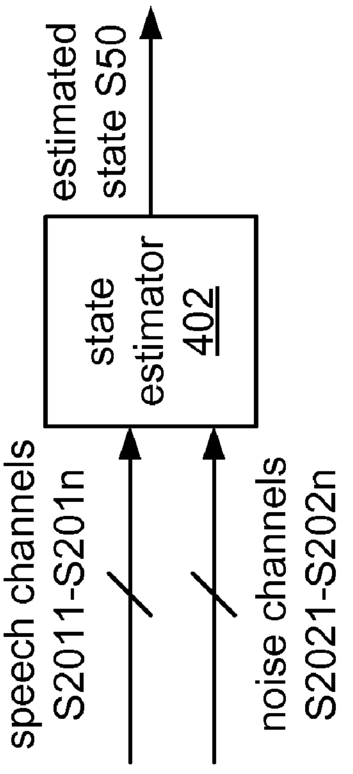
FIGS. 14A-D show four different implementations 402, 404, 406, and 408, respectively, of state estimator 400.

State estimator 400 may be implemented to calculate estimated state indication S50 based on one or more input channels S10-1 to S10-*m*, one or more filtered channels S2011-S20*mn*, or a combination of input and filtered channels. FIG. 14A shows an implementation 402 of state estimator 401 that is arranged to receive the n speech channels S2011-S201*n* and the n noise channels S202*a*-S202*n*. In one example, state estimator 402 is configured to calculate estimated state indication S50 according to the expression $\max[E(S_i)-E(N_i)]$ for $1 \leqq i \leqq n$, where $E(S_i)$ indicates energy of speech channel S201*i* and $E(N_i)$ indicates energy of noise channel S202*i*. In another example, state estimator 402 is configured to calculate estimated state indication S50 according to the expression $\max[E(S_i)-E(N_i)+C_i]$, where $C_i$ indicates a preference constant associated with filter F10-*i*. It may be desirable to configure state estimator 400 to assign a different value to each of one or more of the preference constants $C_i$ in response to a change in the operating configuration and/or operating mode of the communications device.

State estimator 402 may be configured to calculate each instance of the energy values $E(S_i)$ and $E(N_i)$ as a sum of squared sample values of a block of consecutive samples (also called a "frame") of the signal carried by the corresponding channel. Typical frame lengths range from about five or ten milliseconds to about forty or fifty milliseconds, and the frames may be overlapping or nonoverlapping. A frame as processed by one operation may also be a segment (i.e., a "subframe") of a larger frame as processed by a different operation. In one particular example, the signals carried by the filtered channels S2011 to S202*n* are divided into sequences of 10-millisecond nonoverlapping frames, and state estimator 402 is configured to calculate an instance of energy value $E(S_i)$ for each frame of each of the filtered channels S2011 and S2012 and to calculate an instance of energy value $E(N_i)$ for each frame of each of the filtered channels S2021 and S2022. Another example of state estimator 402 is configured to calculate estimated state indication S50 according to the expression $\min(\mathrm{corr}(S_i,N_i))$ (or $\min(\mathrm{corr}(S_i,N_i))+C_i)$ for $1 \leqq i \leqq n$, where corr(A,B) indicates a correlation of A and B. In this case, each instance of the correlation may be calculated over a corresponding frame as described above.

Figure 14B:
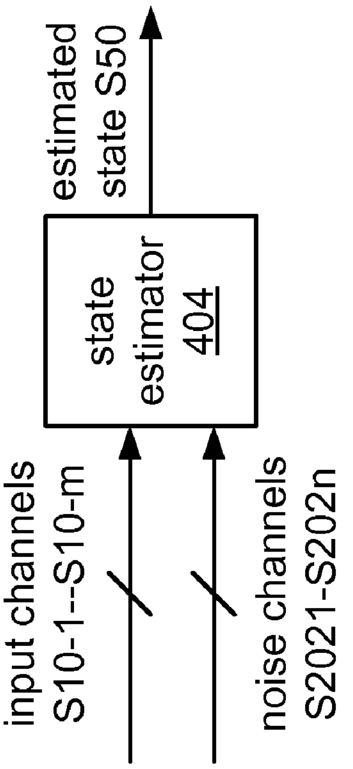

FIG. 14B shows an implementation 404 of state estimator 401 that is arranged to receive the n input channels S10-1-S10-*m* and the n noise channels S2021-S202*n*. In one example, state estimator 404 is configured to calculate estimated state indication S50 according to the expression $\max[E(I_j)-E(N_i)]$ (or $\max[E(I_j)-E(N_i)+C_i]$) for $1 \leqq i \leqq n$ and $1 \leqq j \leqq n$, where $E(I_j)$ indicates energy of input channel S10-*j*. In another example, state estimator 404 is configured to calculate estimated state indication S50 according to the expression $\max[E(I)-E(N_i)]$ (or $\max[E(I)-E(N_i)+C_i]$) for $1 \leqq i \leqq n$, where E(I) indicates energy of a selected one I of input channels S10-1 to S10-*m*. In this case, channel I is an input channel that is likely to carry a desired speech signal. Channel I may be selected based on the physical location of the corresponding microphone within the device. Alternatively, channel I may be selected based on a comparison of the signal-to-noise ratios of two or more (possibly all) of the input channels.

Figure 14C:
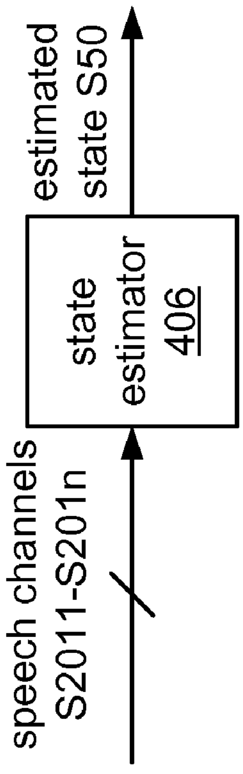

FIG. 14C shows an implementation 406 of state estimator 401 that is arranged to receive the n speech channels S2011-S201*n*. State estimator 406 is configured to select the state that corresponds to the speech channel having the highest value of a speech measure (e.g., a measure of speech characteristics). In one example, state estimator 406 is configured to calculate estimated state indication S50 based on relative autocorrelation characteristics of the speech channels S2011-S201*n*. In this case, a channel that is currently carrying a signal having an autocorrelation peak within a range of expected human pitch lag values may be preferred over a channel that is currently carrying a signal having an autocorrelation peak only at zero lag. In another example, state estimator 406 is configured to calculate estimated state indication S50 based on relative kurtosis (i.e., fourth-order moment) characteristics of the speech channels S2011-S201*n*. In this case, a channel that is currently carrying a signal having a higher kurtosis (i.e., being more non-Gaussian) may be preferred over a channel that is currently carrying a signal having a lower kurtosis (i.e., being more Gaussian).

Figure 14D:
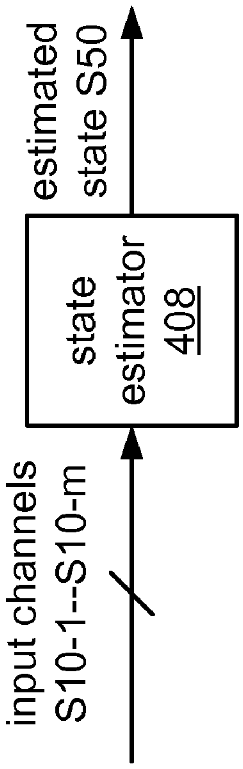

FIG. 14D shows an implementation 408 of state estimator 401 that is arranged to receive the n input channels S10-1-S10-*m*. In this case, each of the filter sets F10-1 to F10-*n* is associated with a different range of time difference of arrival (TDOA) values. State estimator 408 is configured to estimate a TDOA among the input channels (e.g., using a method based on correlation of the input channels, input/output correlation, and/or relative delayed input sum and difference) and to select the state which corresponds to the associated filter set. It may be desirable to perform low-pass filtering of the input channels before calculating delay estimates based on sum and difference measures of the input signals, as such filtering may help to regularize and/or stabilize the delay estimates. State estimator 408 may be less dependent on accurate calibration of microphone gains and/or more robust to calibration error than other implementations of state estimator 400.

It may be desirable to configure state estimator 400 to smooth its input parameter values before using them to perform an estimated state calculation (e.g., as described above). In one particular example, state estimator 402 is configured to calculate the energies of each of the speech channels S2011-S201*n* and noise channels S2021-S202*n* and then to smooth these energies according to a linear expression such as $E_c=\alpha E_p+(1-\alpha)E_n$, where $E_c$ denotes the current smoothed energy value, $E_p$ denotes the previous smoothed energy value, $E_n$ denotes the current calculated energy value, and $\alpha$ denotes a smoothing factor whose value may be fixed or adaptive between zero (no smoothing) and a value less than one, such as 0.9 (for maximum smoothing). In this example, such smoothing is applied to the calculated energy values to obtain the values $E(S_i)$ and $E(N_i)$. In other examples, such linear smoothing (and/or a nonlinear smoothing operation) may be applied to calculated energy values as described with reference to FIGS. 14A-D to obtain one or more of the values $E(S_i)$, $E(N_i)$, E(I), and $E(I_j)$. Alternatively and/or additionally, it may be desirable to select and/or precondition any one or more of the signals provided to state estimator 400 (e.g., as carried on the speech, noise, and/or input channels), as such pre-processing may help to avoid erroneous state estimations in the presence of loud interfering sources.

Figure 15:
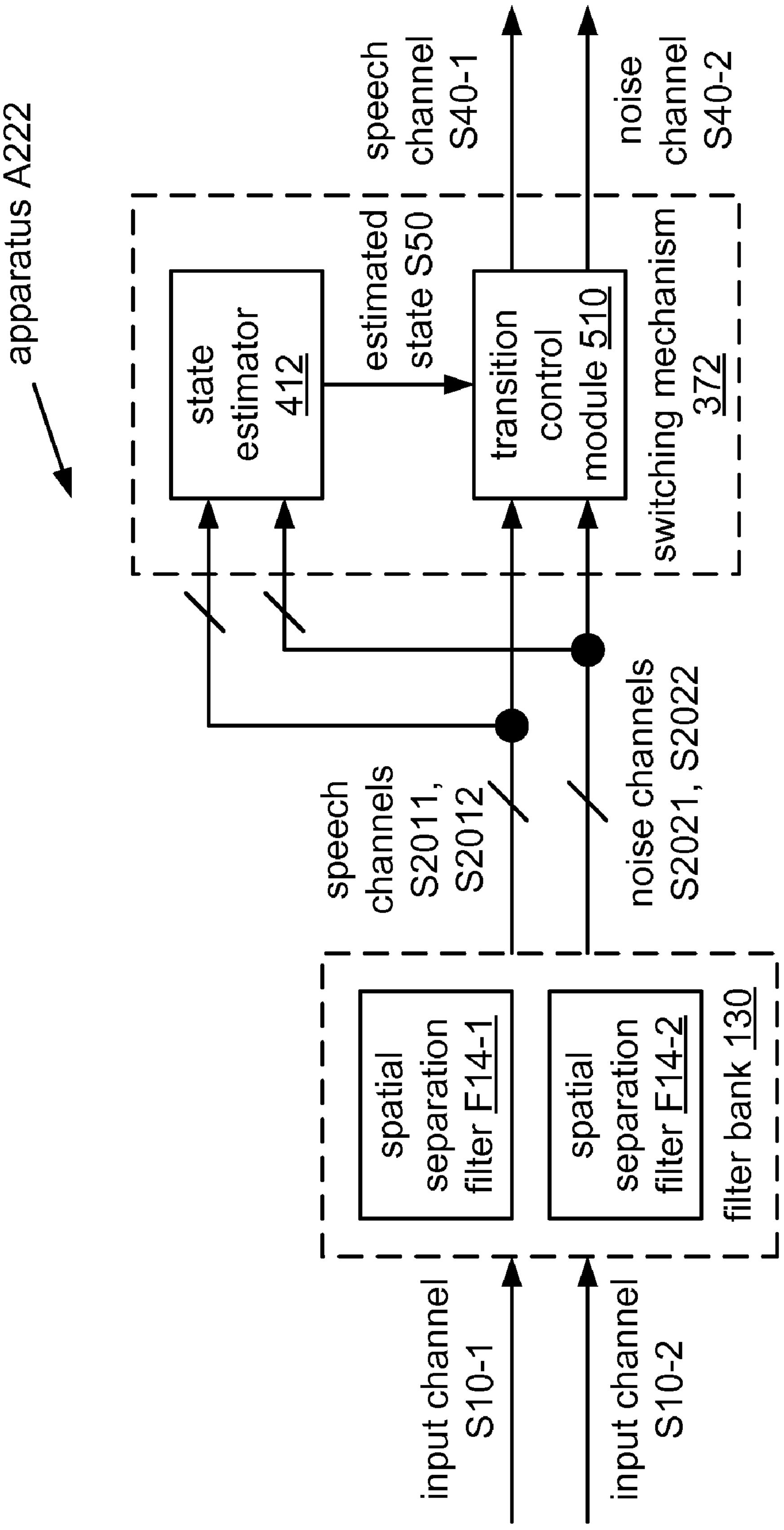
FIG. 15 shows a block diagram of an implementation A222 of apparatus A220.
Figure 16:
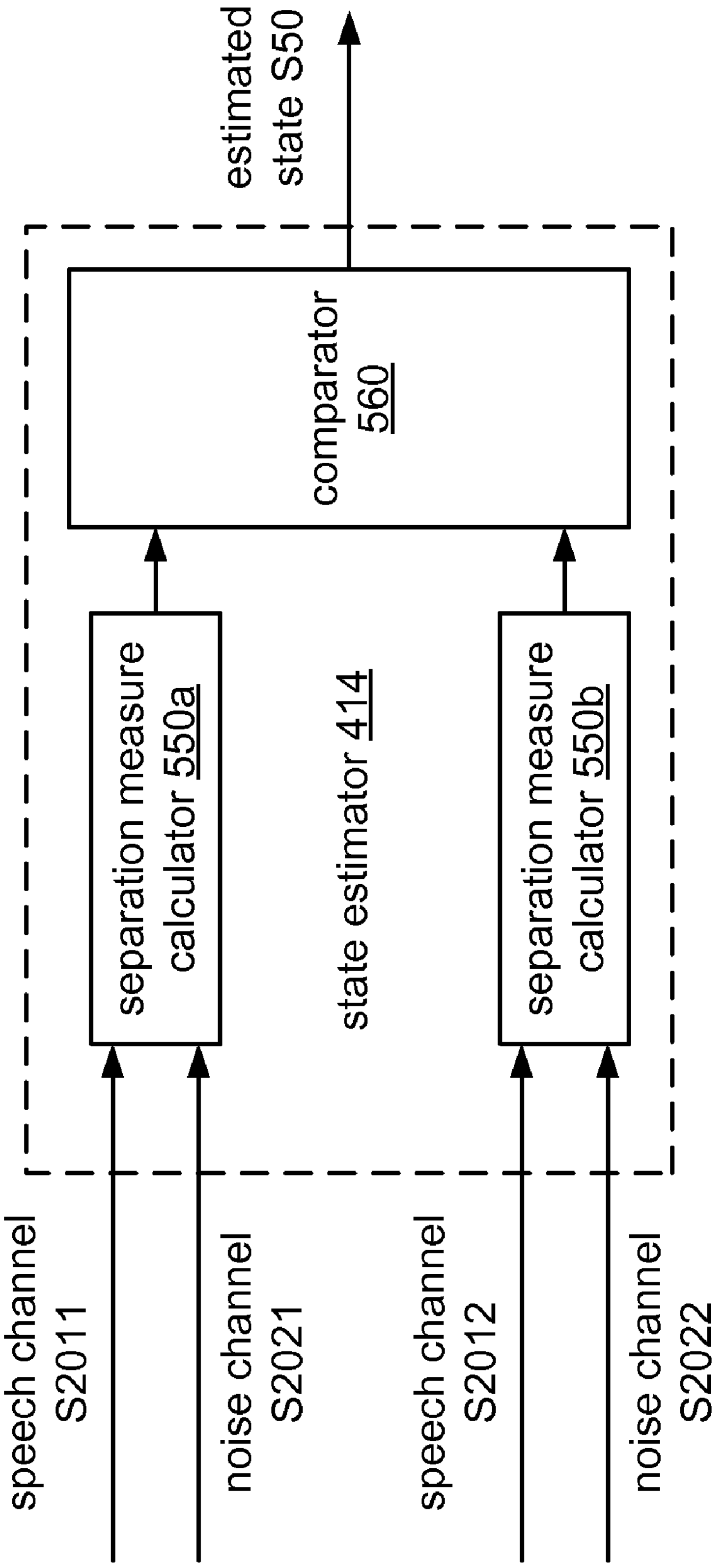
FIG. 16 shows an example of an implementation 414 of state estimator 412.

FIG. 15 shows an example of an implementation A222 of apparatus A220 that includes an implementation 372 of switching mechanism 370 having (A) an implementation 412 of state estimator 402 that is configured to process channels from two filters and (B) a corresponding implementation 510 of transition control module 501. FIG. 16 shows an example of an implementation 414 of state estimator 412. In this example, separation measure calculator 550*a* calculates an energy difference between signals S2011 and S2021, separation measure calculator 550*b* calculates an energy difference between signals S2012 and S2022, and comparator 560 compares the results to indicate the orientation state that corresponds to the filter that produces the maximum separation (e.g., the maximum energy difference) between the channels. In calculating the respective energy difference, either one (or both) of separation measure calculators 550*a* and 550*b* may be configured to smooth the calculated difference over time according to an expression such as $E_c=\alpha E_p+(1-\alpha)E_n$ as described above. Comparator 560 may also be configured to add a corresponding filter preference constant as described above to one or both of the energy differences before comparing them. These principles may be extended to other implementations of state estimator 402 (e.g., for values of M greater than two), and state estimators 404 and 406 may be implemented in an analogous manner. It is also noted that state estimator 400 may be configured to produce estimated state S50 based on a combination of two or more among the techniques described with reference to implementations 402, 404, 406, and 408.

It may be desirable to inhibit or disable switching between filter outputs for intervals during which no input channel contains a desired speech component (e.g., during noise-only intervals). For example, it may be desirable for state estimator 400 to update the estimated orientation state only when a desired sound component is active. Such an implementation of state estimator 400 may be configured to update the estimated orientation state only during speech intervals, and not during intervals when the user of the communications device is not speaking.

Figure 17:
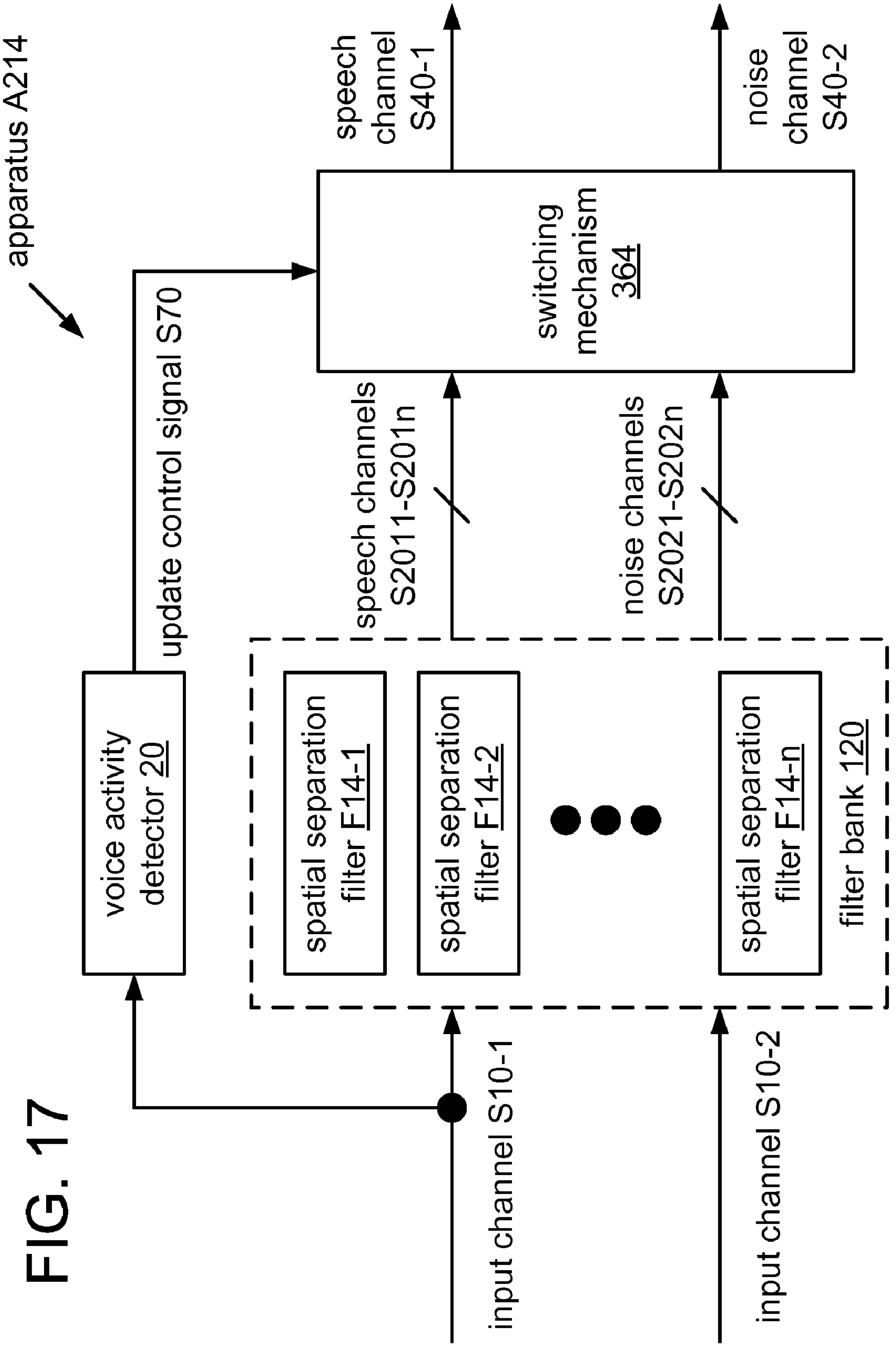
FIG. 17 shows a block diagram of an implementation A214 of apparatus A210.

FIG. 17 shows an implementation A214 of apparatus A210 that includes a voice activity detector (or "VAD") 20 and an implementation 364 of switching mechanism 360. Voice activity detector 20 is configured to produce an update control signal S70 whose state indicates whether speech activity is detected on input channel S10-1 (e.g., a channel corresponding to primary microphone MC10), and switching mechanism 364 is controlled according to the state of update control signal S70. Switching mechanism 364 may be configured such that updates of estimated state S50 are inhibited during intervals (e.g., frames) when speech is not detected.

Voice activity detector 20 may be configured to classify a frame of its input signal as speech or noise (e.g., to control the state of a binary voice detection indication signal) based on one or more factors such as frame energy, signal-to-noise ratio (SNR), periodicity, zero-crossing rate, autocorrelation of speech and/or residual, and first reflection coefficient. Such classification may include comparing a value or magnitude of such a factor to a threshold value and/or comparing the magnitude of a change in such a factor to a threshold value. Alternatively or additionally, such classification may include comparing a value or magnitude of such a factor, such as energy, or the magnitude of a change in such a factor, in one frequency band to a like value in another frequency band. Voice activity detector 20 is typically configured to produce update control signal S70 as a binary-valued voice detection indication signal, but configurations that produce a continuous and/or multi-valued signal are also possible.

Figure 18:
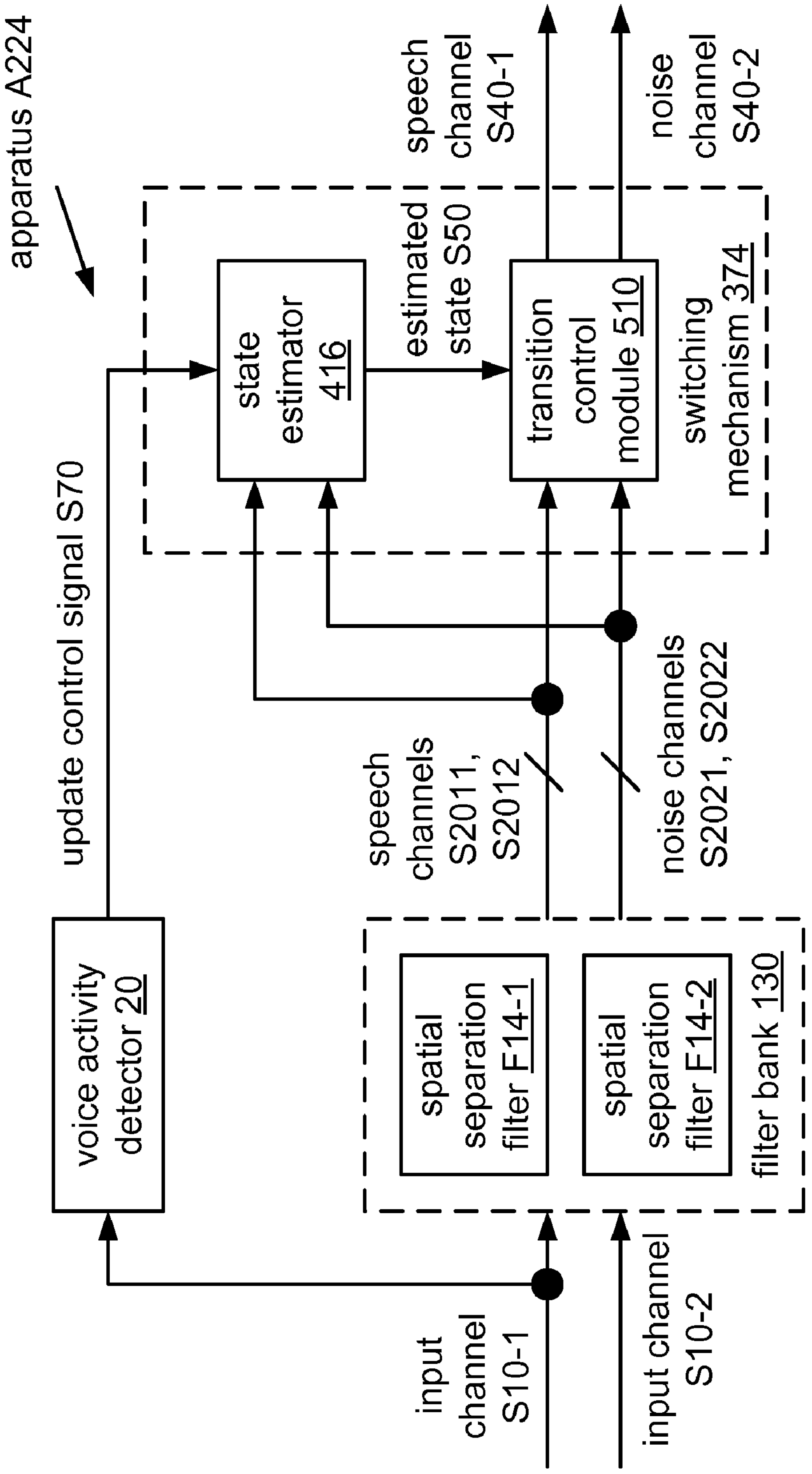
FIG. 18 shows a block diagram of an implementation A224 of apparatus A222.
Figure 19:
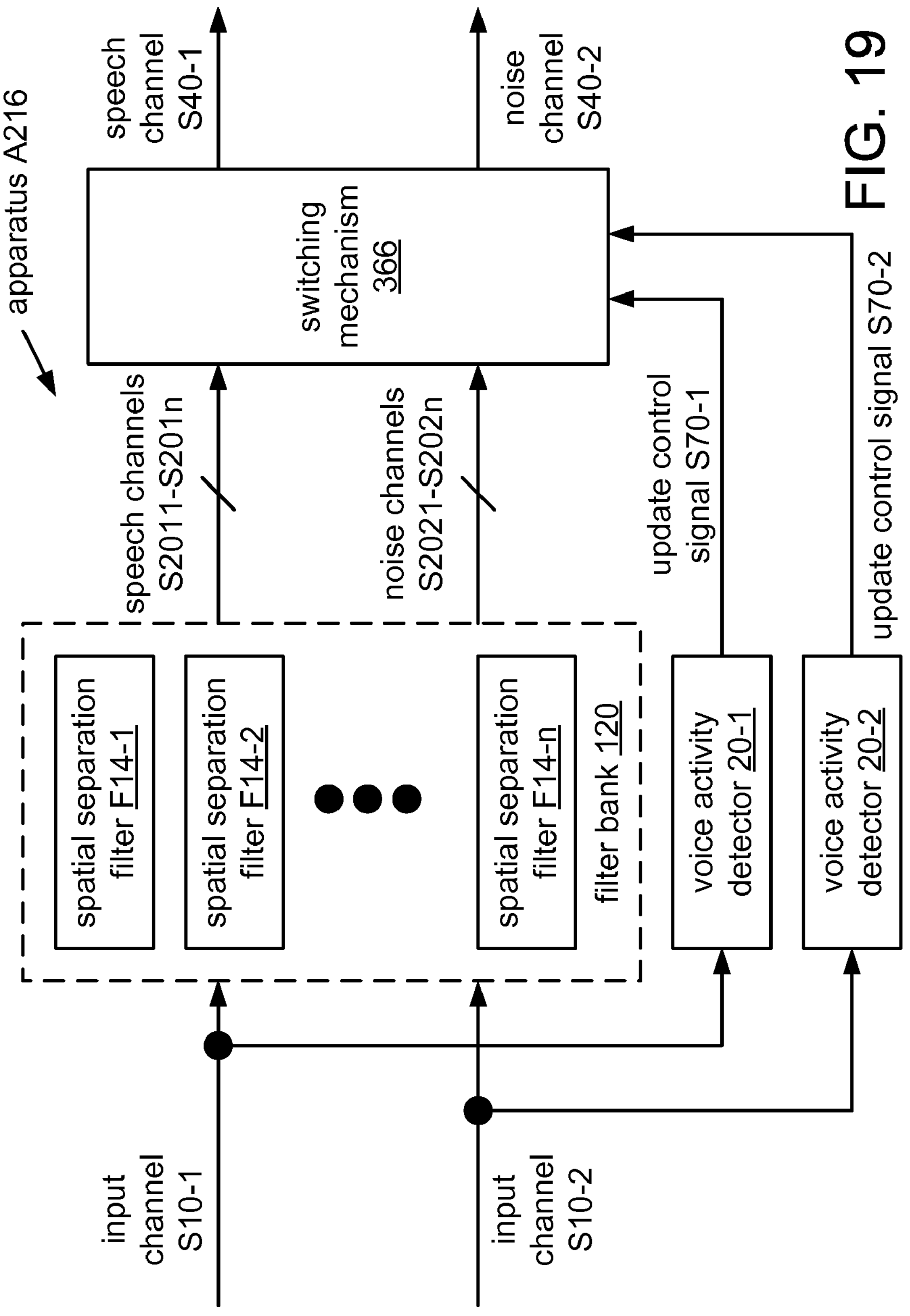
FIG. 19 shows a block diagram of an implementation A216 of apparatus A210.

FIG. 18 shows a block diagram of an implementation A224 of apparatus 220 that includes VAD 20 and an implementation 374 of switching mechanism 372. In this example, update control signal S70 is arranged to control an implementation 416 of state estimator 412 (e.g., to enable or disable changes in the value of estimated state S50) according to whether speech activity is detected on input channel S10-1. FIG. 19 shows an implementation A216 of apparatus A210 that includes instances 20-1 and 20-2 of VAD 20, which may but need not be identical. In the case of apparatus A216, the state estimator of an implementation 366 of switching mechanism 360 is enabled if speech activity is detected on either input channel and is disabled otherwise.

As the distance between a communications device and the user's mouth increases, the ability of VAD 20 to distinguish speech frames from non-speech frames may decrease (e.g., due to a decrease in SNR). As noted above, however, it may be desirable to control state estimator 400 to update the estimated orientation state only during speech intervals. Therefore, it may be desirable to implement VAD 20 (or one or both of VADs 20-1 and 20-2) using a single-channel VAD that has a high degree of reliability (e.g., to provide improved desired speaker detection activity in far-field scenarios). For example, it may be desirable to implement such a detector to perform voice activity detection based on multiple criteria (e.g., energy, zero-crossing rate, etc.) and/or a memory of recent VAD decisions. In another implementation of apparatus A212, instances 20-1 and 20-2 of VAD 20 are replaced with a dual-channel VAD that produces an update control signal, which may be binary-valued as noted above.

State estimator 400 may be configured to use more than one feature to estimate the current orientation state of a communications device. For example, state estimator 400 may be configured to use a combination of more than one of the criteria described above with reference to FIGS. 14A-D. State estimator 400 may also be configured to use other information relating to a current status of the communications device, such as positional information (e.g., based on information from an accelerometer of the communications device), operating configuration (e.g., as indicated by the state or states or one or more switches of the communications device), and/or operating mode (e.g., whether a mode such as push-to-talk, speakerphone, or video playback or recording is currently selected). For example, state estimator 400 may be configured to use information (e.g., based on the current operating configuration) that indicates which microphones are currently active.

Apparatus A200 may also be constructed such that for some operating configurations or modes of the communications device, a corresponding one of the spatial separation filters is assumed to provide sufficient separation that continued state estimation is unnecessary while the device is in that configuration or mode. When a video display mode is selected, for example, it may be desirable to constrain estimated state indication S50 to a particular corresponding value (e.g., relating to an orientation state in which the user is facing the video screen). As the process of state estimation based on information from input signal S10 necessarily involves some delay, the use of such information relating to a current status of the communications device may help to accelerate the state estimation process and/or to reduce delays in operations responsive to changes in estimated state S50, such as activation of and/or parameter changes to one or more subsequent processing stages.

Some operating configurations and/or operating modes of a communications device may support an especially wide range of user-device orientations. When used in an operating mode such as push-to-talk or speakerphone mode, for example, a communications device may be held at a relatively large distance from the user's mouth. In some of these orientations, the user's mouth may be nearly equidistant from each microphone, and reliable estimation of the current orientation state may become more difficult. (Such an orientation may correspond, for example, to an overlap region between areas associated with different orientation states, as shown in FIG. 6C.) In such a case, small variations in the orientation may lead to unnecessary changes in estimated state S50.

It may be desirable to configure state estimator 400 to inhibit unnecessary changes (e.g., by incorporating hysteresis or inertia). For example, comparator 560 may be configured to update estimated state indication S50 only if the difference between (A) the largest separation measure and (B) the separation measure that corresponds to the current state exceeds (alternatively, is not less than) a threshold value.

Figure 20:
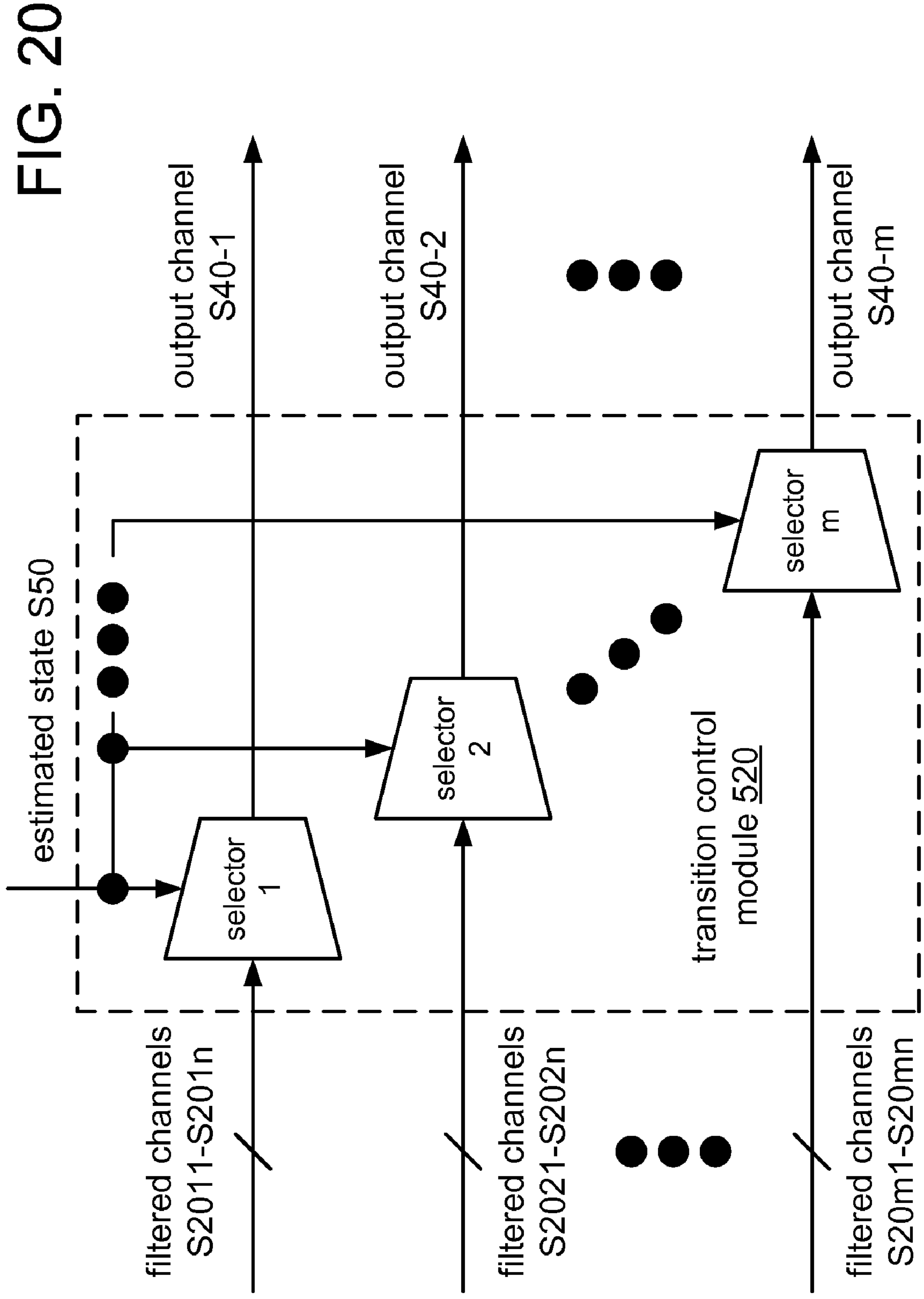
FIG. 20 shows a block diagram of an implementation 520 of transition control module 500.

FIG. 20 shows a block diagram of an implementation 520 of transition control module 500. Transition control module 520 includes a set of M selectors (e.g., de-multiplexers). For $1 \leq j \leq M$, each selector j outputs one among filtered channels S20*j*1 to S20*jn* as output channel S40-*j* according to the value of estimated state S50.

The use of transition control module 520 may result in a sudden transition in output signal S40 from the output of one spatial separation filter to the output of another. For a situation in which the communications device is currently near a spatial boundary between two or more orientation states, the use of transition control module 520 may also result in frequent transitions (also called "jitter") from one filter output to another. As the outputs of the various filters may differ substantially, these transitions may give rise to objectionable artifacts in output signal S40, such as a temporary attenuation of the desired speech signal or other discontinuity. It may be desirable to reduce such artifacts by applying a delay period (also called a "hangover") between changes from one filter output to another. For example, it may be desirable to configure state estimator 400 to update estimated state indication S50 only when the same destination state has been consistently indicated over a delay interval (e.g., five or ten consecutive frames). Such an implementation of state estimator 400 may be configured to use the same delay interval for all state transitions, or to use different delay intervals according to the particular source and/or potential destination states.

Sudden transitions between filter outputs in output signal S40 may be perceptually objectionable, and it may be desirable to obtain a more gradual transition between filter outputs than a transition as provided by transition control module 520. In such case, it may be desirable for switching mechanism 350 to gradually fade over time from the output of one spatial separation filter to the output of another. For example, in addition or in the alternative to applying a delay interval as discussed above, switching mechanism 350 may be configured to perform linear smoothing from the output of one filter to the output of another over a merge interval of several frames (e.g., ten 20-millisecond frames).

Figure 21:
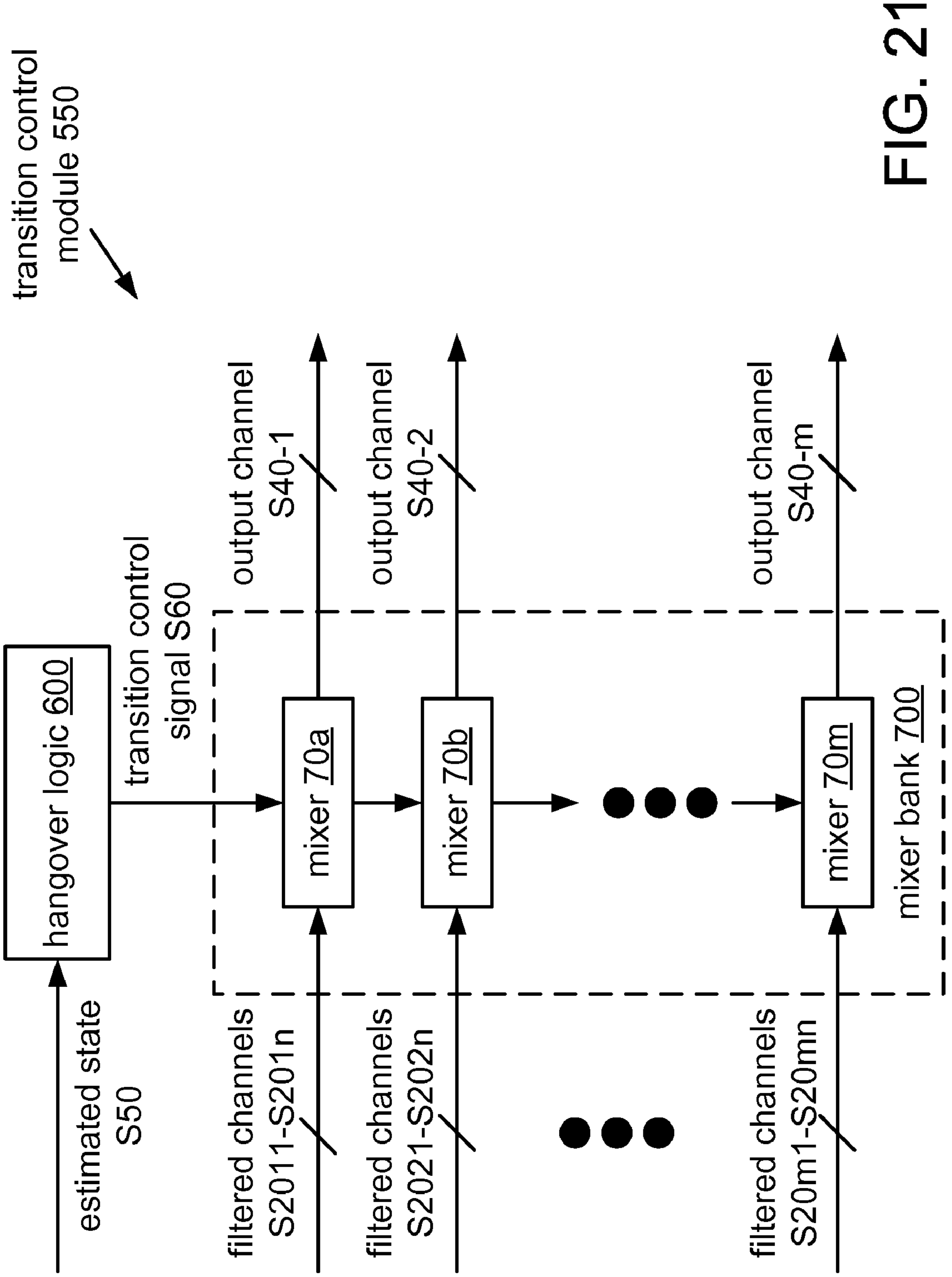
FIG. 21 shows a block diagram of an implementation 550 of transition control module 500.

FIG. 21 shows a block diagram of an implementation 550 of transition control module 500. Instead of the array of demultiplexers of module 520, transition control module 550 includes a mixer bank 700 of m mixers 70*a*-70*m*. Transition control module 550 also includes hangover logic 600 that is configured to generate a transition control signal S60. For $1 \leq j \leq M$, each mixer 70*j* is configured to mix filtered channels S20*j*1 to S20*jn* according to transition control signal S60 to produce the corresponding output channel S40-*j*.

Figure 22:
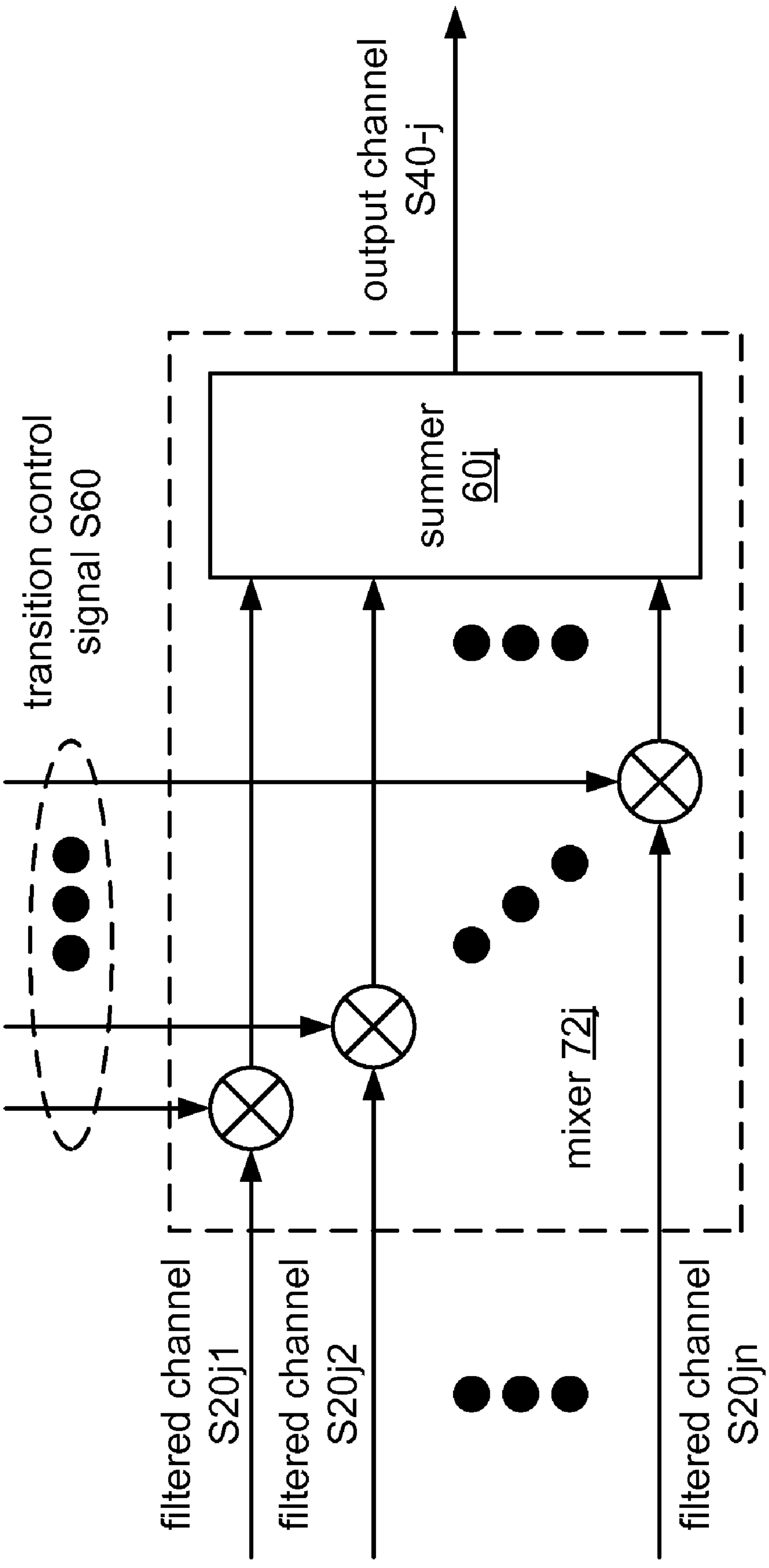
FIG. 22 shows a block diagram of an implementation 72*j* of a j-th one of mixers 70*a*-70*m*.

FIG. 22 shows a block diagram of an implementation 72*j* of mixer 70*j* (where $1 \leq j \leq M$). In this example, transition control signal S60 includes n values in parallel that are applied by mixer 72*j* to weight the respective filtered channels S20*j*1-S20*jn*, and summer 60*j* calculates the sum of the weighted signals to produce output channel S40-*j*.

Figure 23:
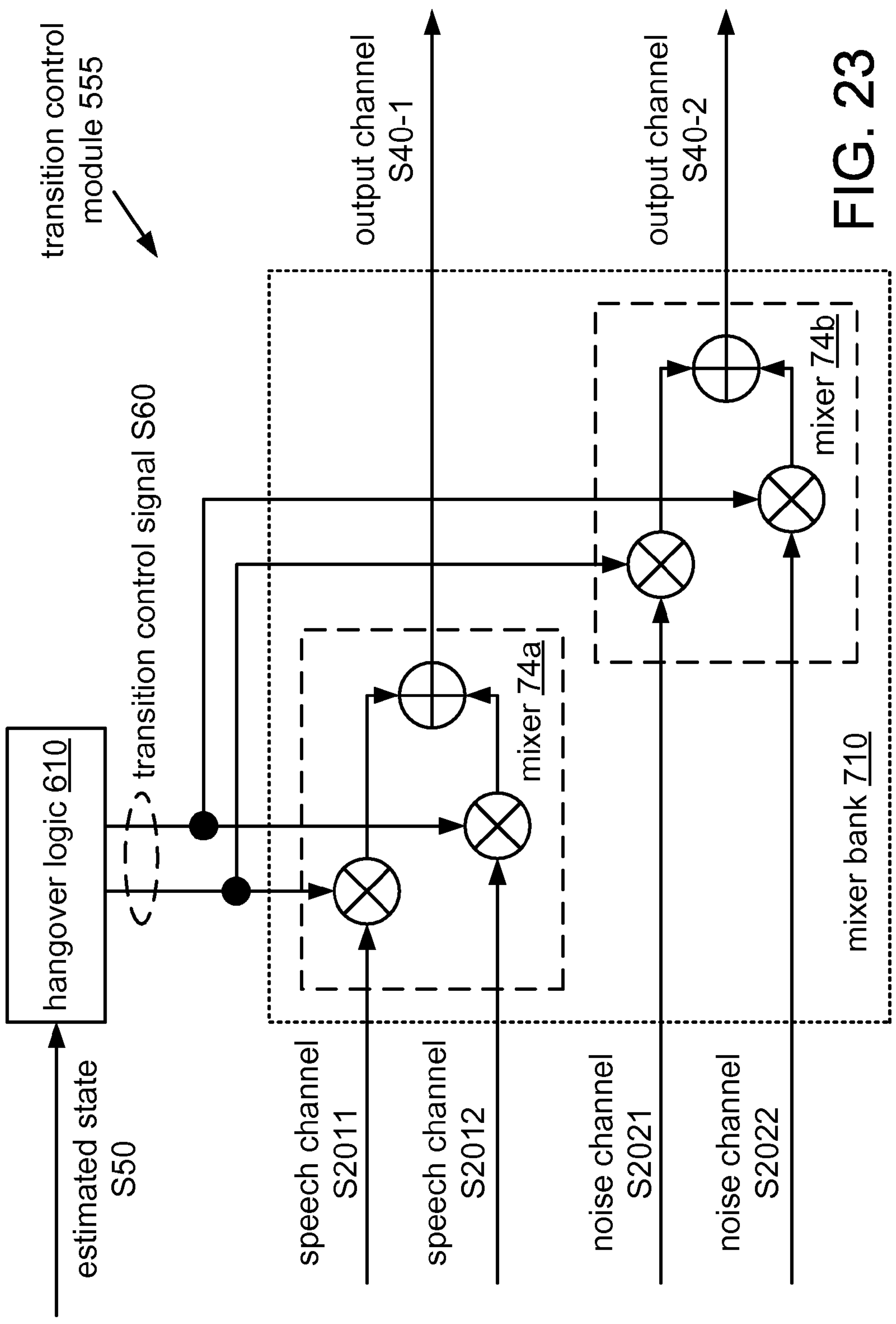
FIG. 23 shows a block diagram of a two-channel implementation 710 of mixer bank 700.

FIG. 23 shows a block diagram of an implementation 555 of transition control module 550 that includes a two-channel implementation 710 of mixer bank 700. In one such example, a 2-channel implementation 610 of hangover logic 600 is configured to calculate a weight factor $\omega$ that varies from zero to one over a predetermined number of frames (i.e., a merge interval) and to output the values of $\omega$ and $(1-\omega)$ (in an order determined by estimated state S50) as transition control signal 60. Mixers 74*a* and 74*b* of mixer bank 710 are each configured to apply these weight factors according to an expression such as the following: $\omega Fn+(1-\omega)Fc$, where Fn indicates the filtered channel into which the mixer is transitioning, and Fc indicates the filtered channel from which the mixer is transitioning.

It may be desirable to configure hangover logic 600 to apply different delay and/or merge intervals for different transitions of estimated state S50. For example, some transitions of estimated state S50 may be less likely to occur in practice than others. One example of a relatively unlikely state transition is a transition which indicates that the user has turned the handset completely around (i.e., from an orientation in which the primary microphone faces the user's mouth into an orientation in which the primary microphone faces away from the user's mouth). It may be desirable to configure hangover logic 600 to use a longer delay and/or merge period for a less probable transition. Such a configuration may help to suppress spurious transients of estimated state indication S50. It may also be desirable to configure hangover logic 600 to select a delay and/or merge interval according to other information relating to a current and/or previous status of the communications device, such as positional information, operating configuration, and/or operating mode as discussed herein.

Figure 24:
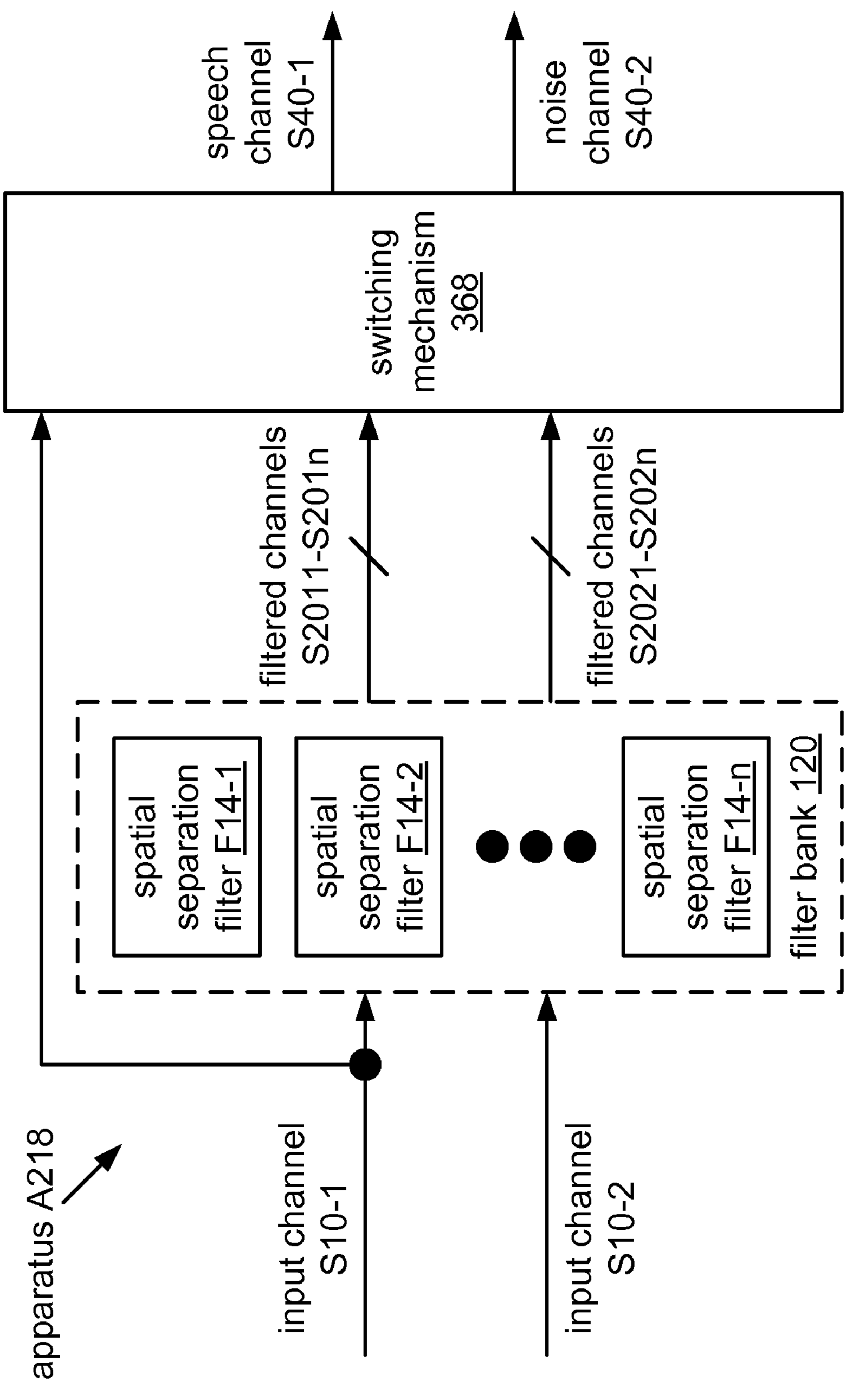
FIG. 24 shows a block diagram of an implementation A218 of apparatus A210.

FIG. 24 shows a block diagram of an implementation A218 of apparatus A210. In this example, an implementation 368 of switching mechanism 360 is configured to select from among the n pairs of filtered channels as well as the pair of input channels to produce speech channel S40-1 and noise channel S40-2. In one example, switching mechanism 368 is configured to operate in a dual-channel mode or a single-channel mode. In the dual-channel mode, switching mechanism 368 is configured to select from among the n pairs of filtered channels to produce speech channel S40-1 and noise channel S40-2. In the single-channel mode, switching mechanism 368 is configured to select input channel S10-1 to produce speech channel S40-1. In an alternative implementation of the single-channel mode, switching mechanism 368 is configured to select from among the two input channels to produce speech channel S40-1. In such case, selection among the two input channels may be based on one or more criteria such as highest SNR, greatest speech likelihood (e.g., as indicated by one or more statistical metrics), the current operating configuration of the communications device, and/or the direction from which the desired signal is determined to originate.

Figure 25:
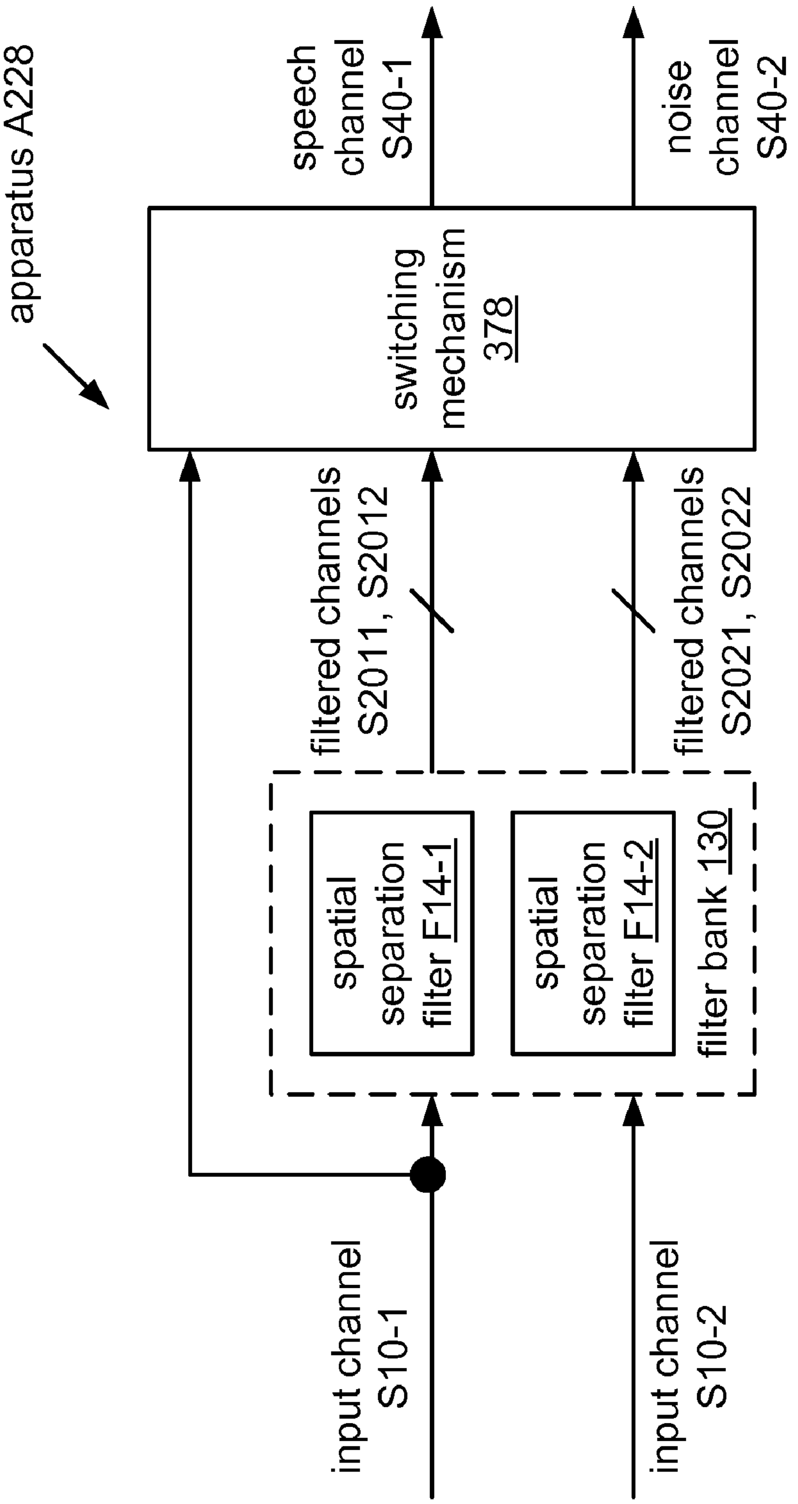
FIG. 25 shows a block diagram of an implementation A228 of apparatus A220.

FIG. 25 shows a block diagram of a related implementation A228 of apparatus A220 in which an implementation 378 of switching mechanism 370 is configured to receive one of the input channels (e.g., the channel associated with a primary microphone) and to output this channel as speech signal S40-1 when in a single-channel mode. The switching mechanism may be configured to select the single-channel mode when the estimated orientation state does not correspond to any of the n filters in the filter bank. For a two-filter implementation 130 of filter bank 120 and a triple of possible orientation states as shown in FIG. 5, for example, the switching mechanism may be configured to select single-channel mode when the estimated state S50 corresponds to area A3. From a design perspective, the single-channel mode may include cases in which none of the filters in the filter bank has been found to (or, alternatively, is expected to) produce a reliable spatial processing result. For example, the switching mechanism may be configured to select a single-channel mode when the state estimator cannot reliably determine that any of the spatial separation filters has separated a desired sound component into a corresponding filtered channel. In one such example, comparator 560 is configured to indicate selection of a single-channel mode for a case in which the difference between the separation measures does not exceed a minimum value.

Figure 26:
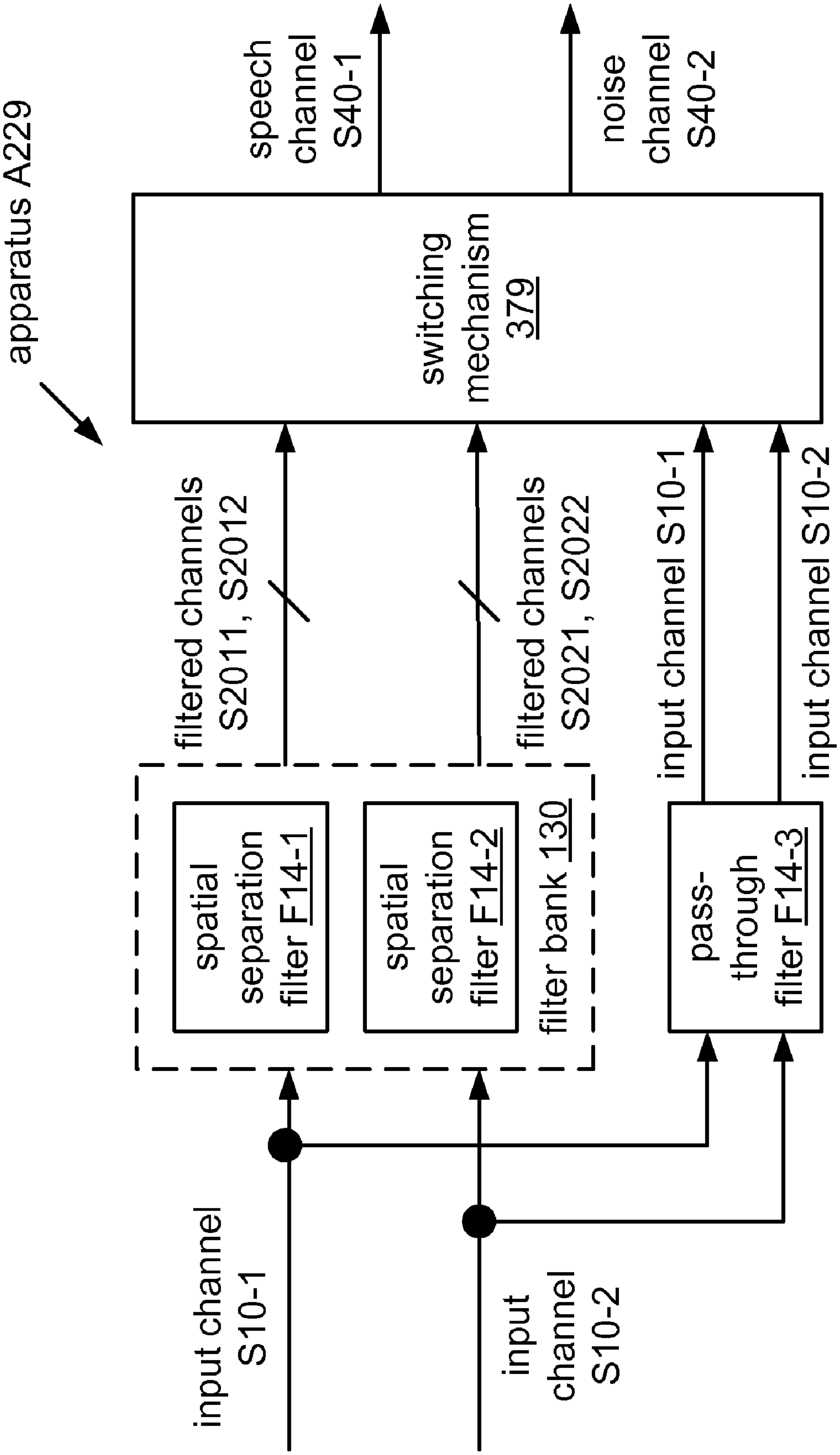
FIG. 26 shows a block diagram of an implementation A229 of apparatus A228.

For a case in which all of the filters of filter bank 100 are implemented using respective instances of the same structure, it may be convenient to implement a single-channel mode using another instance of this structure. FIG. 26 shows a block diagram of such an implementation A229 of apparatus A228. In this example, filters F14-1 and F14-2 are implemented using different instances of the same filter structure, and pass-through filter F14-3 is implemented using another instance of the same structure that is configured to pass input channels S10-1 and S10-2 without any spatial processing. For example, the filters of filter bank 100 are typically implemented using a cross-filter feedforward and/or feedback structure. In such case, a pass-through filter may be implemented using such a structure in which the coefficient values for all of the cross filters are zero. In a further example, pass-through filter F14-3 is implemented to block input channel S10-2 such that only input channel S10-1 is passed. Apparatus A229 also includes an implementation 379 of switching mechanism 378 that is configured to transition to and from the channels produced by pass-through filter F14-3 in the same manner as for the other filtered channels S2011, S2012, S2021, and S2022 (e.g., based on estimated state indication S50).

Uncorrelated noise may degrade the performance of a spatial processing system. For example, amplification of uncorrelated noise may occur in a spatial processing filter due to white noise gain. Uncorrelated noise is particular to less than all of (e.g., to one of) the microphones or sensors and may include noise due to wind, scratching (e.g., of the user's fingernail), breathing or blowing directly into a microphone, and/or sensor or circuit noise. Such noise tends to appear in low frequencies especially. It may be desirable to implement apparatus A200 to turn off or bypass the spatial separation filters (e.g., to go to a single-channel mode) when uncorrelated noise is detected and/or to remove the uncorrelated noise from the affected input channel(s) with a highpass filter.

Figure 27:
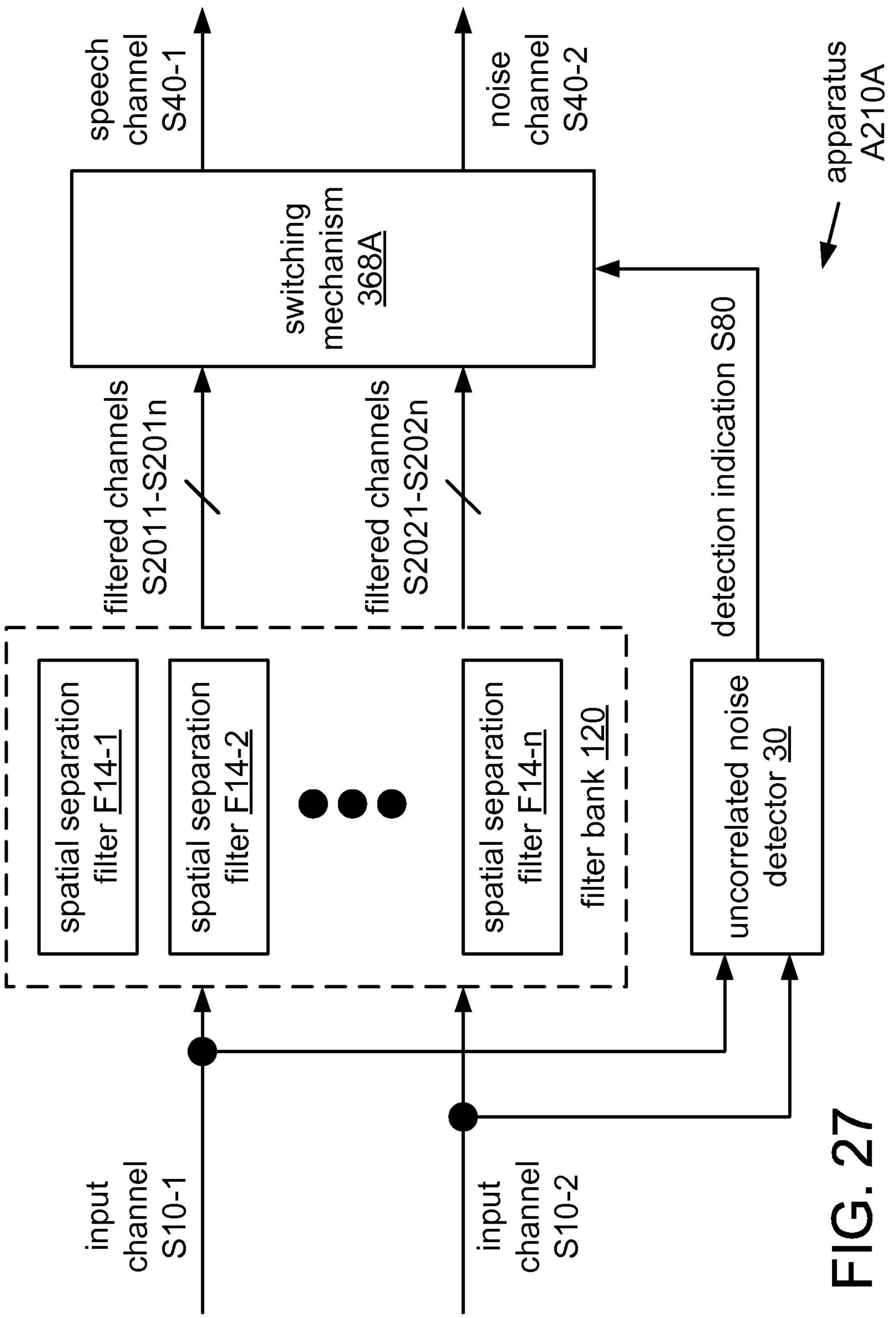
FIG. 27 shows a block diagram of an implementation A210A of apparatus A210.

FIG. 27 shows a block diagram of an implementation A210A of apparatus A210 that includes an uncorrelated noise detector 30 configured to detect noise that is uncorrelated among the input channels. Uncorrelated noise detector 30 may be implemented according to any of the configurations disclosed in U.S. patent application Ser. No. 12/201,528, filed Aug. 29, 2008, entitled "SYSTEMS, METHODS, AND APPARATUS FOR DETECTION OF UNCORRELATED COMPONENT," which is hereby incorporated by reference for purposes limited to disclosure of detection of uncorrelated noise and/or response to such detection. In this example, apparatus A210A includes an implementation 368A of switching mechanism 368 that is configured to enter a single-channel mode as described above when uncorrelated noise detector 30 indicates the presence of uncorrelated noise (e.g., via detection indication S80, which may be binary-valued). As an alternative to (or in addition to) the use of a single-channel mode, apparatus A210A may be configured to remove uncorrelated noise using an adjustable highpass filter on one or more of the input channels, such that the filter is activated only when uncorrelated noise is detected in the channel or channels.

Figure 28:
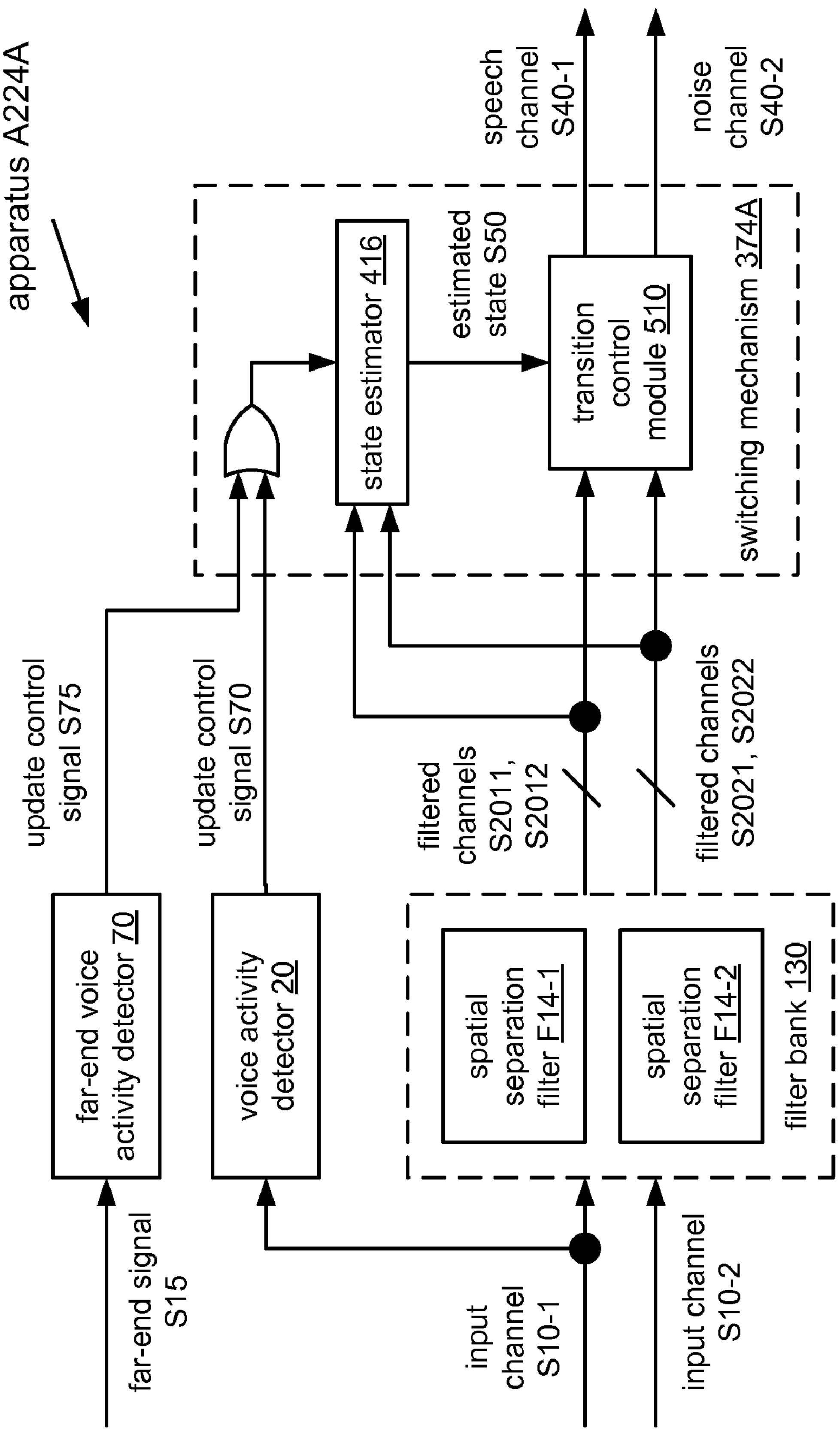
FIG. 28 shows a block diagram of an implementation A224A of apparatus A220.

In transceiver applications for voice communications (e.g., telephony), the term "near-end" is used to indicate the signal that is received as audio (e.g., from the microphones) and transmitted by the communications device, and the term "far-end" is used to indicate the signal that is received by the communications device and reproduced as audio (e.g., via one or more loudspeakers of the device). It may be desirable to modify the operation of an implementation of apparatus A200 in response to far-end signal activity. Especially during full-duplex speakerphone mode or in a headset, for example, far-end signal activity as reproduced by the loudspeakers of the device may be picked up by microphones of the device to appear on input signal S10 and eventually to distract the orientation state estimator. In such a case, it may be desirable to suspend updates to the estimated state during periods of far-end signal activity. FIG. 28 shows a block diagram of an implementation A224A of apparatus A224 that includes an instance 70 of voice activity detector (VAD) 20 on the far-end audio signal S15 (e.g., as received from a receiver portion of the communications device). For a handset, VAD 70 may be activated during full-duplex speakerphone mode and/or when secondary speaker SP20 is active, and the update control signal S75 it produces may be used to control the switching mechanism to disable changes to the output of the state estimator when the VAD indicates far-end speech activity. FIG. 28 shows a particular implementation 374A of switching mechanism 374 that is configured to suspend updates of estimated state S50 when at least one of VAD 20 and VAD 70 indicates speech activity. For a headset, VAD 70 may be activated during normal operation (e.g., unless a primary speaker of the device is muted).

It may be desirable to configure one or more of the spatial separation filters F10-1 to F10-*n* to process a signal having fewer than M channels. For example, it may be desirable to configure one or more (and possibly all) of the spatial separation filters to process only a pair of the input channels, even for a case in which M is greater than two. One possible reason for such a configuration would be for the resulting implementation of apparatus A200 to be tolerant to failure of one or more of the M microphones. Another possible reason is that, in some operating configurations of the communications device, apparatus A200 may be configured to deactivate or otherwise disregard one or more of the M microphones.

Figure 29:
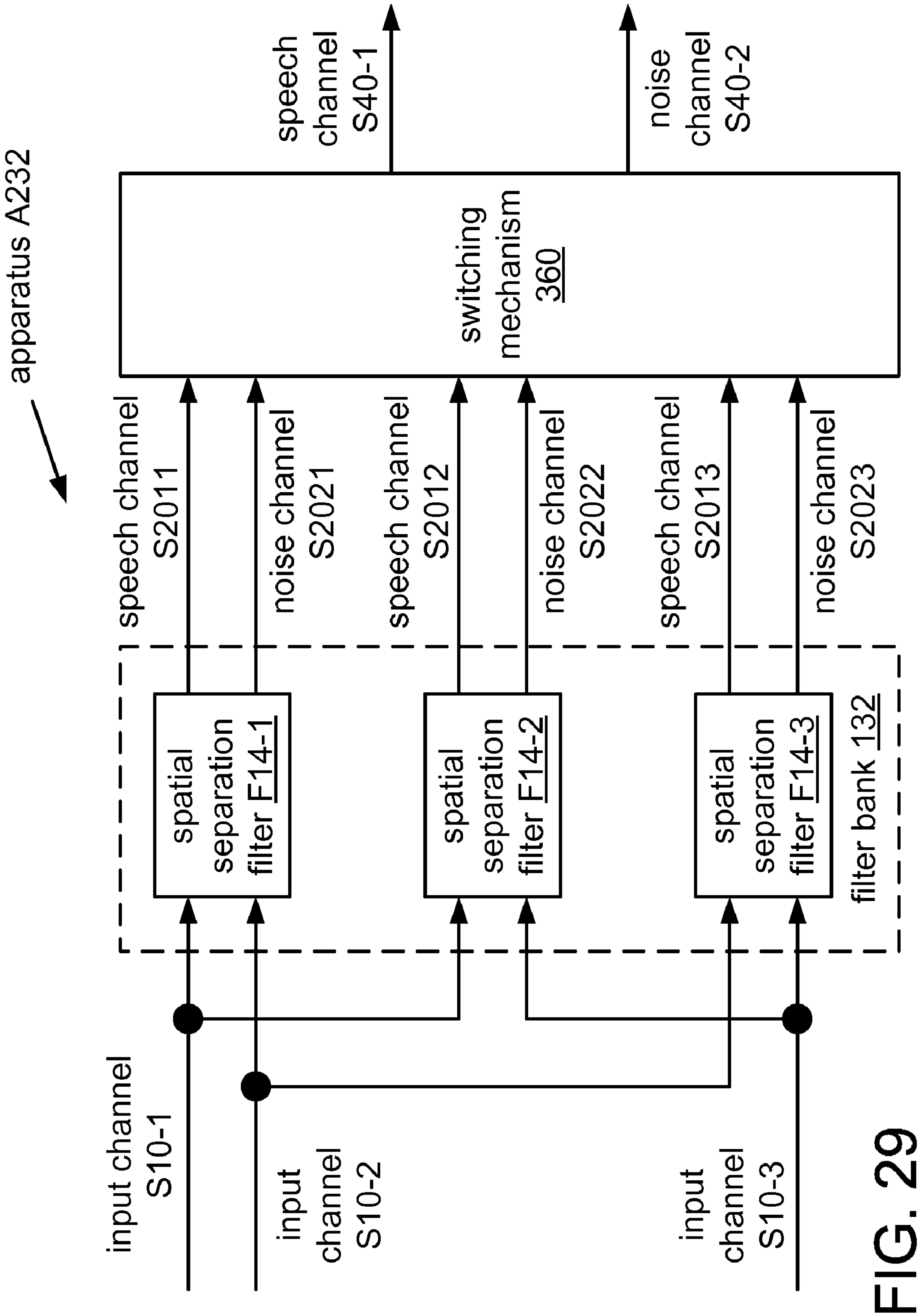
FIG. 29 shows a block diagram of an implementation A232 of apparatus A220.
Figure 30:
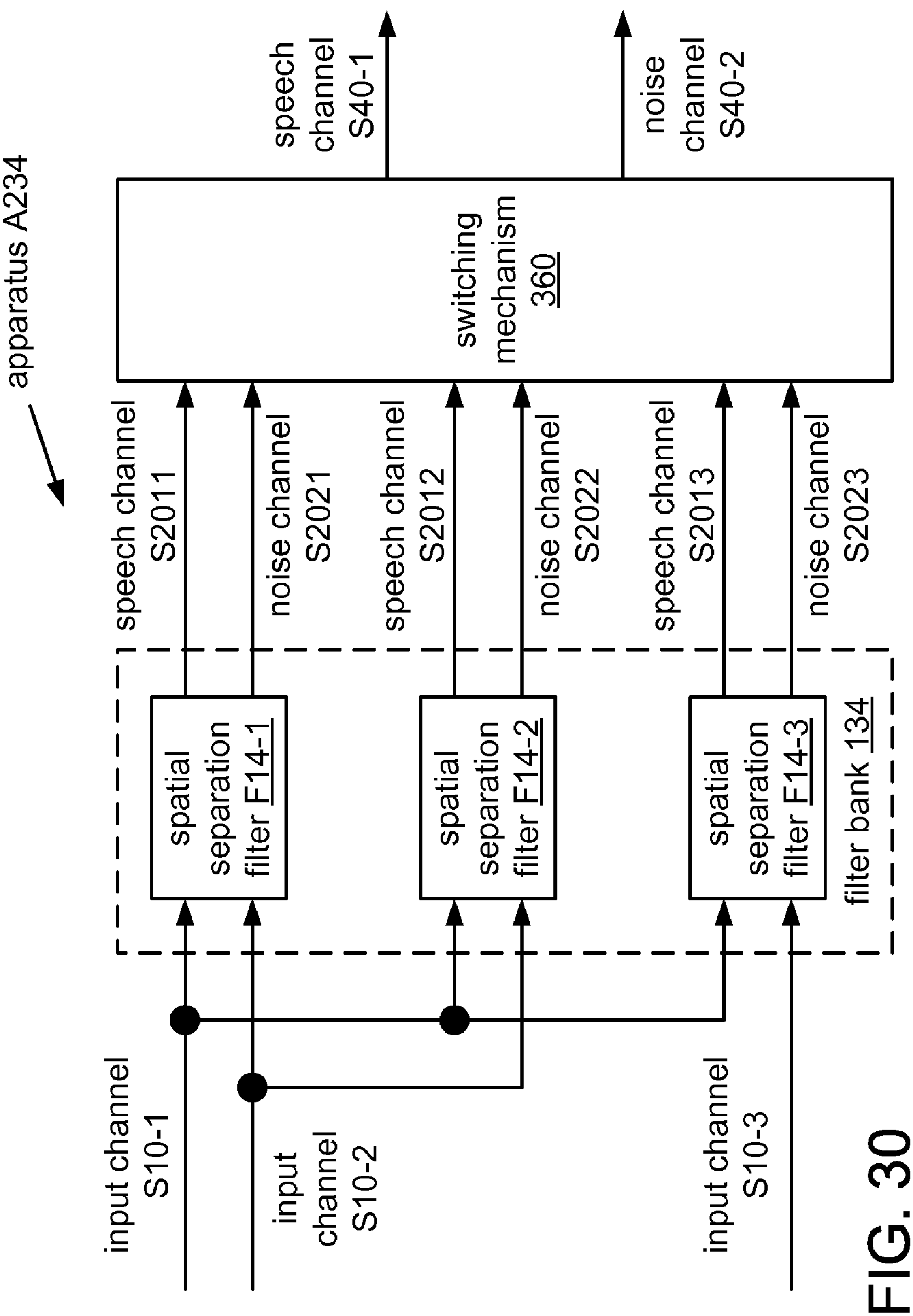
FIG. 30 shows a block diagram of an implementation A234 of apparatus A220.
Figure 31:
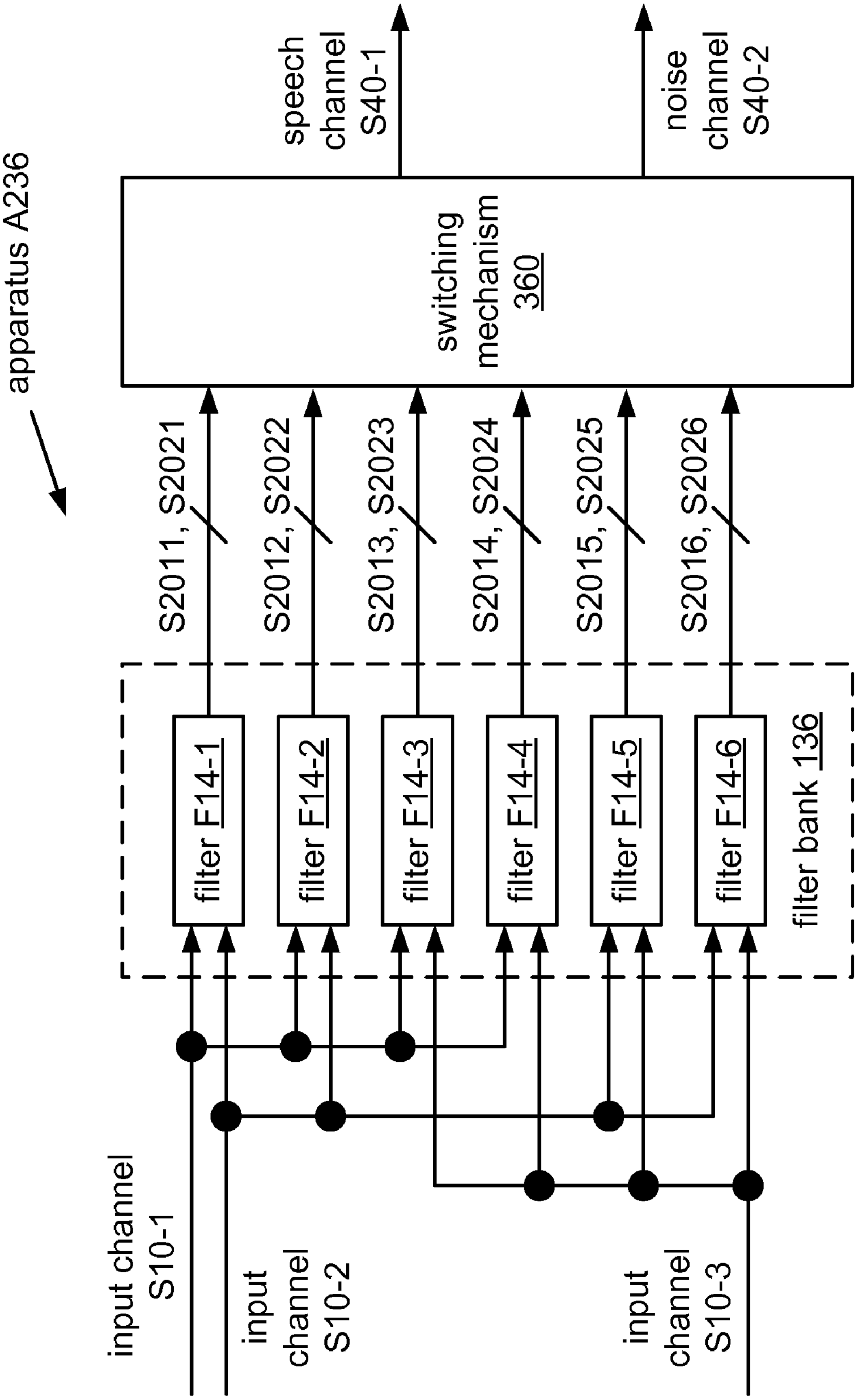
FIG. 31 shows a block diagram of an implementation A236 of apparatus A220.

FIGS. 29 and 30 show two implementations of apparatus A200 in which M is equal to three and each of the filters F14-1, F14-2, and F14-3 is configured to process a pair of input channels. FIG. 29 shows a block diagram of an apparatus A232 in which each of filters F14-1, F14-2, and F14-3 is arranged to process a different pair of the three input channels S10-1, S10-2, and S10-3. FIG. 30 shows a block diagram of an apparatus A234 in which filters F14-1 and F14-2 are arranged to process the input channels S10-1 and S10-2 and filter F14-3 is arranged to process the input channels S10-1 and S10-3. FIG. 31 shows a block diagram of an implementation A236 of apparatus A200 in which each of the filters F14-1 to F14-6 is configured to process a pair of input channels.

In apparatus A234, switching mechanism 360 may be configured to select one among filters F14-1 and F14-2 for an operating configuration in which a microphone corresponding to input channel S10-3 is muted or faulty, and to select one among filters F14-1 and F14-3 otherwise. For a case in which a particular pair of the input channels S10-1 to S10-3 is selected in apparatus A236 (e.g., based on the current operating configuration, or in response to failure of the microphone associated with the other input channel), switching mechanism 360 may be configured to select from among only the two states corresponding to the filters F14-1 to F14-6 which receive that pair of input channels.

In certain operating modes of a communication device, selection of a pair among three or more input channels may be performed based at least partially on heuristics. In a conventional telephone mode as depicted in FIG. 2, for example, the phone is typically held in a constrained manner with limited variability, such that fixed selection of a pair of input channels may be adequate. In a speakerphone mode as depicted in FIGS. 3A and 3B or FIGS. 4A and 4B, however, many holding patterns are possible, such that dynamic selection of a pair of input channels may be desirable to obtain sufficient separation in all expected usage orientations.

During the lifetime of a communications device, one or more of the microphone elements may become damaged or may otherwise fail. As noted above, it may be desirable for apparatus A200 to be tolerant to failure of one or more of the microphones. Switching mechanism 360 may be configured with multiple state estimation schemes, each corresponding to a different subset of the input channels. For example, it may be desirable to provide state estimation logic for each of the various expected fault scenarios (e.g., for every possible fault scenario).

It may be desirable to implement state estimator 400 to produce estimated state indication S50 by mapping a value of an indicator function to a set of possible orientation states. In a two-filter implementation A220 of apparatus A200, for example, it may be desirable to compress the separation measures into a single indicator and to map the value of that indicator to a corresponding one of a set of possible orientation states. One such method includes calculating a separation measure for each filter, using the two measures to evaluate an indicator function, and mapping the indicator function value to the set of possible states.

Any separation measure may be used, including those discussed above with reference to FIGS. 14A-14D (e.g., energy difference, correlation, TDOA). In one example, each of the separation measures $Z_1$ and $Z_2$ for the respective spatial separation filters F14-1 and F14-2 of filter bank 130 is calculated as the difference between the energies of the filter's outputs, where the energy for each channel may be calculated as the sum of squared samples over a twenty-millisecond frame: $Z_1=e_{11}-e_{12}$, $Z_2=e_{21}-e_{22}$, where $e_{11}$, $e_{12}$, $e_{21}$, $e_{22}$ denote the energies of channels S2011, S2021, S2012, and S2022, respectively, over the corresponding frame. The indicator function may then be calculated as a difference between the two separation measures, e.g. $Z_1$-$Z_2$.

Before evaluating the indicator function, it may be desirable to scale each separation measure according to one or more of the corresponding filter input channels. For example, it may be desirable to scale each of the measures $Z_1$ and $Z_2$ according to a factor such as the sum of the values of one of the following expressions over the corresponding frame: $|x_1|$, $|x_2|$, $|x_1|+|x_2|$, $|x_1+x_2|$, $|x_1x_2|$, where $x_1$, $x_2$ denote the values of input channels S10-1 and S10-2, respectively.

It may be desirable to use different scale factors for the separation measures. In one such example, filter F14-1 corresponds to an orientation state in which the desired sound is directed more at the microphone corresponding to channel S10-1, and filter F14-2 corresponds to an orientation state in which the desired sound is directed more at the microphone corresponding to channel S10-2. In this case, it may be desirable to scale the separation measure $Z_1$ according to a factor based on the sum of $|x_1|$ over the frame and to scale the separation measure $Z_2$ according to a factor based on the sum of ..$x_2$| over the frame. In this example, the separation measure $Z_1$ may be calculated according to an expression such as $$Z_1 = \frac{e_{11} - e_{12}}{\sum |x_1|},$$

and the separation measure $Z_2$ may be calculated according to an expression such as $$Z_2 = \frac{e_{21} - e_{22}}{\sum |x_2|}.$$

It may be desirable for the scale factor to influence the value of the separation measure more in one direction than the other. In the case of a separation measure that is based on a maximum difference, for example, it may be desirable for the scale factor to reduce the value of the separation measure in response to a high input channel volume, without unduly increasing the value of the separation measure when the input volume is low. (In the case of a separation measure that is based on a minimum difference, the opposite effect may be desired.) In one such example, the separation measures $Z_1$ and $Z_2$ are calculated according to expressions such as the following:

$$Z_1 = \frac{e_{11} - e_{12}}{\beta_1},$$
$$Z_2 = \frac{e_{21} - e_{22}}{\beta_2},$$
$$\text{where } \beta_1 = \max\left(\frac{\Sigma|x_1|}{T_s}, 1\right),$$
$$\beta_2 = \max\left(\frac{\Sigma|x_2|}{T_s}, 1\right),$$

and $T_s$ is a threshold value.

Figure 32A:
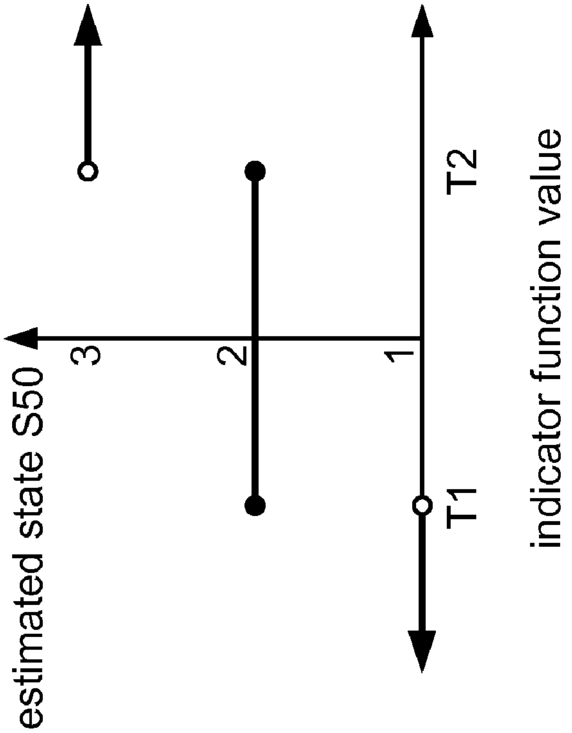
FIGS. 32A and 32B show two different mappings of an indicator function value to estimated state S50.
Figure 32B:
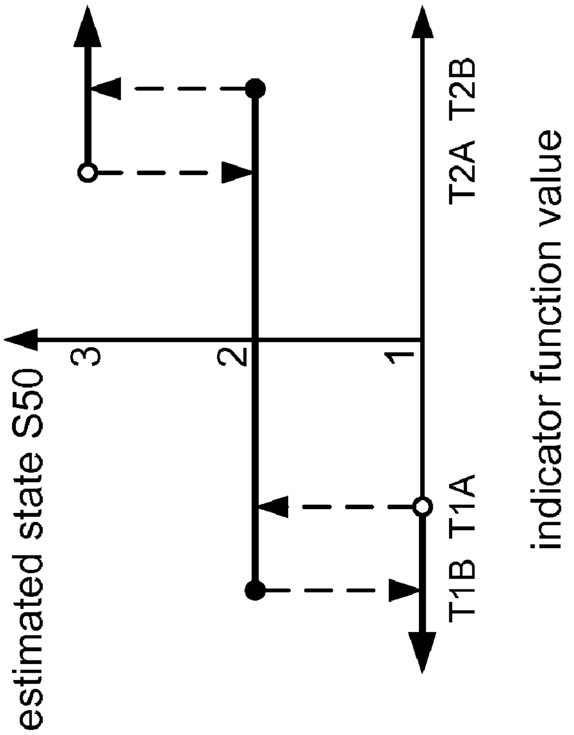

FIG. 32A shows one example of mapping the indicator function value (e.g., $Z_1$-$Z_2$) to a set of three possible orientation states. If the value is below a first threshold T1, state 1 is selected (corresponding to a first filter). If the value is above a second threshold T2, state 3 is selected (corresponding to a second filter). If the value is between the thresholds, state 3 is selected (corresponding to neither filter, i.e. a single-channel mode). In a typical case, the threshold values T1 and T2 have opposite polarities. FIG. 32B shows another example of such a mapping in which different threshold values T1A, T1B and T2A, T2B are used to control transitions between states depending upon which direction the transition is progressing. Such a mapping may be used to reduce jitter due to small changes in orientation and/or to reduce unnecessary state transitions in overlap areas.

An indicator function scheme as discussed above may also be extended to three-channel (or M-channel) implementations of apparatus A200 by, for example, processing each pair of channels in such a manner to obtain a selected state for that pair, and then choosing the state having the most votes overall.

As noted above, filter bank 130 may be implemented such that the coefficient value matrix of filter F14-2 is flipped with respect to the corresponding coefficient value matrix of filter F14-1. In this particular case, an indicator function value as discussed above may be calculated according to an expression such as $$\frac{e_{11} - e_{12}}{\beta_1},$$

where $\beta_1$ has the value indicated above.

Figure 33A:
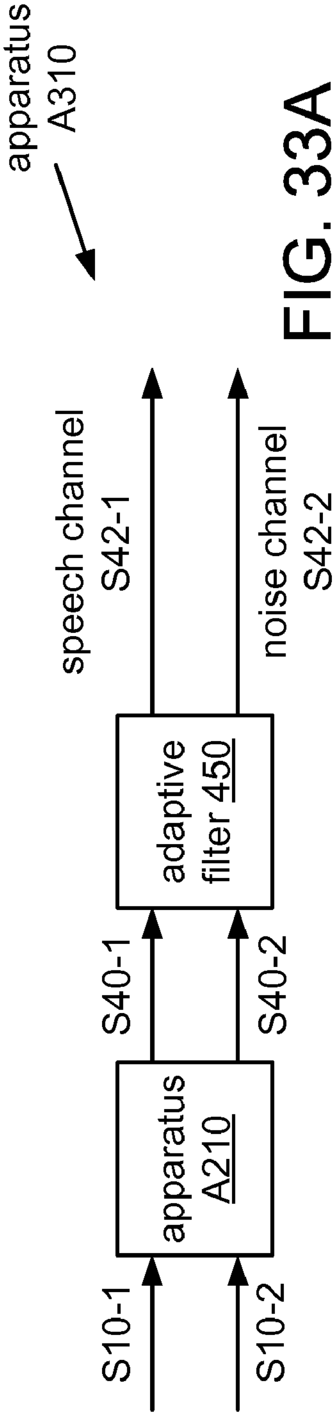
FIGS. 33A-C shows block diagrams of implementations A310, A320, and A330, respectively, of apparatus A200.

FIG. 33A shows a block diagram of an implementation A310 of apparatus A200 that combines apparatus A210 with an adaptive filter 450 configured to perform additional spatial processing of output signal S40 (e.g., further separation of speech and noise components) to produce a further output signal S42. It may be desirable to implement adaptive filter 450 to include a plurality of adaptive filters, such that each of these component filters corresponds to one of the filters in filter bank 120 and is selectable according to estimated state indication S50. For example, such an implementation of adaptive filter 450 may include a selecting or mixing mechanism analogous to transition control module 500 that is configured to select the output of one of the component filters as signal S42, and/or to mix the outputs of two or more of the component filters during a merge interval to obtain signal S42, according to estimated state indication S50.

Adaptive filter 450 (or one or more, possibly all, of the component filters thereof) may be configured according to one or more BSS, beamforming, and/or combined BSS/beamforming methods as described herein, or according to any other method suitable for the particular application. It may be desirable to configure adaptive filter 450 with a set of initial conditions. For example, it may be desirable for at least one of the component filters to have a non-zero initial state. Such a state may be calculated by training the component filter to a state of convergence on a filtered signal that is obtained by using the corresponding filter of filter bank 120 to filter a set of training signals. In a typical production application, reference instances of the component filter and of the corresponding filter of filter bank 120 are used to generate the initial state (i.e., the set of initial values of the filter coefficients), which is then stored to the component filter of adaptive filter 450. Generation of initial conditions is also described in U.S. patent application Ser. No. 12/197,924, filed Aug. 25, 2008, entitled "SYSTEMS, METHODS, AND APPARATUS FOR SIGNAL SEPARATION," at paragraphs [00130]-[00134] (beginning with "For a configuration that includes" and ending with "during online operation"), which paragraphs are hereby incorporated by reference for purposes limited to disclosure of filter training. Generation of filter states via training is also described in more detail below.

Figure 33B:
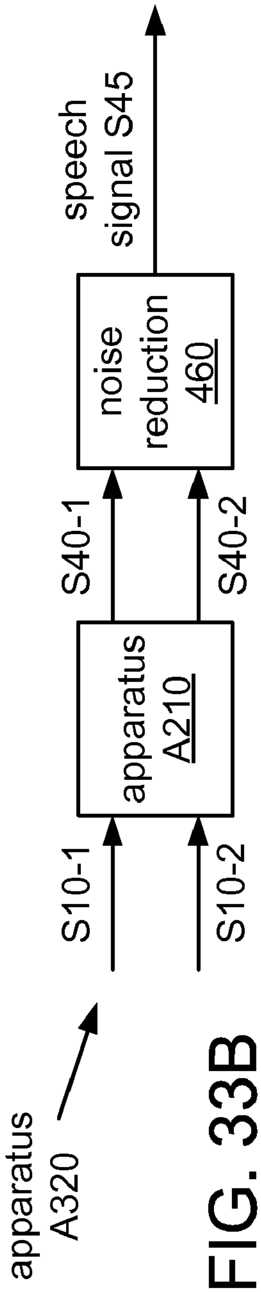

Apparatus A200 may also be implemented to include one or more stages arranged to perform spectral processing of the spatially processed signal. FIG. 33B shows a block diagram of an implementation A320 of apparatus A200 that combines apparatus A210 with a noise reduction filter 460. Noise reduction filter 460 is configured to apply the signal on noise channel S40-2 as a noise reference to reduce noise in speech signal S40-1 and produce a corresponding filtered speech signal S45. Noise reduction filter 460 may be implemented as a Wiener filter, whose filter coefficient values are based on signal and noise power information from the separated channels. In such case, noise reduction filter 460 may be configured to estimate the noise spectrum based on the noise reference (or on the one or more noise references, for a more general case in which output channel S40 has more than two channels). Alternatively, noise reduction filter 460 may be implemented to perform a spectral subtraction operation on the speech signal, based on a spectrum from the one or more noise references. Alternatively, noise reduction filter 460 may be implemented as a Kalman filter, with noise covariance being based on the one or more noise references.

Figure 33C:
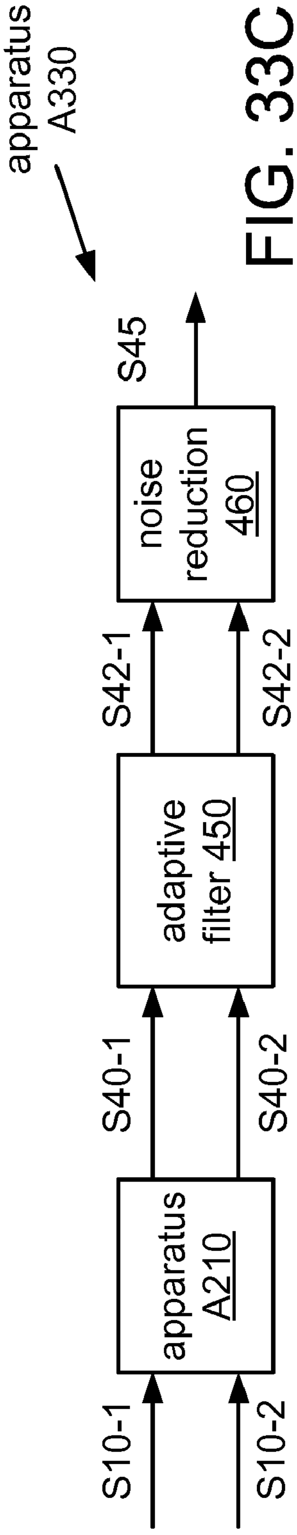

It may be desirable to configure noise reduction filter 460 to estimate noise characteristics, such as spectrum and or covariance, during non-speech intervals only. In such case, noise reduction filter 460 may be configured to include a voice activity detection (VAD) operation, or to use a result of such an operation otherwise performed within the apparatus or device, to disable estimation of noise characteristics during speech intervals (alternatively, to enable such estimation only during noise-only intervals). FIG. 33C shows a block diagram of an implementation A330 of apparatus A310 and A320 that includes both adaptive filter 450 and noise reduction filter 460. In this case, noise reduction filter 460 is arranged to apply the signal on noise channel S42-2 as a noise reference to reduce noise in speech signal S42-1 to produce filtered speech signal S45.

It may be desirable for an implementation of apparatus A200 to reside within a communications device such that other elements of the device are arranged to perform further audio processing operations on output signal S40 or S45. In this case, it may be desirable to account for possible interactions between apparatus A200 and any other noise reduction elements of the device, such as an implementation of a single-channel noise reduction module (which may be included, for example, within a baseband portion of a mobile station modem (MSM) chip or chipset).

It may be desirable in such cases to adjust the amount and/or the quality of the residual background noise. For example, the multichannel filters of apparatus A200 may be overly aggressive with respect to the expected noise input level of the single-channel noise reduction module. Depending on the amplitude and/or spectral signature of the noise remaining in output signal S40, the single-channel noise reduction module may introduce more distortion (e.g., a rapidly varying residual, musical noise). In such cases, it may be desirable to add some filtered comfort noise to output signal S40 and/or to adjust one or more parameter settings in response to the output of the combined noise reduction scheme.

Single-channel noise-reduction methods typically require acquisition of some extended period of noise and voice data to provide the reference information used to support the noise reduction operation. This acquisition period tends to introduce delays in observable noise removal. In comparison to such methods, the multichannel methods presented here can provide relatively instant noise reduction due to the separation of user's voice from the background noise. Therefore it may be desirable to optimize timing of the application of aggressiveness settings of the multichannel processing stages with respect to dynamic features of a single-channel noise reduction module.

It may be desirable to perform parameter changes in subsequent processing stages in response to changes in estimated state indication S50. It may also be desirable for apparatus A200 to initiate changes in timing cues and/or hangover logic that may be associated with a particular parameter change and/or estimated orientation state. For example, it may be desirable to delay an aggressive post-processing stage for some period after a change in estimated state indication S50, as a certain extended estimation period may help to ensure sufficient confidence in state estimation knowledge.

Figure 34:
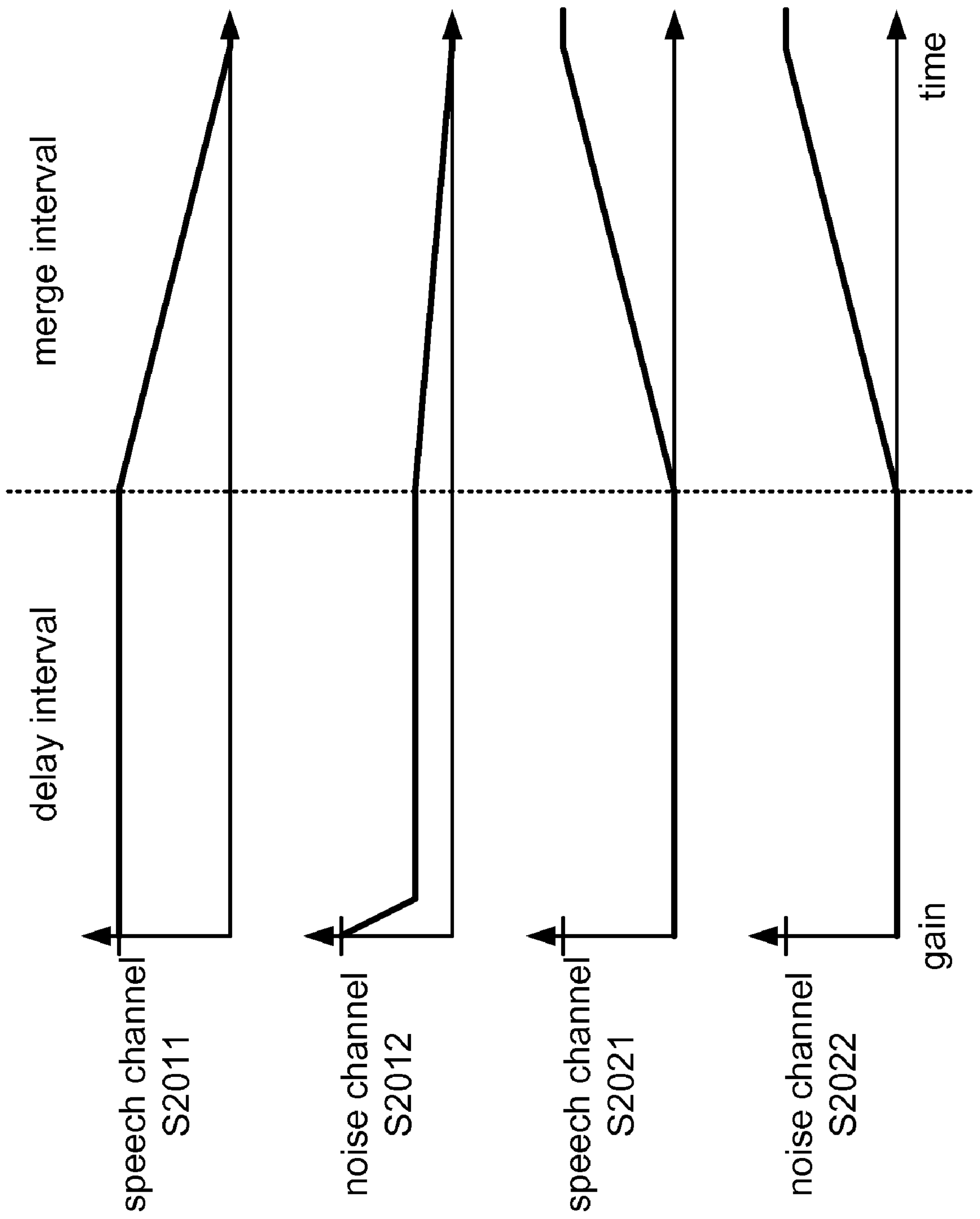
FIG. 34 illustrates one example of an attenuation scheme.

When the orientation state changes, the current noise reference may no longer be suitable for subsequent spatial and/or spectral processing operations, and it may be desirable to render these stages less aggressive during state transitions. For example, it may be desirable for switching mechanism 350 to attenuate the current noise channel output during a transition phase. Hangover logic 600 may be implemented to perform such an operation. In one such example, hangover logic 600 is configured to detect an inconsistency between the current and previous estimated states and, in response to such detection, to attenuate the current noise channel output (e.g., channel S40-2 of apparatus A210). Such attenuation, which may be gradual or immediate, may be substantial (e.g., by an amount in the range of from fifty or sixty percent to eighty or ninety percent, such as seventy-five or eighty percent). Transition into the new speech and noise channels (e.g., both at normal volume) may also be performed as described herein (e.g., with reference to transition control module 550). FIG. 34 shows relative gain levels over time for speech channels S2011, S2021 and noise channels S2012, S2022 for one example of such an attenuation scheme during a transition from channel pair S2011 and S2012 to channel pair S2021 and S2022.

It may also be desirable to control one or more downstream operations according to estimated state indication S50. For example, it may be desired to apply a corresponding set of initial conditions to a downstream adaptive filter (e.g., as shown in FIGS. 33A and 33C) according to estimated state indication S50. In such case, it may be desirable to select a component filter of adaptive filter 450 according to estimated state indication S50, as described above, and to reset the component filter to its initial state. During a transition from one set of initial conditions to another, or from one component filter to another, it may be desirable to attenuate the current noise channel output (e.g., S42-2) in a manner analogous to that described above with reference to hangover logic 600. During single-channel operation of apparatus A200, it may also be desirable to disable other spatial processing operations of the device, such as downstream adaptive spatial processing filters (e.g., as shown in FIGS. 33A-C).

Some sensitivity of the system noise reduction performance with respect to certain directions may be encountered (e.g., due to microphone placement on the communications device). It may be desirable to reduce such sensitivity by selecting an arrangement of the microphones that is suitable for the particular application and/or by using selective masking of noise intervals. Such masking may be achieved by selectively attenuating noise-only time intervals (e.g., using a VAD as described herein) or by adding comfort noise to enable a subsequent single-channel noise reduction module to remove residual noise artifacts.

Figure 35A:
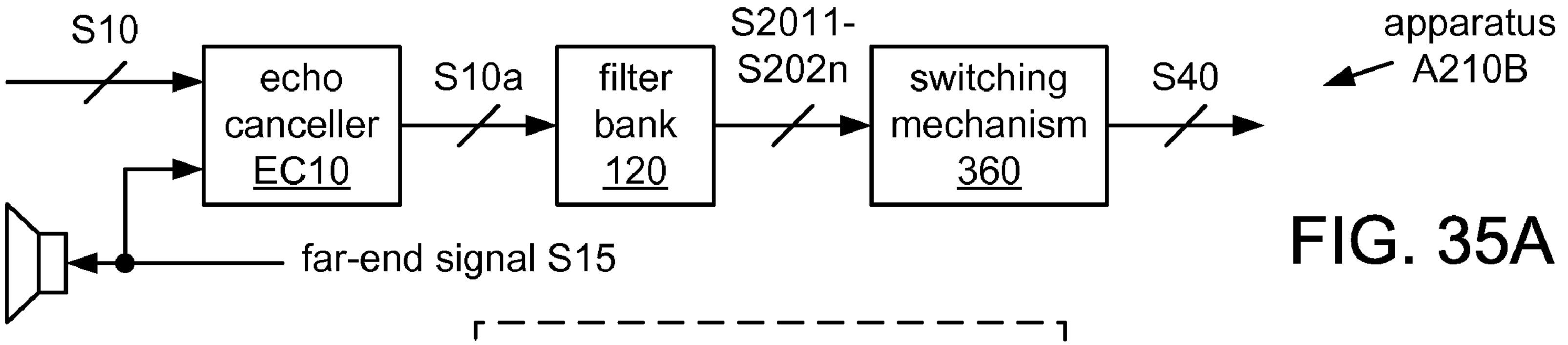
FIG. 35A shows a block diagram of an implementation A210B of apparatus A210.

FIG. 35A shows a block diagram of an implementation A210B of apparatus A200 that includes an echo canceller EC10 configured to cancel echoes from input signal S10 based on far-end audio signal S15. In this example, echo canceller EC10 produces an echo-cancelled signal S10*a* that is received as input by filter bank 120. Apparatus A200 may also be implemented to include an instance of echo canceller EC10 that is configured to cancel echoes from output signal S40 based on far-end audio signal S15. In either case, it may be desirable to disable echo canceller EC10 during operation of the communications device in a speakerphone mode and/or during operation of the communications device in a PTT mode.

Figure 35B:
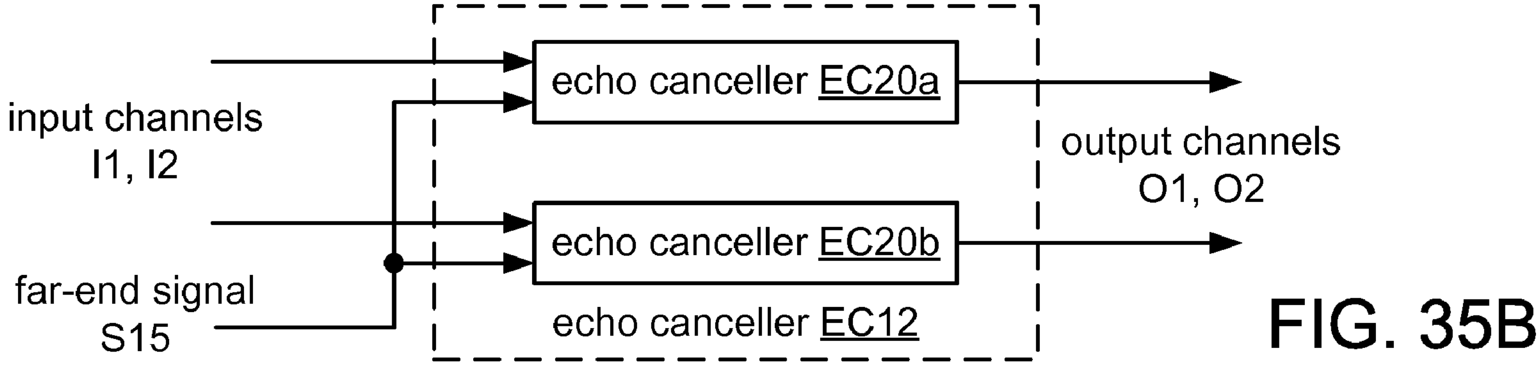
FIG. 35B shows a block diagram of an implementation EC12 of echo canceller EC10.

FIG. 35B shows a block diagram of an implementation EC12 of echo canceller EC10 which includes two instances EC20*a* and EC20*b* of a single-channel echo canceller EC20. In this example, each instance of echo canceller EC20 is configured to process one of a set of input channels J1, 12 to produce a corresponding one of a set of output channels O1, O2. The various instances of echo canceller EC20 may each be configured according to any technique of echo cancellation (for example, a least mean squares technique) that is currently known or is yet to be developed. For example, echo cancellation is discussed at paragraphs [00139]-[00141] of U.S. patent application Ser. No. 12/197,924 referenced above (beginning with "An apparatus" and ending with "B500"), which paragraphs are hereby incorporated by reference for purposes limited to disclosure of echo cancellation issues, including but not limited to design, implementation, and/or integration with other elements of an apparatus.

Figure 35C:
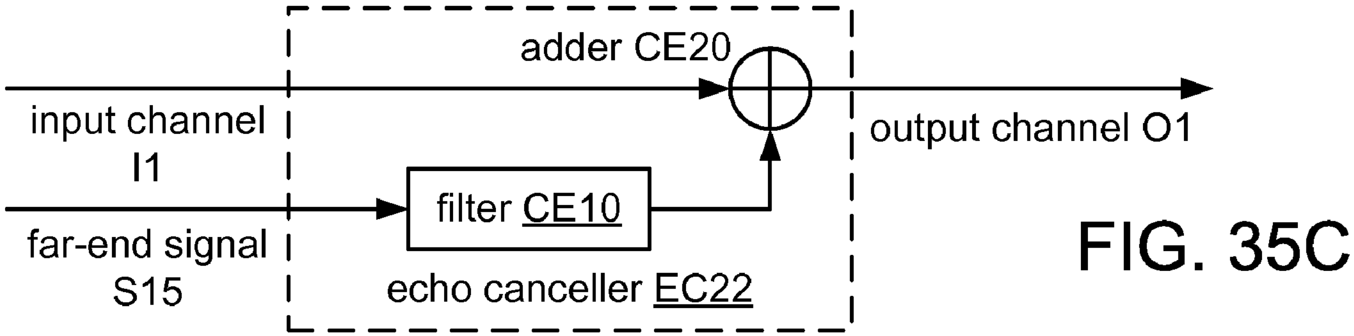
FIG. 35C shows a block diagram of an implementation EC22 of echo canceller EC20.

FIG. 35C shows a block diagram of an implementation EC22 of echo canceller EC20 that includes a filter CE10 arranged to filter far-end signal S15 and an adder CE20 arranged to combine the filtered far-end signal with the input channel being processed. The filter coefficient values of filter CE10 may be fixed and/or adaptive. It may be desirable to train a reference instance of filter CE10 (e.g., as described in more detail below) using a set of multichannel signals that are recorded by a reference instance of the communications device as it is reproduces a far-end audio signal.

It may be desirable for an implementation of apparatus A210B to reside within a communications device such that other elements of the device (e.g., a baseband portion of a mobile station modem (MSM) chip or chipset) are arranged to perform further audio processing operations on output signal S40. In designing an echo canceller to be included in an implementation of apparatus A200, it may be desirable to take into account possible synergistic effects between this echo canceller and any other echo canceller of the communications device (e.g., an echo cancellation module of the MSM chip or chipset).

Figure 36:
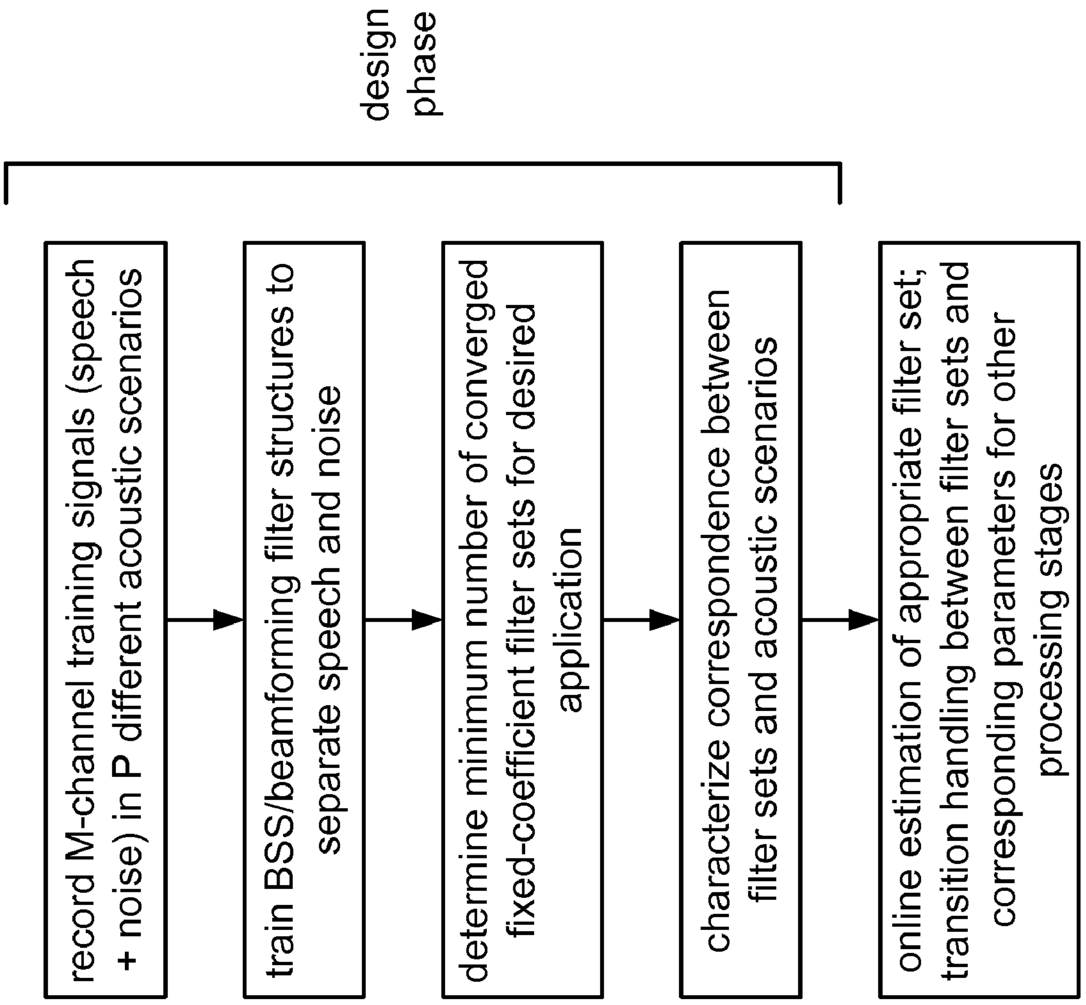
FIG. 36 shows a flowchart for a design and use procedure.

FIG. 36 shows a flowchart of a procedure that may be followed during the design and use of a device that includes an implementation of apparatus A200 as described herein (or apparatus A100 as described below). In the design phase, training data is used to determine fixed filter sets (e.g., the filter coefficient values of the filters of filter bank 100), and a corresponding user-handset state is characterized to enable online estimation (e.g., by a switching mechanism as described herein) of the current orientation state and selection of a fixed filter set that is appropriate for a current situation. The training data is a set of noisy speech samples that is recorded in various user-device acoustic scenarios using a reference instance of the communications device (e.g., a handset or headset). Before such recording (which may be performed in an anechoic chamber), it may be desirable to perform a calibration to make sure that the ratio of the gains of the M microphones of the reference device (which may vary with frequency) is within a desired range. Once the fixed filter sets have been determined using the reference device, they may be copied into production instances of the communications device that include an implementation of an apparatus as described herein.

Figure 37:
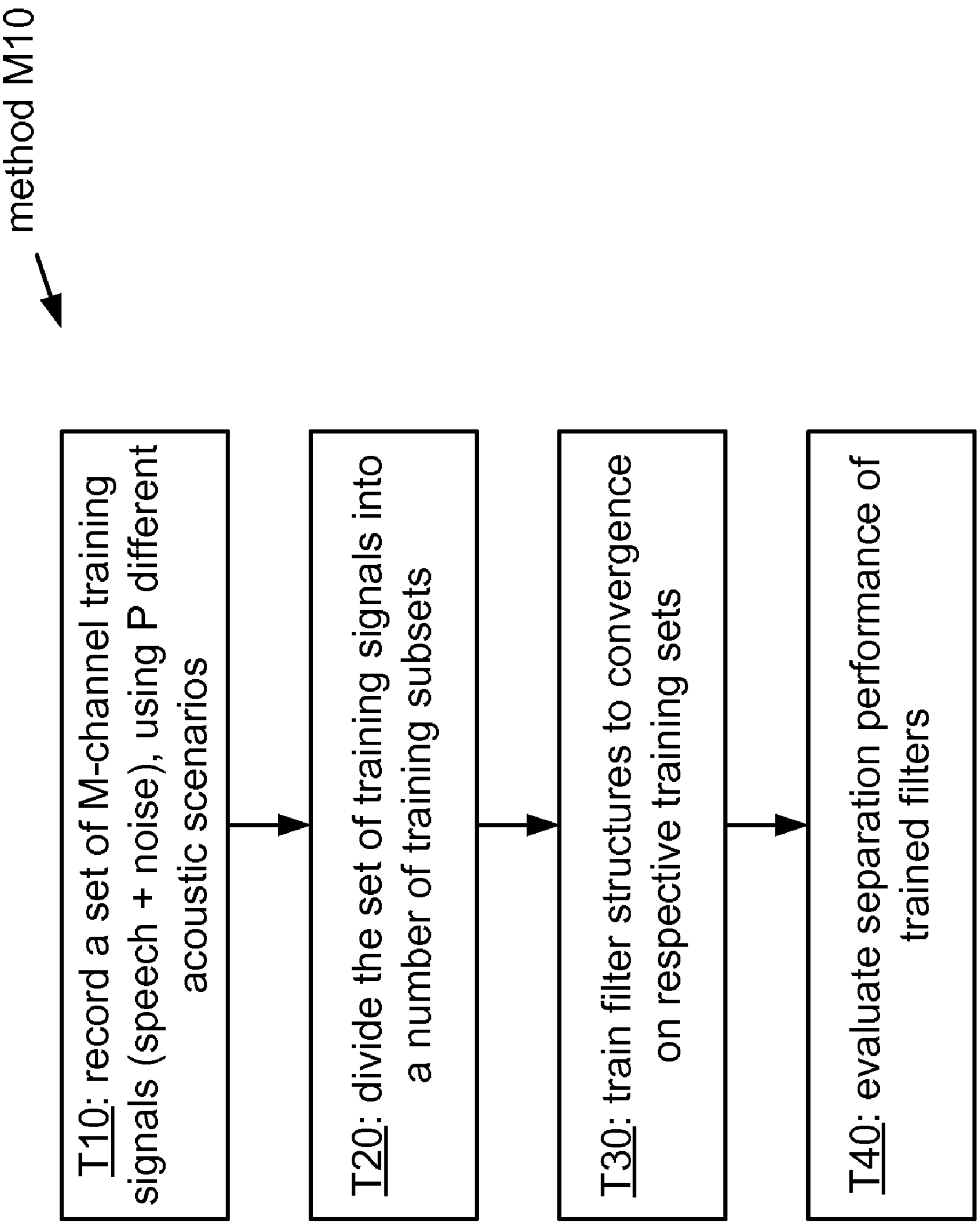
FIG. 37 shows a flowchart for a method M10.

FIG. 37 shows a flowchart of a design method M10 that may be used to obtain the coefficient values that characterize one or more of the spatial separation filters of filter bank 100. Method M10 includes a task T10 that records a set of multichannel training signals and a task T20 that divides the set of training signals into subsets. Method M10 also includes tasks T30 and T40. For each of the subsets, task T30 trains a corresponding spatial separation filter to convergence. Task T40 evaluates the separation performance of the trained filters. Tasks T20, T30, and T40 are typically performed outside the communications device, using a personal computer or workstation. One or more of the tasks of method M10 may be iterated until an acceptable result is obtained in task T40. The various tasks of method M10 are discussed in more detail below, and additional description of these tasks is found in U.S. patent application Ser. No. 12/197,924, filed Aug. 25, 2008, entitled "SYSTEMS, METHODS, AND APPARATUS FOR SIGNAL SEPARATION," which document is hereby incorporated by reference for purposes limited to the design, training, and/or evaluation of spatial separation filters.

Task T10 uses an array of at least K microphones to record a set of K-channel training signals, where K is an integer at least equal to M. Each of the training signals includes both speech and noise components, and each training signal is recorded under one of P scenarios, where P may be equal to two but is generally any integer greater than one. As described below, each of the P scenarios may comprise a different spatial feature (e.g., a different handset or headset orientation) and/or a different spectral feature (e.g., the capturing of sound sources which may have different properties). The set of training signals includes at least P training signals that are each recorded under a different one of the P scenarios, although such a set would typically include multiple training signals for each scenario.

Each of the set of K-channel training signals is based on signals produced by an array of K microphones in response to at least one information source and at least one interference source. It may be desirable, for example, for each of the training signals to be a recording of speech in a noisy environment. Each of the K channels is based on the output of a corresponding one of the K microphones. The microphone signals are typically sampled, may be pre-processed (e.g., filtered for echo cancellation, noise reduction, spectrum shaping, etc.), and may even be pre-separated (e.g., by another spatial separation filter or adaptive filter as described herein). For acoustic applications such as speech, typical sampling rates range from 8 kHz to 16 kHz.

It is possible to perform task T10 using the same communications device that contains the other elements of apparatus A200 as described herein. More typically, however, task T10 would be performed using a reference instance of a communications device (e.g., a handset or headset). The resulting set of converged filter solutions produced by method M10 would then be loaded into other instances of the same or a similar communications device during production (e.g., into flash memory of each such production instance).

In such case, the reference instance of the communications device (the "reference device") includes the array of K microphones. It may be desirable for the microphones of the reference device to have the same acoustic response as those of the production instances of the communications device (the "production devices"). For example, it may be desirable for the microphones of the reference device to be the same model or models, and to be mounted in the same manner and in the same locations, as those of the production devices. Moreover, it may be desirable for the reference device to otherwise have the same acoustic characteristics as the production devices. It may even be desirable for the reference device to be as acoustically identical to the production devices as they are to one another. For example, it may be desirable for the reference device to be the same device model as the production devices. In a practical production environment, however, the reference device may be a pre-production version that differs from the production devices in one or more minor (i.e., acoustically unimportant) aspects. In a typical case, the reference device is used only for recording the training signals, such that it may not be necessary for the reference device itself to include the elements of apparatus A200.

The same K microphones may be used to record all of the training signals. Alternatively, it may be desirable for the set of K microphones used to record one of the training signals to differ (in one or more of the microphones) from the set of K microphones used to record another of the training signals. For example, it may be desirable to use different instances of the microphone array in order to produce a plurality of filter coefficient values that is robust to some degree of variation among the microphones. In one such case, the set of K-channel training signals includes signals recorded using at least two different instances of the reference device.

Each of the P scenarios includes at least one information source and at least one interference source. Typically each information source is a loudspeaker reproducing a speech signal or a music signal, and each interference source is a loudspeaker reproducing an interfering acoustic signal, such as another speech signal or ambient background sound from a typical expected environment, or a noise signal. The various types of loudspeaker that may be used include electrodynamic (e.g., voice coil) speakers, piezoelectric speakers, electrostatic speakers, ribbon speakers, planar magnetic speakers, etc. A source that serves as an information source in one scenario or application may serve as an interference source in a different scenario or application. Recording of the input data from the K microphones in each of the P scenarios may be performed using an K-channel tape recorder, a computer with K-channel sound recording or capturing capability, or another device capable of capturing or otherwise recording the output of the K microphones simultaneously (e.g., to within the order of a sampling resolution).

Figure 38:
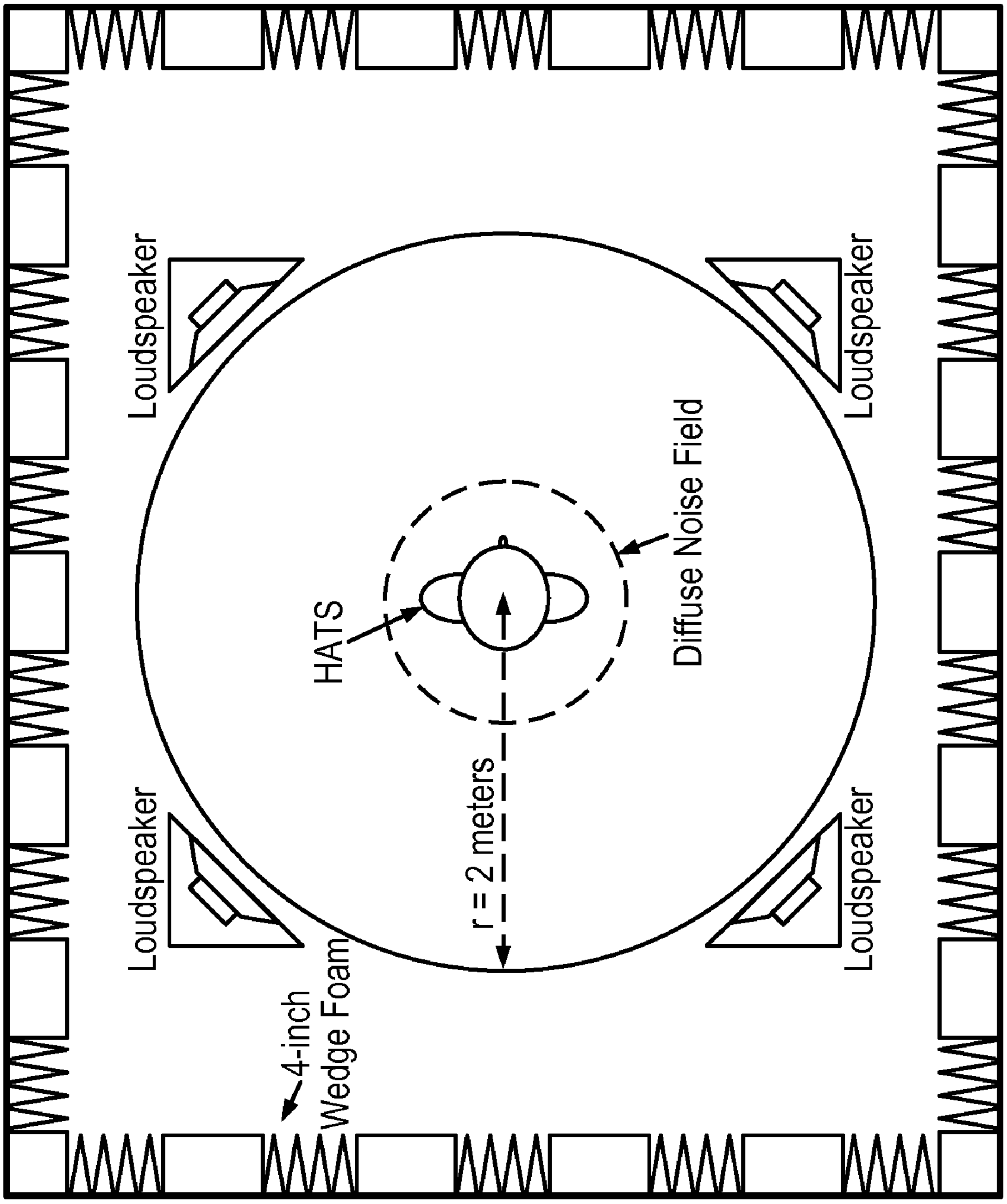
FIG. 38 shows an example of an acoustic anechoic chamber configured for recording of training data.

An acoustic anechoic chamber may be used for recording the set of K-channel training signals. FIG. 38 shows an example of an acoustic anechoic chamber configured for recording of training data. In this example, a Head and Torso Simulator (HATS, as manufactured by Bruel & Kjaer, Naerum, Denmark) is positioned within an inward-focused array of interference sources (i.e., the four loudspeakers). The HATS head is acoustically similar to a representative human head and includes a loudspeaker in the mouth for reproducing a speech signal. The array of interference sources may be driven to create a diffuse noise field that encloses the HATS as shown. In one such example, the array of loudspeakers is configured to play back noise signals at a sound pressure level of 75 to 78 dB at the HATS ear reference point or mouth reference point. In other cases, one or more such interference sources may be driven to create a noise field having a different spatial distribution (e.g., a directional noise field).

Types of noise signals that may be used include white noise, pink noise, grey noise, and Hoth noise (e.g., as described in IEEE Standard 269-2001, "Draft Standard Methods for Measuring Transmission Performance of Analog and Digital Telephone Sets, Handsets and Headsets," as promulgated by the Institute of Electrical and Electronics Engineers (IEEE), Piscataway, N.J.). Other types of noise signals that may be used include brown noise, blue noise, and purple noise.

The P scenarios differ from one another in terms of at least one spatial and/or spectral feature. The spatial configuration of sources and microphones may vary from one scenario to another in any one or more of at least the following ways: placement and/or orientation of a source relative to the other source or sources, placement and/or orientation of a microphone relative to the other microphone or microphones, placement and/or orientation of the sources relative to the microphones, and placement and/or orientation of the microphones relative to the sources. At least two among the P scenarios may correspond to a set of microphones and sources arranged in different spatial configurations, such that at least one of the microphones or sources among the set has a position or orientation in one scenario that is different from its position or orientation in the other scenario. For example, at least two among the P scenarios may relate to different orientations of a portable communications device, such as a handset or headset having an array of K microphones, relative to an information source such as a user's mouth. Spatial features that differ from one scenario to another may include hardware constraints (e.g., the locations of the microphones on the device), projected usage patterns of the device (e.g., typical expected user holding poses), and/or different microphone positions and/or activations (e.g., activating different pairs among three or more microphones).

Spectral features that may vary from one scenario to another include at least the following: spectral content of at least one source signal (e.g., speech from different voices, noise of different colors), and frequency response of one or more of the microphones. In one particular example as mentioned above, at least two of the scenarios differ with respect to at least one of the microphones (in other words, at least one of the microphones used in one scenario is replaced with another microphone or is not used at all in the other scenario). Such a variation may be desirable to support a solution that is robust over an expected range of changes in the frequency and/or phase response of a microphone and/or is robust to failure of a microphone.

In another particular example, at least two of the scenarios include background noise and differ with respect to the signature of the background noise (i.e., the statistics of the noise over frequency and/or time). In such case, the interference sources may be configured to emit noise of one color (e.g., white, pink, or Hoth) or type (e.g., a reproduction of street noise, babble noise, or car noise) in one of the P scenarios and to emit noise of another color or type in another of the P scenarios (for example, babble noise in one scenario, and street and/or car noise in another scenario).

At least two of the P scenarios may include information sources producing signals having substantially different spectral content. In a speech application, for example, the information signals in two different scenarios may be different voices, such as two voices that have average pitches (i.e., over the length of the scenario) which differ from each other by not less than ten percent, twenty percent, thirty percent, or even fifty percent. Another feature that may vary from one scenario to another is the output amplitude of a source relative to that of the other source or sources. Another feature that may vary from one scenario to another is the gain sensitivity of a microphone relative to that of the other microphone or microphones.

As described below, the set of K-channel training signals is used in task T30 to obtain converged sets of filter coefficient values. The duration of each of the training signals may be selected based on an expected convergence rate of the training operation. For example, it may be desirable to select a duration for each training signal that is long enough to permit significant progress toward convergence but short enough to allow other training signals to also contribute substantially to the converged solution. In a typical application, each of the training signals lasts from about one-half or one to about five or ten seconds. For a typical training operation, copies of the training signals are concatenated in a random order to obtain a sound file to be used for training. Typical lengths for a training file include 10, 30, 45, 60, 75, 90, 100, and 120 seconds.

In a near-field scenario (e.g., when a communications device is held close to the user's mouth), different amplitude and delay relationships may exist between the microphone outputs than in a far-field scenario (e.g., when the device is held farther from the user's mouth). It may be desirable for the range of P scenarios to include both near-field and far-field scenarios. As noted below, task T30 may be configured to use training signals from the near-field and far-field scenarios to train different filters.

For each of the P acoustic scenarios, the information signal may be provided to the K microphones by reproducing from the user's mouth artificial speech (as described in ITU-T Recommendation P. 50, International Telecommunication Union, Geneva, C H, March 1993) and/or a voice uttering standardized vocabulary such as one or more of the Harvard Sentences (as described in IEEE Recommended Practices for Speech Quality Measurements in IEEE Transactions on Audio and Electroacoustics, vol. 17, pp. 227-46, 1969). In one such example, the speech is reproduced from the mouth loudspeaker of a HATS at a sound pressure level of 89 dB. At least two of the P scenarios may differ from one another with respect to this information signal. For example, different scenarios may use voices having substantially different pitches. Additionally or in the alternative, at least two of the P scenarios may use different instances of the reference device (e.g., to support a converged solution that is robust to variations in response of the different microphones).

In one particular set of applications, the K microphones are microphones of a portable device for wireless communications such as a cellular telephone handset. FIGS. 1A and 1B show two different operating configurations for such a device, and FIGS. 2 to 4B show various different orientation states for these configurations. Two or more such orientation states may be used in different ones of the P scenarios. For example, it may be desirable for one of the K-channel training signals to be based on signals produced by the microphones in one of these two orientations and for another of the K-channel training signals to be based on signals produced by the microphones in the other of these two orientations.

It is also possible to perform separate instances of method M10 for each of the different operating configurations of the device (e.g., to obtain a separate set of converged filter states for each configuration). In such case, apparatus A200 may be configured to select among the various sets of converged filter states (i.e., among different instances of filter bank 100) at runtime. For example, apparatus A200 may be configured to select a set of filter states that corresponds to the state of a switch which indicates whether the device is open or closed.

In another particular set of applications, the K microphones are microphones of a wired or wireless earpiece or other headset. FIG. 9 shows one example 63 of such a headset as described herein. The training scenarios for such a headset may include any combination of the information and/or interference sources as described with reference to the handset applications above. Another difference that may be modeled by different ones of the P training scenarios is the varying angle of the transducer axis with respect to the ear, as indicated in FIG. 9 by headset mounting variability 66. Such variation may occur in practice from one user to another. Such variation may even with respect to the same user over a single period of wearing the device. It will be understood that such variation may adversely affect signal separation performance by changing the direction and distance from the transducer array to the user's mouth. In such case, it may be desirable for one of the plurality of K-channel training signals to be based on a scenario in which the headset is mounted in the ear 65 at an angle at or near one extreme of the expected range of mounting angles, and for another of the K-channel training signals to be based on a scenario in which the headset is mounted in the ear 65 at an angle at or near the other extreme of the expected range of mounting angles. Others of the P scenarios may include one or more orientations corresponding to angles that are intermediate between these extremes.

Figure 39:
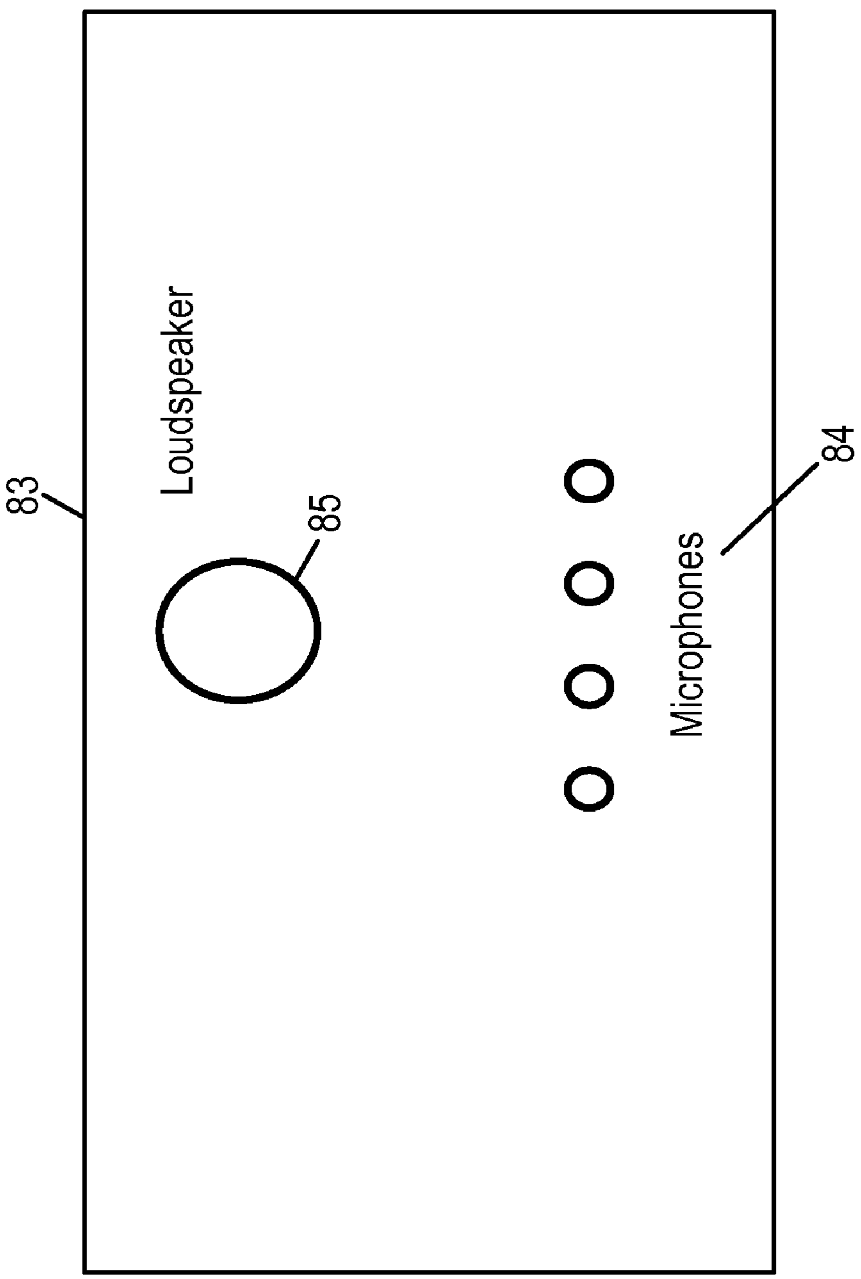
FIG. 39 shows an example of a hands-free car kit 83.
Figure 40:
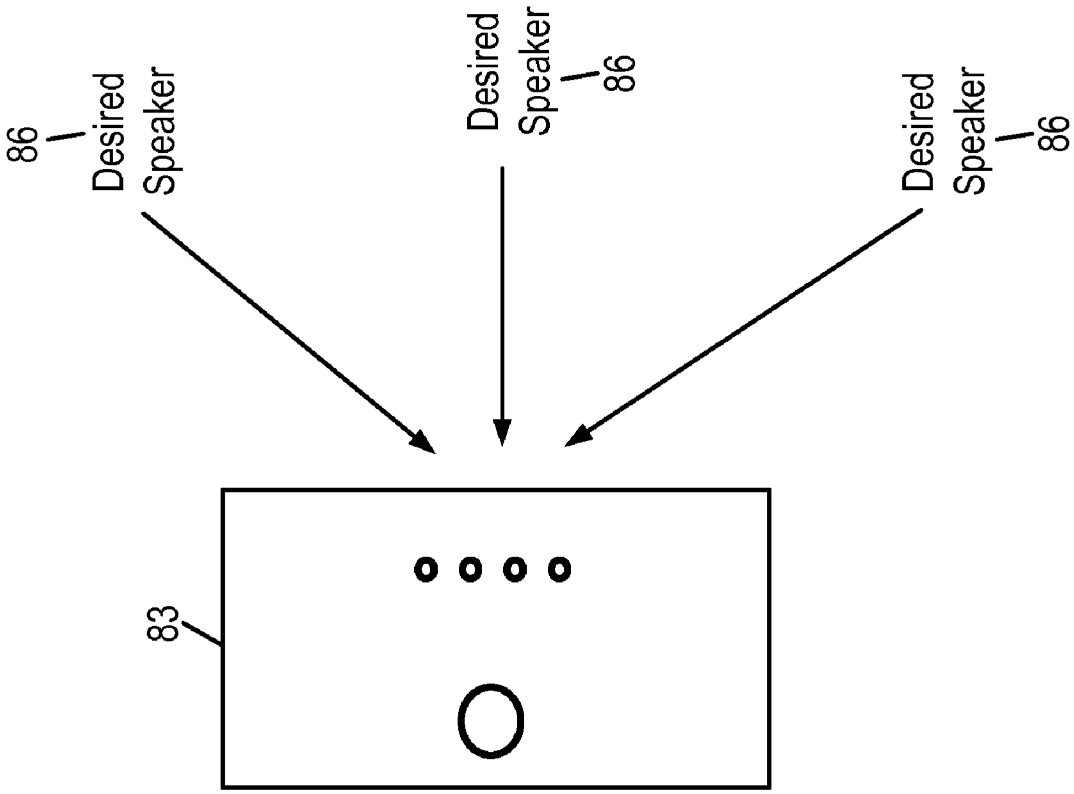
FIG. 40 shows an example of an application of the car kit of FIG. 37.

In a further set of applications, the K microphones are microphones provided in a hands-free car kit. FIG. 39 shows one example of such a communications device 83 in which the loudspeaker 85 is disposed broadside to the microphone array 84. The P acoustic scenarios for such a device may include any combination of the information and/or interference sources as described with reference to the handset applications above. For example, two or more of the P scenarios may differ in the placement of the desired speaker with respect to the microphone array, as shown in FIG. 40. One or more of the P scenarios may also include reproducing an interfering signal from the loudspeaker 85. Different scenarios may include interfering signals reproduced from loudspeaker 85, such as music and/or voices having different signatures in time and/or frequency (e.g., substantially different pitch frequencies). In such case, it may be desirable for method M10 to produce at least one filter state that separates the interfering signal from a desired speech signal. One or more of the P scenarios may also include interference such as a diffuse or directional noise field as described above.

Figure 41:
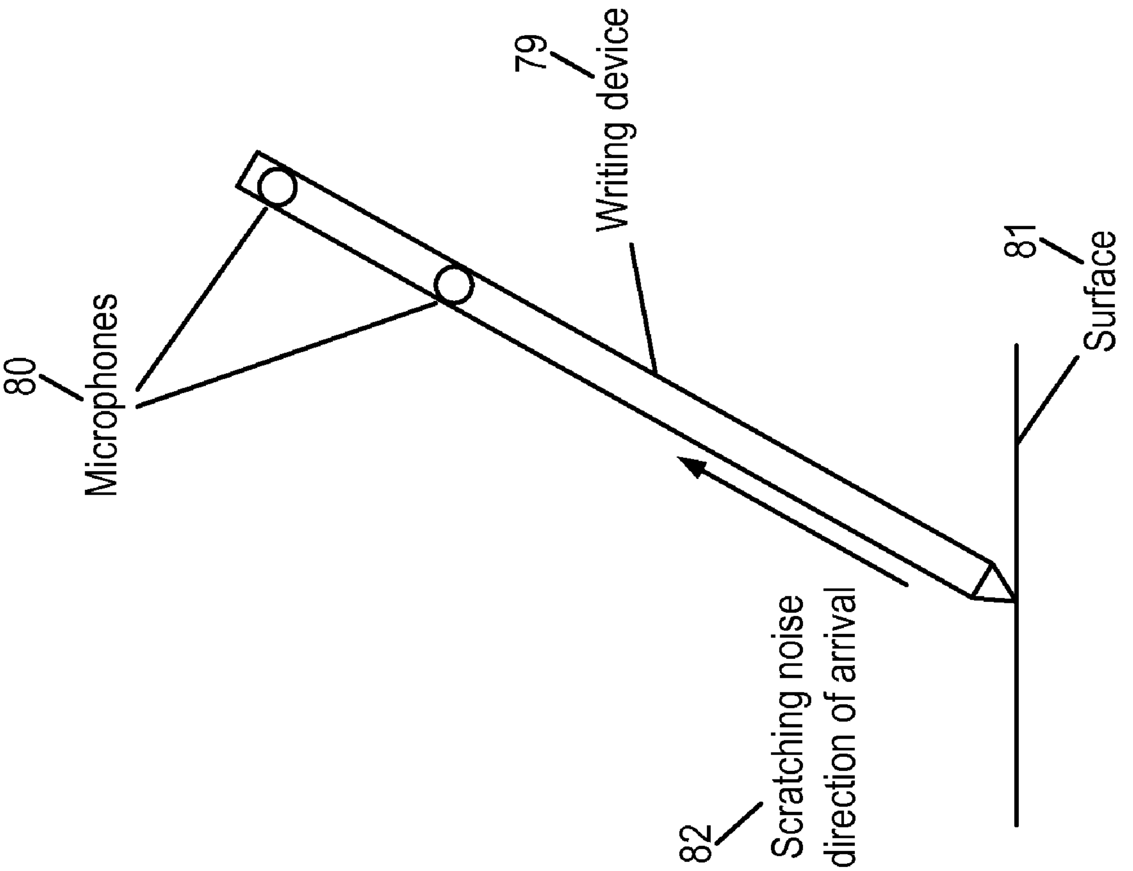
FIG. 41 shows an example of a writing instrument (e.g., a pen) or stylus 79 having a linear array of microphones.

In a further set of applications, the K microphones are microphones provided within a pen, stylus, or other drawing device. FIG. 41 shows one example of such a device 79 in which the microphones 80 are disposed in a endfire configuration with respect to scratching noise 82 that arrives from the tip and is caused by contact between the tip and a drawing surface 81. The P scenarios for such a communications device may include any combination of the information and/or interference sources as described with reference to the applications above. Additionally or in the alternative, different scenarios may include drawing the tip of the device 79 across different surfaces to elicit differing instances of scratching noise 82 (e.g., having different signatures in time and/or frequency). As compared to a handset or headset application as discussed above, it may be desirable in such an application for method M10 to produce a set of filter states that separate an interference source (i.e., the scratching noise) rather than an information source (i.e., the user's voice). In such case, the separated interference may be removed from a desired signal in a later processing stage (e.g., applied as a noise reference as described herein).

The spatial separation characteristics of the set of converged filter solutions produced by method M10 (e.g., the shapes and orientations of the various beam patterns) are likely to be sensitive to the relative characteristics of the microphones used in task T10 to acquire the training signals. It may be desirable to calibrate at least the gains of the K microphones of the reference device relative to one another before using the device to record the set of training signals. It may also be desirable during and/or after production to calibrate at least the gains of the microphones of each production device relative to one another.

Figure 42:
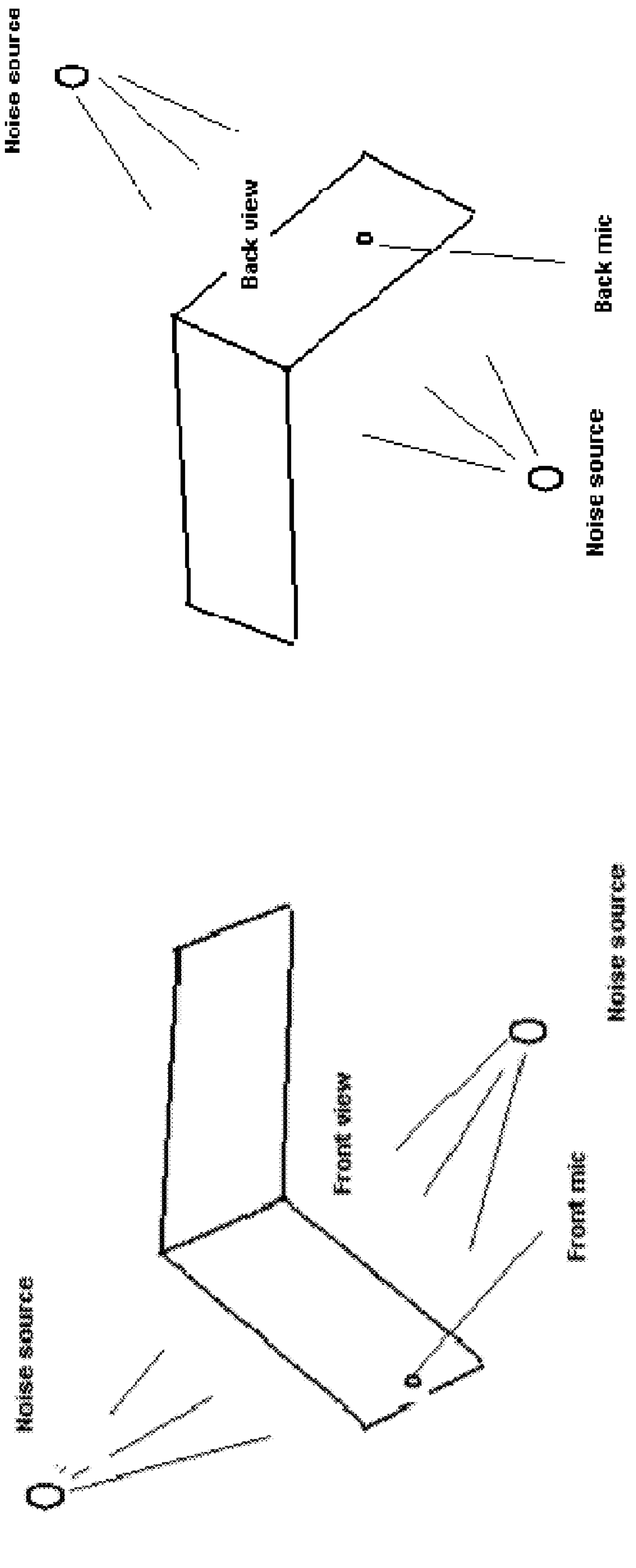
FIG. 42 shows a handset placed into a two-point source noise field during a design phase.

Even if an individual microphone element is acoustically well characterized, differences in factors such as the manner in which the element is mounted to the communications device and the qualities of the acoustic port may cause similar microphone elements to have significantly different frequency and gain response patterns in actual use. Therefore it may be desirable to perform such a calibration of the microphone array after it has been installed in the communications device Calibration of the array of microphones may be performed within a special noise field, with the communications device being oriented in a particular manner within that noise field. FIG. 42 shows an example of a two-microphone handset placed into a two-point-source noise field such that both microphones (each of which may be omni- or unidirectional) are equally exposed to the same SPL levels. Examples of other calibration enclosures and procedures that may be used to perform factory calibration of production devices (e.g., handsets) are described in U.S. Pat. Appl. No. 61/077,144, filed Jun. 30, 2008, entitled "SYSTEMS, METHODS, AND APPARATUS FOR CALIBRATION OF MULTI-MICROPHONE DEVICES," which document is hereby incorporated by reference for purposes limited to the calibration of multi-microphone devices. Matching the frequency response and gains of the microphones of the reference device may help to correct for fluctuations in acoustic cavity and/or microphone sensitivity during production, and it may also be desirable to calibrate the microphones of each production device.

It may be desirable to ensure that the microphones of the production device and the microphones of the reference device are properly calibrated using the same procedure. Alternatively, a different acoustic calibration procedure may be used during production. For example, it may be desirable to calibrate the reference device in a room-sized anechoic chamber using a laboratory procedure, and to calibrate each production device in a portable chamber (e.g., as described in U.S. Pat. Appl. No. 61/077,144 as incorporated above) on the factory floor. For a case in which performing an acoustic calibration procedure during production is not feasible, it may be desirable to configure a production device to perform an automatic gain matching procedure. Examples of such a procedure are described in U.S. Provisional Pat. Appl. No. 61/058,132, filed Jun. 2, 2008, entitled "SYSTEM AND METHOD FOR AUTOMATIC GAIN MATCHING OF A PAIR OF MICROPHONES," which document is hereby incorporated by reference for purposes limited to description of techniques and/or implementations of microphone calibration.

The characteristics of the microphones of the production device may drift over time. Alternatively or additionally, the array configuration of such a device may change mechanically over time. Consequently, it may be desirable to include a calibration routine within the communications device that is configured to match one or more microphone frequency properties and/or sensitivities (e.g., a ratio between the microphone gains) during service on a periodic basis or upon some other event (e.g., a user selection). Examples of such a procedure are described in U.S. Provisional Pat. Appl. No. 61/058,132 as incorporated above.

One or more of the P scenarios may include driving one or more loudspeakers of the communications device (e.g., by artificial speech and/or a voice uttering standardized vocabulary) to provide a directional interference source. Including one or more such scenarios may help to support robustness of the resulting converged filter solutions to interference from a far-end audio signal. It may be desirable in such case for the loudspeaker or loudspeakers of the reference device to be the same model or models, and to be mounted in the same manner and in the same locations, as those of the production devices. For an operating configuration as shown in FIG. 1A, such a scenario may include driving primary speaker SP10, while for an operating configuration as shown in FIG. 1B, such a scenario may include driving secondary speaker SP20. A scenario may include such an interference source in addition to, or in the alternative to, a diffuse noise field created, for example, by an array of interference sources as shown in FIG. 38.

Alternatively or additionally, an instance of method M10 may be performed to obtain one or more converged filter sets for an echo canceller EC10 as described above. For a case in which the echo canceller is upstream of filter bank 100, the trained filters of the echo canceller may be used during recording of the training signals for filter bank 100. For a case in which the echo canceller is downstream of filter bank 100, the trained filters of filter bank 100 may be used during recording of the training signals for the echo canceller.

While a HATS located within an anechoic chamber is described as a suitable test device for recording the training signals in task T11, any other humanoid simulator or a human speaker can be substituted for a desired speech generating source. It may be desirable in such case to use at least some amount of background noise (e.g., to better condition the filter coefficient matrices over the desired range of audio frequencies). It is also possible to perform testing on the production device prior to use and/or during use of the device. For example, the testing can be personalized based on the features of the user of the communications device, such as typical distance of the microphones to the mouth, and/or based on the expected usage environment. A series of preset "questions" can be designed for user response, for example, which may help to condition the system to particular features, traits, environments, uses, etc.

Task T20 classifies each of the set of training signals to obtain Q subsets of training signals, where Q is an integer equal to the number of filters to be trained in task T30. The classification may be performed based on all K channels of each training signal, or the classification may be limited to fewer than all of the K channels of each training signal. For a case in which K is greater than M, for example, it may be desirable for the classification to be limited to the same set of M channels for each training signal (that is to say, only those channels that originated from a particular set of M microphones of the array that was used to record the training signals).

The classification criteria may include a priori knowledge and/or heuristics. In one such example, task T20 assigns each training signal to a particular subset based on the scenario under which it was recorded. It may be desirable for task T20 to classify training signals from near-field scenarios into one or more different subsets than training signals from far-field scenarios. In another example, task T20 assigns a training signal to a particular subset based on the relative energies of two or more channels of the training signal.

Alternatively or additionally, the classification criteria may include results obtained by using one or more spatial separation filters to spatially process the training signals. Such a filter or filters may be configured according to a corresponding one or more converged filter states produced by a prior iteration of task T30. Alternatively or additionally, one or more such filters may be configured according to a beamforming or combined BSS/beamforming method as described herein. It may be desirable, for example, for task T20 to classify each training signal based upon which of Q spatial separation filters is found to produce the best separation of the speech and noise components of the signal (e.g., according to criteria as discussed above with reference to FIGS. 14A-D).

If task T20 is unable to classify all of the training signals into Q subsets, it may be desirable to increase the value of Q. Alternatively, it may be desirable to repeat recording task T10 for a different microphone placement to obtain a new set of training signals, to alter one or more of the classification criteria, and/or to select a different set of M channels of each training signal, before performing another iteration of classification task T20. Task T20 may be performed within the reference device but is typically performed outside the communications device, using a personal computer or workstation.

Task T30 uses each of the Q training subsets to train a corresponding adaptive filter structure (i.e., to calculate a corresponding converged filter solution) according to a respective source separation algorithm. Each of the Q filter structures may include feedforward and/or feedback coefficients and may be a finite-impulse-response (FIR) or infinite-impulse-response (IIR) design. Examples of such filter structures are described in U.S. patent application Ser. No. 12/197,924 as incorporated above. Task T30 may be performed within the reference device but is typically performed outside the communications device, using a personal computer or workstation.

The term "source separation algorithms" includes blind source separation algorithms, such as independent component analysis (ICA) and related methods such as independent vector analysis (IVA). Blind source separation (BSS) algorithms are methods of separating individual source signals (which may include signals from one or more information sources and one or more interference sources) based only on mixtures of the source signals. The term "blind" refers to the fact that the reference signal or signal of interest is not available, and such methods commonly include assumptions regarding the statistics of one or more of the information and/or interference signals. In speech applications, for example, the speech signal of interest is commonly assumed to have a supergaussian distribution (e.g., a high kurtosis).

A typical source separation algorithm is configured to process a set of mixed signals to produce a set of separated channels that include (A) a combination channel having both signal and noise and (B) at least one noise-dominant channel. The combination channel may also have an increased signal-to-noise ratio (SNR) as compared to the input channel. It may be desirable for task T30 to produce a converged filter structure that is configured to filter an input signal having a directional component such that in the resulting output signal, the energy of the directional component is concentrated into one of the output channels.

The class of BSS algorithms includes multivariate blind deconvolution algorithms. Source separation algorithms also include variants of BSS algorithms, such as ICA and IVA, that are constrained according to other a priori information, such as a known direction of each of one or more of the source signals with respect to, e.g., an axis of the microphone array. Such algorithms may be distinguished from beamformers that apply fixed, non-adaptive solutions based only on directional information and not on observed signals.

As noted herein, each of the spatial separation filters of filter bank 100 and/or of adaptive filter 450 may be constructed using a BSS, beamforming, or combined BSS/beamforming method. A BSS method may include an implementation of at least one of ICA, IVA, constrained ICA, or constrained IVA. Independent component analysis is a technique for separating mixed source signals (components) which are presumably independent from each other. In its simplified form, independent component analysis operates an "un-mixing" matrix of weights on the mixed signals, for example multiplying the matrix with the mixed signals, to produce separated signals. The weights are assigned initial values, and then adjusted to maximize joint entropy of the signals in order to minimize information redundancy. This weight-adjusting and entropy-increasing process is repeated until the information redundancy of the signals is reduced to a minimum. Methods such as ICA provide relatively accurate and flexible means for the separation of speech signals from noise sources. Independent vector analysis ("IVA") is a related technique, wherein the source signal is a vector source signal instead of a single variable source signal. Because these techniques do not require information on the source of each signal, they are known as "blind source separation" methods. Blind source separation problems refer to the idea of separating mixed signals that come from multiple independent sources.

Figure 43A:
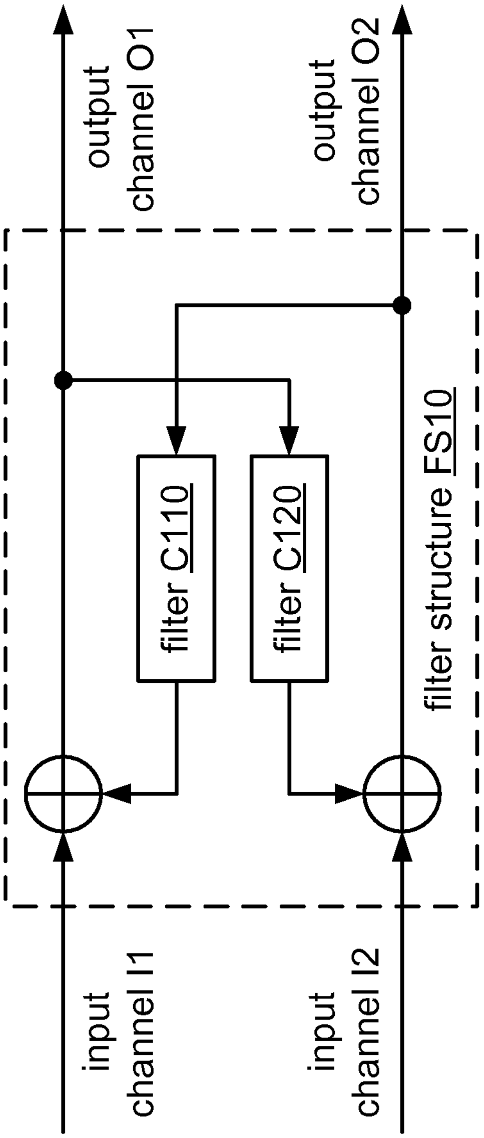
FIG. 43A shows a block diagram of an adaptive filter structure FS10 that includes a pair of feedback filters C110 and C120.
Figure 43B:
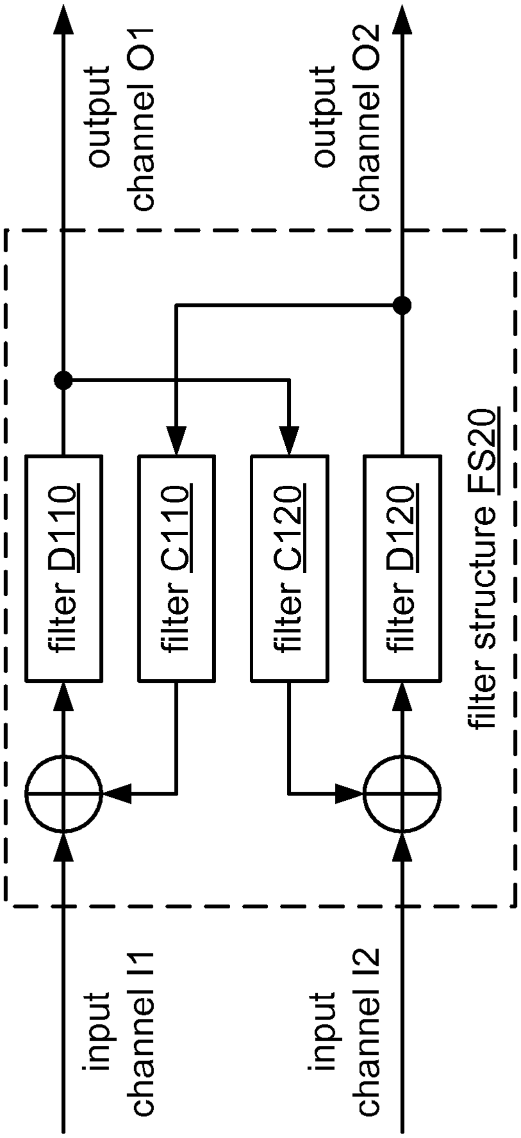
FIG. 43B shows a block diagram of an implementation FS20 of filter structure FS10 that includes direct filters D110 and D120.

Each of the Q spatial separation filters (e.g., of filter bank 100 or of adaptive filter 450) is based on a corresponding adaptive filter structure, whose coefficient values are calculated by task T30 using a learning rule derived from a source separation algorithm. FIG. 43A shows a block diagram of a two-channel example of an adaptive filter structure FS10 that includes two feedback filters C110 and C120, and FIG. 43B shows a block diagram of an implementation FS20 of filter structure FS10 that also includes two direct filters D10 and D120. The learning rule used by task T30 to train such a structure may be designed to maximize information between the filter's output channels (e.g., to maximize the amount of information contained by at least one of the filter's output channels). Such a criterion may also be restated as maximizing the statistical independence of the output channels, or minimizing mutual information among the output channels, or maximizing entropy at the output. Particular examples of the different learning rules that may be used include maximum information (also known as infomax), maximum likelihood, and maximum nongaussianity (e.g., maximum kurtosis). Further examples of such adaptive structures, and learning rules that are based on ICA or IVA adaptive feedback and feedforward schemes, are described in U.S. Publ. Pat. Appl. No. 2006/0053002 A1, entitled "System and Method for Speech Processing using Independent Component Analysis under Stability Constraints", published Mar. 9, 2006; U.S. Prov. App. No. 60/777,920, entitled "System and Method for Improved Signal Separation using a Blind Signal Source Process," filed Mar. 1, 2006; U.S. Prov. App. No. 60/777,900, entitled "System and Method for Generating a Separated Signal," filed Mar. 1, 2006; and Int'l Pat. Publ. WO 2007/100330 A1 (Kim et al.), entitled "Systems and Methods for Blind Source Signal Separation." Additional description of adaptive filter structures, and learning rules that may be used in task T30 to train such filter structures, may be found in U.S. patent application Ser. No. 12/197,924 as incorporated by reference above.

One or more (possibly all) of the Q filters may be based on the same adaptive structure, with each such filter being trained according to a different learning rule. Alternatively, all of the Q filters may be based on different adaptive filter structures. One example of a learning rule that may be used to train a feedback structure FS10 as shown in FIG. 43A may be expressed as follows:

$$y_1(t)=x_1(t)+(h_{12}(t)\otimes y_2(t)) \quad (1)$$

$$y_2(t)=x_2(t)+(h_{21}(t)\otimes y_1(t)) \quad (2)$$

$$\Delta h_{12k}=-f(y_1(t))\times y_2(t-k) \quad (3)$$

$$\Delta h_{21k}=-f(y_2(t))\times y_1(t-k) \quad (4)$$

where t denotes a time sample index, $h_{12}$ (t) denotes the coefficient values of filter C110 at time t, $h_{21}(t)$ denotes the coefficient values of filter C120 at time t, the symbol $\otimes$ denotes the time-domain convolution operation, $\Delta h_{12k}$ denotes a change in the k-th coefficient value of filter C110 subsequent to the calculation of output values $y_1(t)$ and $y_2(t)$, and $\Delta h_{21k}$ denotes a change in the k-th coefficient value of filter C120 subsequent to the calculation of output values $y_1(t)$ and $y_2(t)$. It may be desirable to implement the activation function $f$ as a nonlinear bounded function that approximates the cumulative density function of the desired signal. Examples of nonlinear bounded functions that may be used for activation signal $f$ for speech applications include the hyperbolic tangent function, the sigmoid function, and the sign function.

ICA and IVA techniques allow for adaptation of filters to solve very complex scenarios, but it is not always possible or desirable to implement these techniques for signal separation processes that are configured to adapt in real time. First, the convergence time and the number of instructions required for the adaptation may for some applications be prohibitive. While incorporation of a priori training knowledge in the form of good initial conditions may speed up convergence, in some applications, adaptation is not necessary or is only necessary for part of the acoustic scenario. Second, IVA learning rules can converge much slower and get stuck in local minima if the number of input channels is large. Third, the computational cost for online adaptation of IVA may be prohibitive. Finally adaptive filtering may be associated with transients and adaptive gain modulation which may be perceived by users as additional reverberation or detrimental to speech recognition systems mounted downstream of the processing scheme.

Another class of techniques that may be used for linear microphone-array processing is often referred to as "beamforming". Beamforming techniques use the time difference between channels that results from the spatial diversity of the microphones to enhance a component of the signal that arrives from a particular direction. More particularly, it is likely that one of the microphones will be oriented more directly at the desired source (e.g., the user's mouth), whereas the other microphone may generate a signal from this source that is relatively attenuated. These beamforming techniques are methods for spatial filtering that steer a beam towards a sound source, putting a null at the other directions. Beamforming techniques make no assumption on the sound source but assume that the geometry between source and sensors, or the sound signal itself, is known for the purpose of dereverberating the signal or localizing the sound source. One or more of the filters of filter bank 100 may be configured according to a data-dependent or data-independent beamformer design (e.g., a superdirective beamformer, least-squares beamformer, or statistically optimal beamformer design). In the case of a data-independent beamformer design, it may be desirable to shape the beam pattern to cover a desired spatial area (e.g., by tuning the noise correlation matrix).

A well studied technique in robust adaptive beamforming referred to as "Generalized Sidelobe Canceling" (GSC) is discussed in Hoshuyama, O., Sugiyama, A., Hirano, A., A Robust Adaptive Beamformer for Microphone Arrays with a Blocking Matrix using Constrained Adaptive Filters, IEEE Transactions on Signal Processing, vol. 47, No. 10, pp. 2677-2684, October 1999. Generalized sidelobe canceling aims at filtering out a single desired source signal from a set of measurements. A more complete explanation of the GSC principle may be found in, e.g., Griffiths L. J., Jim, C. W., An alternative approach to linear constrained adaptive beamforming, IEEE Transactions on Antennas and Propagation, vol. 30, no. 1, pp. 27-34, January 1982.

For each of the Q training subsets, task T30 trains a respective adaptive filter structure to convergence according to a learning rule. Updating of the filter coefficient values in response to the signals of the training subset may continue until a converged solution is obtained. During this operation, at least some of the signals of the training subset may be submitted as input to the filter structure more than once, possibly in a different order. For example, the training subset may be repeated in a loop until a converged solution is obtained. Convergence may be determined based on the filter coefficient values. For example, it may be decided that the filter has converged when the filter coefficient values no longer change, or when the total change in the filter coefficient values over some time interval is less than (alternatively, not greater than) a threshold value. Convergence may also be monitored by evaluating correlation measures. For a filter structure that includes cross filters, convergence may be determined independently for each cross filter, such that the updating operation for one cross filter may terminate while the updating operation for another cross filter continues. Alternatively, updating of each cross filter may continue until all of the cross filters have converged.

It is possible that a filter will converge to a local minimum in task T30, leading to a failure of that filter in task T40 for one or more (possibly all) of the signals in a corresponding evaluation set. In such case, task T30 may be repeated at least for that filter using different training parameters (e.g., a different learning rate, different geometric constraints, etc.).

Task T40 evaluates the set of Q trained filters produced in task T30 by evaluating the separation performance of each filter. For example, task T40 may be configured to evaluate the responses of the filters to one or more sets of evaluation signals. Such evaluation may be performed automatically and/or by human supervision. Task T40 is typically performed outside the communications device, using a personal computer or workstation.

Task T40 may be configured to obtain responses of each filter to the same set of evaluation signals. This set of evaluation signals may be the same as the training set used in task T30. In one such example, task T40 obtains the response of each filter to each of the training signals. Alternatively, the set of evaluation signals may be a set of M-channel signals that are different from but similar to the signals of the training set (e.g., are recorded using at least part of the same array of microphones and at least some of the same P scenarios).

A different implementation of task T40 is configured to obtain responses of at least two (and possibly all) of the Q trained filters to different respective sets of evaluation signals. The evaluation set for each filter may be the same as the training subset used in task T30. In one such example, task T40 obtains the response of each filter to each of the signals in its respective training subset. Alternatively, each set of evaluation signals may be a set of M-channel signals that are different from but similar to the signals of the corresponding training subset (e.g., recorded using at least part of the same array of microphones and at least one or more of the same scenarios).

Task T40 may be configured to evaluate the filter responses according to the values of one or more metrics. For each filter response, for example, task T40 may be configured to calculate values for each of one or more metrics and to compare the calculated values to respective threshold values.

One example of a metric that may be used to evaluate a filter is a correlation between (A) the original information component of an evaluation signal (e.g., the speech signal that is reproduced from the mouth loudspeaker of the HATS) and (B) at least one channel of the response of the filter to that evaluation signal. Such a metric may indicate how well the converged filter structure separates information from interference. In this case, separation is indicated when the information component is substantially correlated with one of the M channels of the filter response and has little correlation with the other channels.

Other examples of metrics that may be used to evaluate a filter (e.g., to indicate how well the filter separates information from interference) include statistical properties such as variance, Gaussianity, and/or higher-order statistical moments such as kurtosis. Additional examples of metrics that may be used for speech signals include zero crossing rate and burstiness over time (also known as time sparsity). In general, speech signals exhibit a lower zero crossing rate and a lower time sparsity than noise signals. A further example of a metric that may be used to evaluate a filter is the degree to which the actual location of an information or interference source with respect to the array of microphones during recording of an evaluation signal agrees with a beam pattern (or null beam pattern) as indicated by the response of the filter to that evaluation signal. It may be desirable for the metrics used in task T40 to include, or to be limited to, the separation measures used in the corresponding implementation of apparatus A200 (e.g., one or more of the separation measures discussed above with reference to state estimators 402, 404, 406, 408, and 414).

Task T40 may be configured to compare each calculated metric value to a corresponding threshold value. In such case, a filter may be said to produce an adequate separation result for a signal if the calculated value for each metric is above (alternatively, is at least equal to) a respective threshold value. One of ordinary skill will recognize that in such a comparison scheme for multiple metrics, a threshold value for one metric may be reduced when the calculated value for one or more other metrics is high.

Task T40 may be configured to verify that, for each evaluation signal, at least one of the Q trained filters produces an adequate separation result. For example, task T40 may be configured to verify that each of the Q trained filters provides an adequate separation result for each signal in its respective evaluation set.

Alternatively, task T40 may be configured to verify that for each signal in the set of evaluation signals, an appropriate one of the Q trained filters provides the best separation performance among all of the Q trained filters. For example, task T40 may be configured to verify that each of the Q trained filters provides, for all of the signals in its respective set of evaluation signals, the best separation performance among all of the Q trained filters. For a case in which the set of evaluation signals is the same as the set of training signals, task T40 may be configured to verify that for each evaluation signal, the filter that was trained using that signal produces the best separation result.

Task T40 may also be configured to evaluate the filter responses by using state estimator 400 (e.g., the implementation of state estimator 400 to be used in the production devices) to classify them. In one such example, task T40 obtains the response of each of the Q trained filters to each of a set of the training signals. For each of these training signals, the resulting Q filter responses are provided to state estimator 400, which indicates a corresponding orientation state. Task T40 determines whether (or how well) the resulting set of orientation states matches the classifications of the corresponding training signals from task T20.

Task T40 may be configured to change the value of the number of trained filters Q. For example, task T40 may be configured to reduce the value of Q if the number (or proportion) of evaluation signals for which more than one of the Q trained filters produces an adequate separation result is above (alternatively, is at least equal to) a threshold value. Alternatively or additionally, task T40 may be configured to increase the value of Q if the number (or proportion) of evaluation signals for which inadequate separation performance is found is above (alternatively, is at least equal to) a threshold value.

It is possible that task T40 will fail for only some of the evaluation signals, and it may be desirable to keep the corresponding trained filter or filters as being suitable for the plurality of evaluation signals for which task T40 passed. In such case, it may be desirable to repeat method M10 to obtain a solution for the other evaluation signals. Alternatively, the signals for which task T40 failed may be ignored as special cases.

It may be desirable for task T40 to verify that the set of converged filter solutions complies with other performance criteria, such as a send response nominal loudness curve as specified in a standards document such as TIA-810-B (e.g., the version of November 2006, as promulgated by the Telecommunications Industry Association, Arlington, Va.).

Method M10 is typically an iterative design process, and it may be desirable to change and repeat one or more of tasks T10, T20, T30, and T40 until a desired evaluation result is obtained in task T40. For example, an iteration of method M10 may include using new training parameters in task T30, using a new division in task T30, and/or recording new training data in task T10.

It is possible for the reference device to have more microphones than the production devices. For example, the reference device may have an array of K microphones, while each production device has an array of M microphones. It may be desirable to select a microphone placement (or a subset of the K-channel microphone array) so that a minimal number of fixed filter sets can adequately separate training signals from a maximum number of, or at least the most common among, a set of user-device holding patterns. In one such example, task T40 selects a subset of M channels for the next iteration of task T30.

Once a desired evaluation result has been obtained in task T40 for a set of Q trained filters, those filter states may be loaded into the production devices as fixed states of the filters of filter bank 100. As described above, it may also be desirable to perform a procedure to calibrate the gain and/or frequency responses of the microphones in each production device, such as a laboratory, factory, or automatic (e.g., automatic gain matching) calibration procedure.

The Q trained filters produced in method M10 may also be used to filter another set of training signals, also recorded using the reference device, in order to calculate initial conditions for adaptive filter 450 (e.g., for one or more component filters of adaptive filter 450). Examples of such calculation of initial conditions for an adaptive filter are described in U.S. patent application Ser. No. 12/197,924, filed Aug. 25, 2008, entitled "SYSTEMS, METHODS, AND APPARATUS FOR SIGNAL SEPARATION," for example, at paragraphs [00129]-[00135] (beginning with "It may be desirable" and ending with "cancellation in parallel"), which paragraphs are hereby incorporated by reference for purposes limited to description of design, training, and/or implementation of adaptive filters. Such initial conditions may also be loaded into other instances of the same or a similar device during production (e.g., as for the trained filters of filter bank 100). Similarly, an instance of method M10 may be performed to obtain converged filter states for the filters of filter bank 200 described below.

Implementations of apparatus A200 as described above use a single filter bank both for state estimation and for producing output signal S40. It may be desirable to use different filter banks for state estimation and output production. For example, it may be desirable to use less complex filters that execute continuously for the state estimation filter bank, and to use more complex filters that execute only as needed for the output production filter bank. Such an approach may offer better spatial processing performance at a lower power cost in some applications and/or according to some performance criteria. One of ordinary skill will also recognize that such selective activation of filters may also be applied to support the use of the same filter structure as different filters (e.g., by loading different sets of filter coefficient values) at different times.

Figure 44:
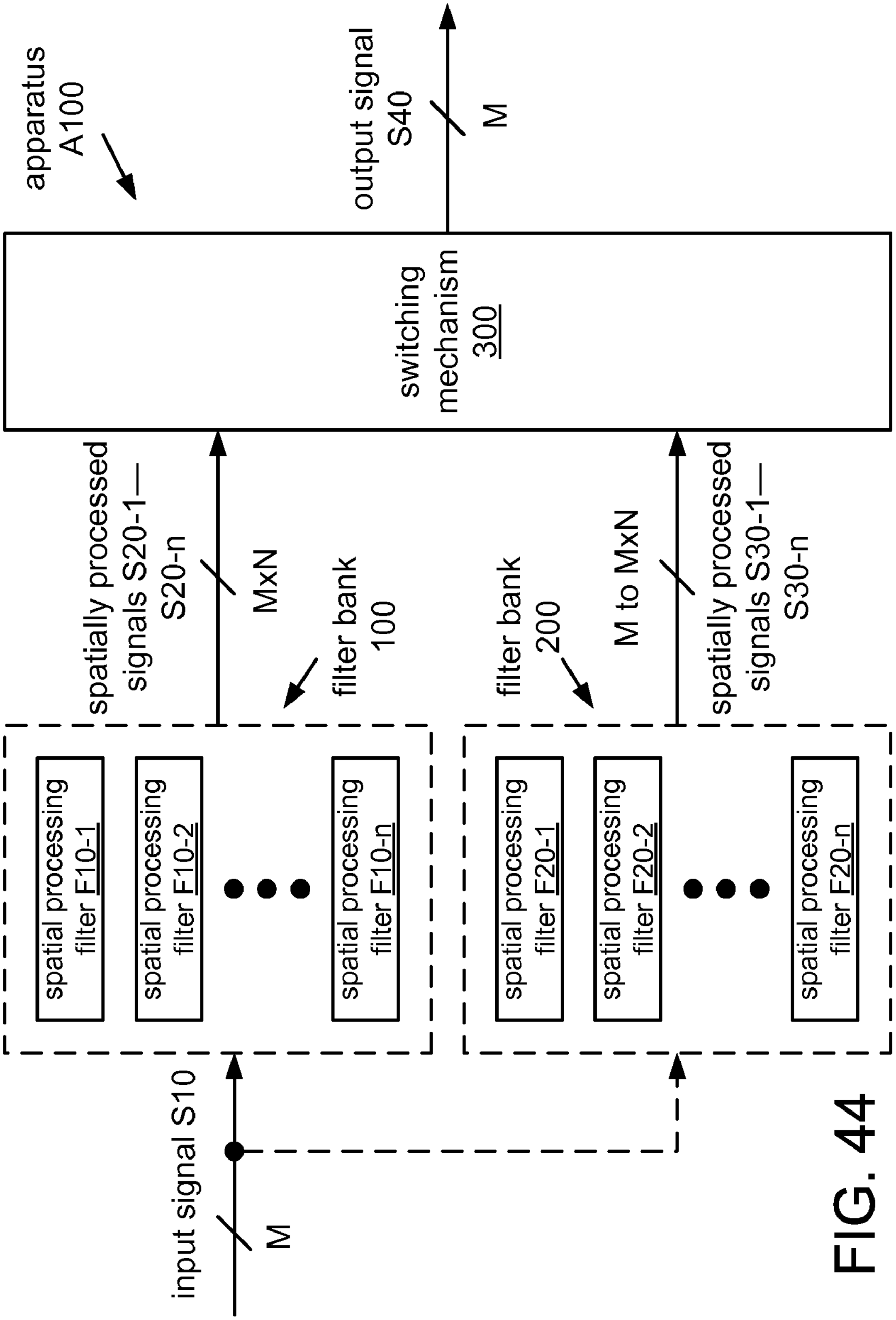
FIG. 44 shows a block diagram for an apparatus A100 according to a general configuration.

FIG. 44 shows a block diagram of an apparatus A100 according to a general configuration that includes a filter bank 100 as described herein (each filter F10-1 to F10-*n* being configured to produce a corresponding one of n M-channel spatially processed signals S20-1 to S20-*n*) and an output production filter bank 200. Each of the filters F20-1 to F20-*n* of filter bank 200 (which may be obtained in conjunction with the filters of filter bank 100 in a design procedure as described above) is arranged to receive and process an M-channel signal that is based on input signal S10 and to produce a corresponding one of M-channel spatially processed signals S30-1 to S30-*n*. Switching mechanism 300 is configured to determine which filter F10-1 to F10-*n* currently best separates a desired component of input signal S10 and a noise component (e.g., as described herein with reference to state estimator 400) and to produce output signal S40 based on at least a corresponding selected one of signals S30-1 to S30-*n* (e.g., as described herein with reference to transition control module 500). Switching mechanism 300 may also be configured to selectively activate individual ones of filters F20-1 to F20-*n* such that, for example, only the filters whose outputs are currently contributing to output signal S40 are currently active. At any one time, therefore, filter bank 200 may be outputting less than n (and possibly only one or two) of the signals S30-1 to S30-*n*.

Figure 45:
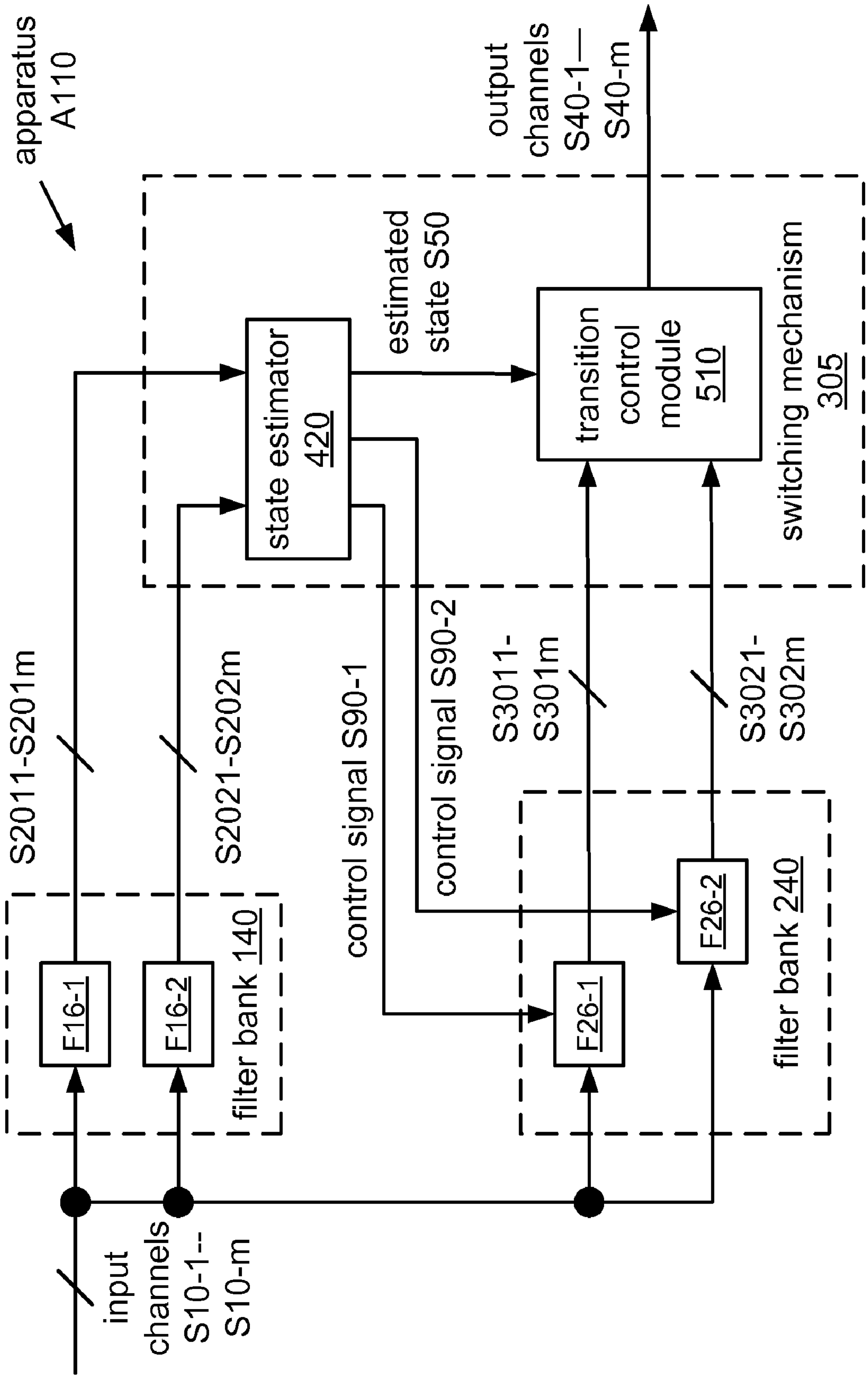
FIG. 45 shows a block diagram of an implementation A110 of apparatus A100.

FIG. 45 shows a block diagram of an implementation A 110 of apparatus A100 that includes a two-filter implementation 140 of filter bank 100 and a two-filter implementation 240 of filter bank 200, such that filter F26-1 of filter bank 240 corresponds to filter F16-1 of filter bank 140 and filter F26-2 of filter bank 240 corresponds to filter F16-2 of filter bank 140. It may be desirable to implement each filter of filter bank 240 as a longer or otherwise more complex version of the corresponding filter of filter bank 140, and it may be desirable for the spatial processing areas (e.g., as shown in the diagrams of FIGS. 5 and 6A-C) of such corresponding filters to coincide at least approximately.

Apparatus A110 also includes an implementation 305 of switching mechanism 300 that has an implementation 420 of state estimator 400 and a two-filter implementation 510 of transition control module 500. In this particular example, state estimator 420 is configured to output a corresponding one of instances S90-1 and S90-2 of control signal S90 to each filter of filter bank 240 to enable the filter only as desired. For example, state estimator 420 may be configured to produce each instance of control signal S90 (which is typically binary-valued) to enable the corresponding filter (A) during periods when estimated state S50 indicates the orientation state corresponding to that filter and (B) during merge intervals when transition control module 510 is configured to transition to or away from the output of that filter. State estimator 420 may therefore be configured to generate each control signal based on information such as the current and previous estimated states, the associated delay and merge intervals, and/or the length of the corresponding filter of filter bank 200.

Figure 46:
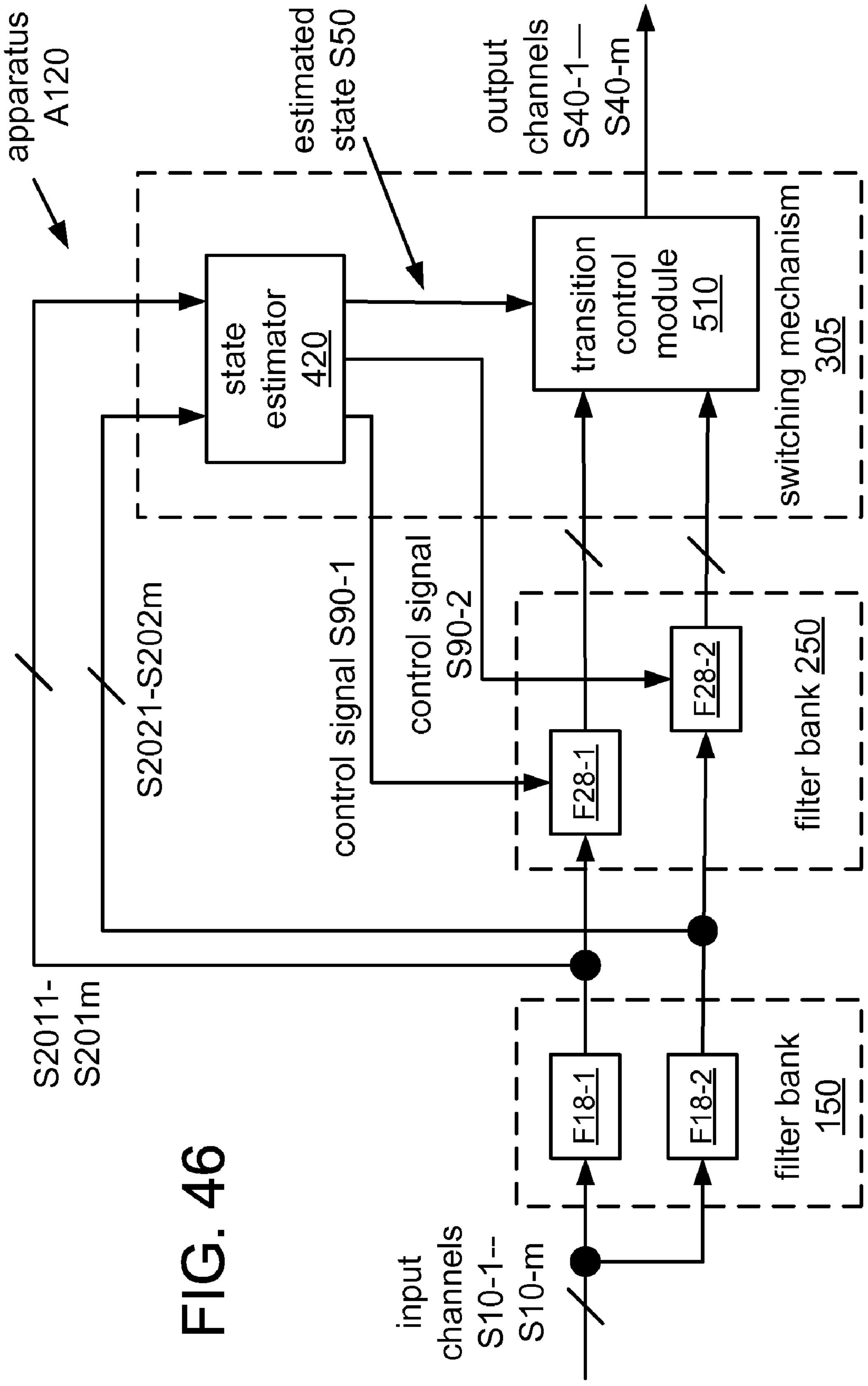
FIG. 46 shows a block diagram of an implementation A120 of apparatus A100.

FIG. 46 shows a block diagram of an implementation A120 of apparatus A100 that includes a two-filter implementation 150 of filter bank 100 and a two-filter implementation 250 of filter bank 200, such that filter F28-1 of filter bank 250 corresponds to filter F18-1 of filter bank 150 and filter F28-2 of filter bank 250 corresponds to filter F18-2 of filter bank 150. In this case, filtering is performed in two stages, with the filters of the second stage (i.e., of filter bank 250) being enabled only as desired (e.g., during selection of that filter and transitions to or away from the output of that filter as described above). The filter banks may also be implemented such that the filters of filter bank 150 are fixed and the filters of filter bank 250 are adaptive. However, it may be desirable to implement the filters of filter bank 250 such that the spatial processing area (e.g., as shown in the diagrams of FIGS. 5 and 6A-C) of each two-stage filter coincides at least approximately with the spatial processing area of the corresponding one of the filters of filter bank 100. One of ordinary skill will recognize that for any context herein in which use of an implementation of apparatus A200 is disclosed, substitution of an analogous implementation of apparatus A100 may be performed, and that all such combinations and arrangements are expressly contemplated and hereby disclosed.

Figure 47:
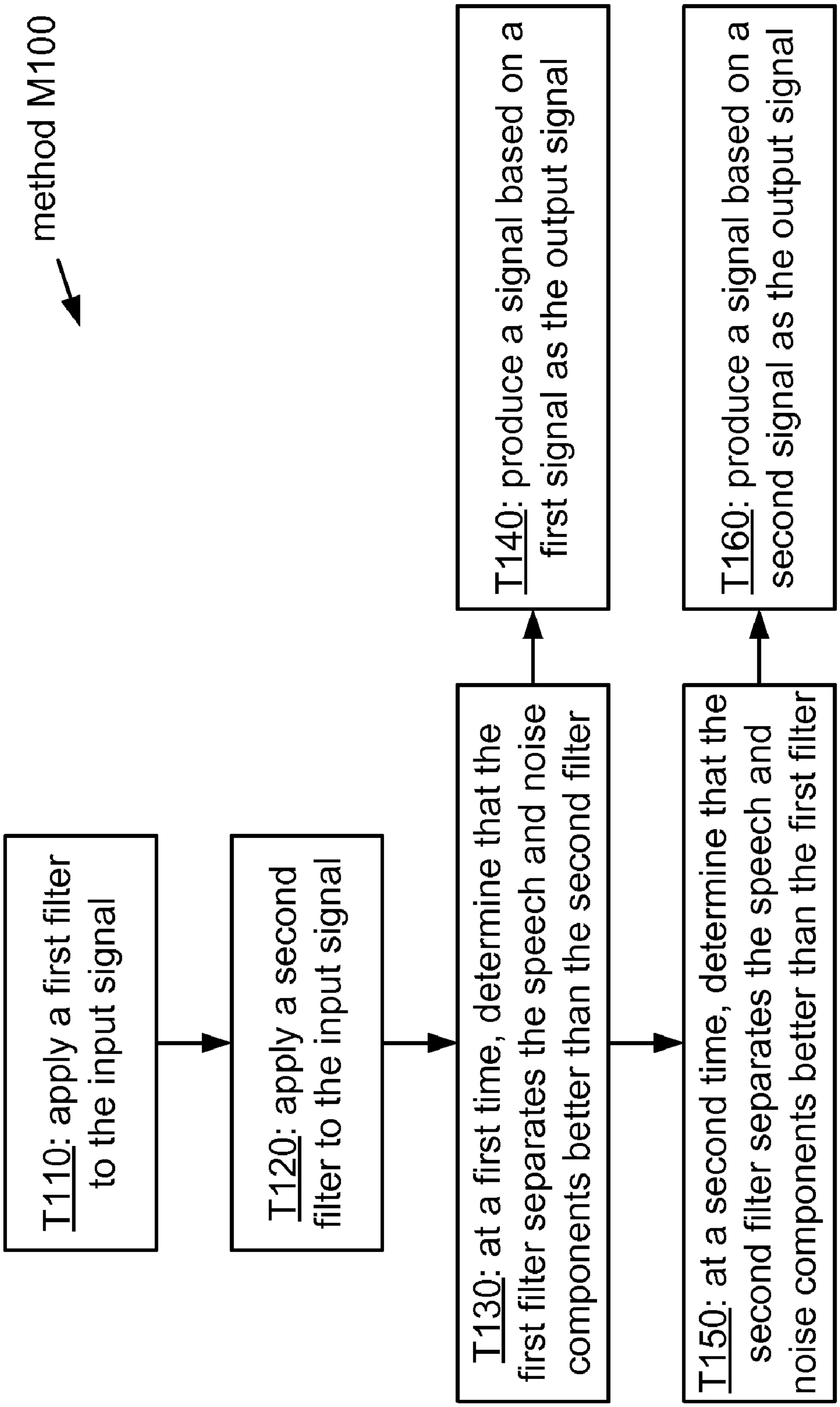
FIG. 47 shows a flowchart for a method M100.

FIG. 47 shows a flowchart of a method M100 of processing an M-channel input signal that includes a speech component and a noise component to produce a spatially filtered output signal. Method M100 includes a task T110 that applies a first spatial processing filter to the input signal, and a task T120 that applies a second spatial processing filter to the input signal. Method M100 also includes tasks T130 and T140. At a first time, task T130 determines that the first spatial processing filter separates the speech and noise components better than the second spatial processing filter. In response to this determination, task T140 produces a signal that is based on a first spatially processed signal as the spatially filtered output signal. Method M100 also includes tasks T150 and T160. At a second time subsequent to the first time, task T150 determines that the second spatial processing filter separates the speech and noise components better than the first spatial processing filter. In response to this determination, task T160 produces a signal that is based on a second spatially processed signal as the spatially filtered output signal. In this method, the first and second spatially processed signals are based on the input signal.

Apparatus A100 as described above may be used to perform an implementation of method M100. In such case, the first and second spatial processing filters applied in tasks T110 and T120 are two different filters of filter bank 100. Switching mechanism 300 may be used to perform tasks T130 and T140 such that the first spatially processed signal is the output of the filter of filter bank 200 that corresponds to the filter of filter bank 100 that was applied in task T110. Switching mechanism 300 may also be used to perform tasks T150 and T160 such that the second spatially processed signal is the output of the filter of filter bank 200 that corresponds to the filter of filter bank 100 that was applied in task T120.

Apparatus A200 as described above may be used to perform an implementation of method M100. In such case, the filter of filter bank 100 that is used in task T110 also produces the first spatially processed signal upon which the output signal in task T140 is based, and the filter of filter bank 100 that is used in task T120 also produces the second spatially processed signal upon which the output signal in task T160 is based.

Figure 48:
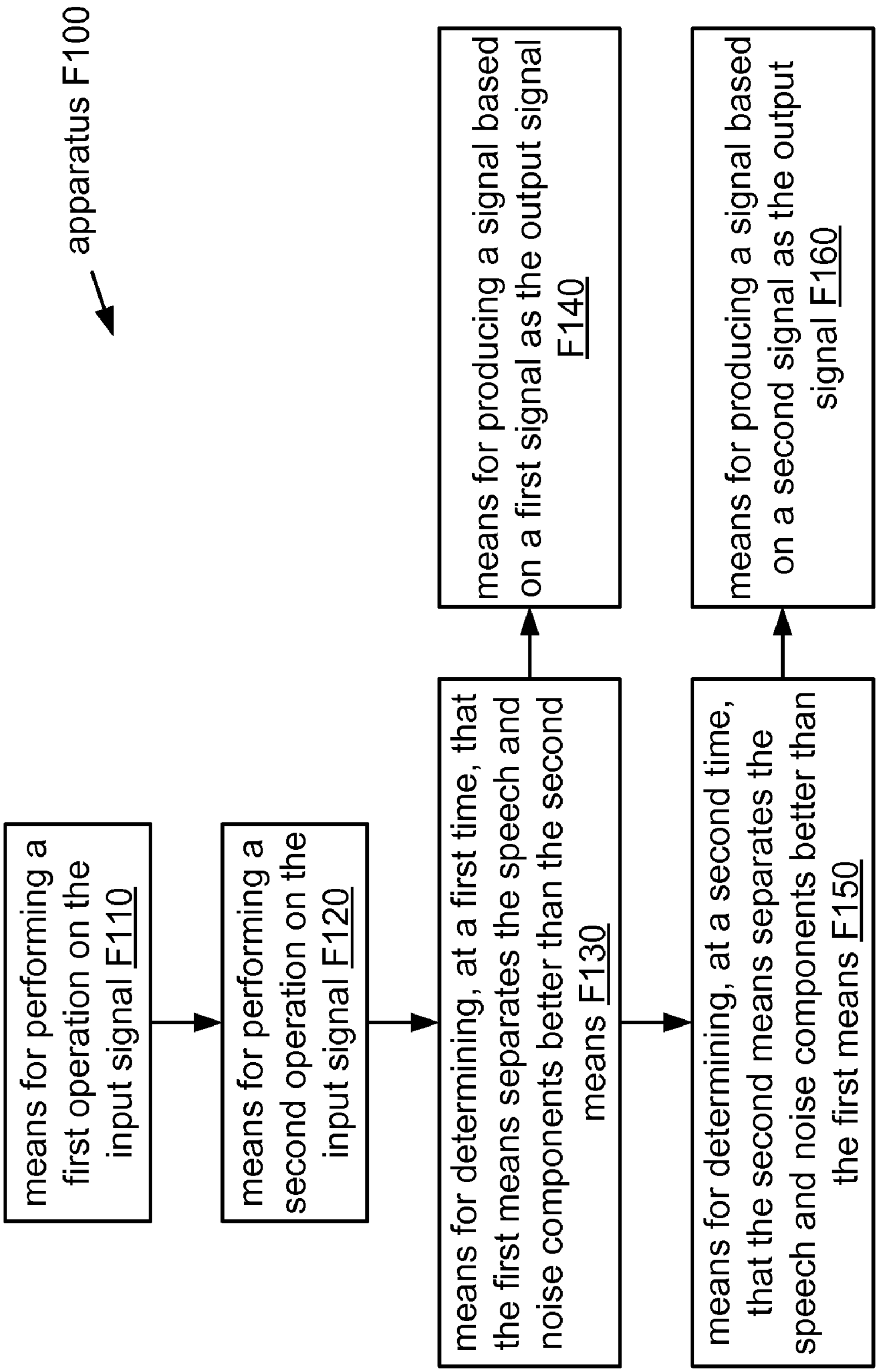
FIG. 48 shows a block diagram for an apparatus F100.

FIG. 48 shows a block diagram of an apparatus F100 for processing an M-channel input signal that includes a speech component and a noise component to produce a spatially filtered output signal. Apparatus F100 includes means F110 for performing a first spatial processing operation on the input signal and means F120 for performing a second spatial processing operation on the input signal (e.g., as described above with reference to filter bank 100 and tasks T110 and T120). Apparatus F100 also includes means F130 for determining, at a first time, that the means for performing a first spatial processing operation separates the speech and noise components better than the means for performing a second spatial processing operation (e.g., as described above with reference to state estimator 400 and task T130), and means F140 for producing, in response to such determination, a signal based on a first spatially processed signal as the output signal (e.g., as described above with reference to transition control module 500 and task T140). Apparatus F100 also includes means F150 for determining, at a second time subsequent to the first time, that the means for performing a second spatial processing operation separates the speech and noise components better than the means for performing a first spatial processing operation (e.g., as described above with reference to state estimator 400 and task T150), and means F160 for producing, in response to such determination, a signal based on a second spatially processed signal as the output signal (e.g., as described above with reference to transition control module 500 and task T160).

Figure 49:
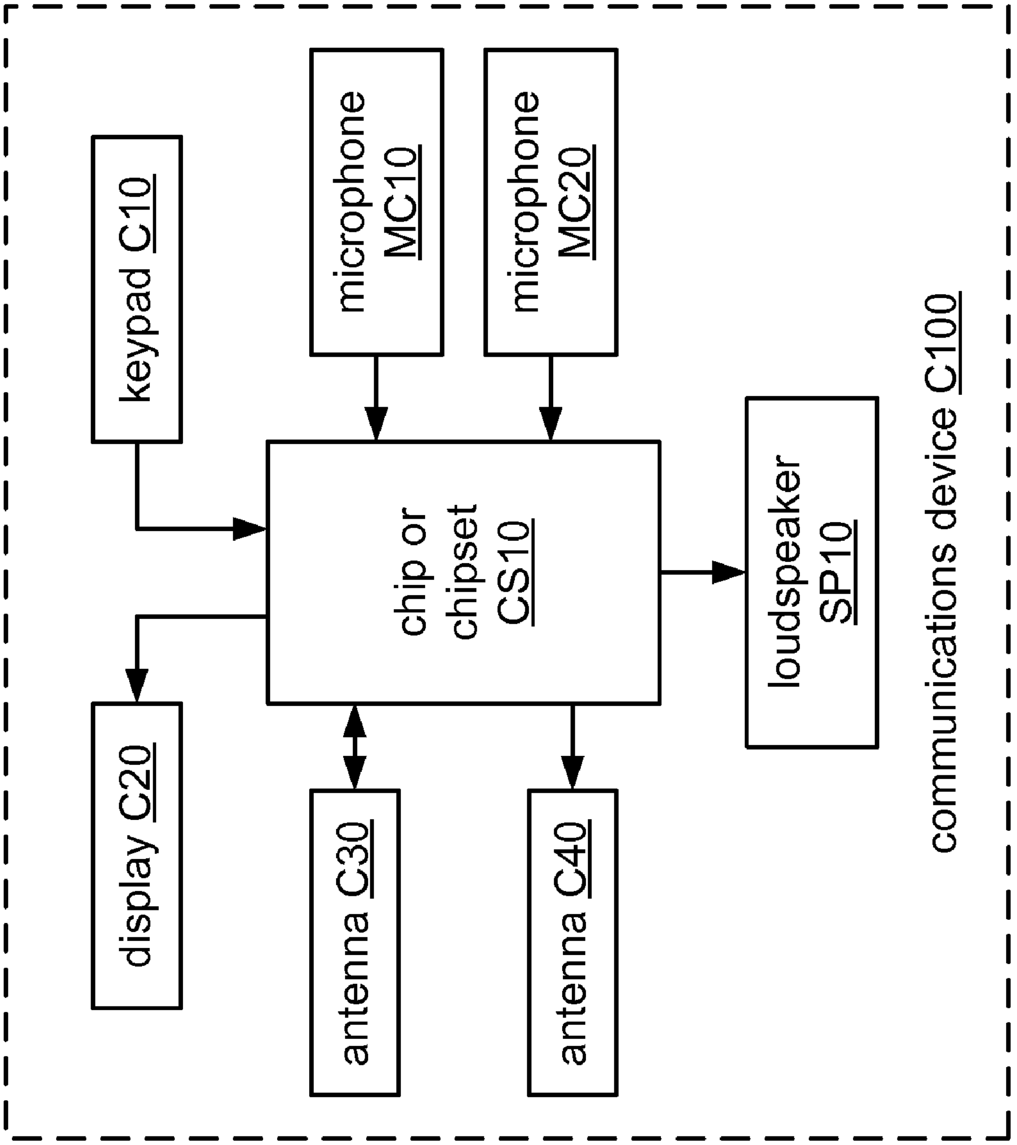
FIG. 49 shows a block diagram of a communications device C100 that includes an implementation of apparatus A100 or A200.

FIG. 49 shows a block diagram of one example of a communications device C100 that may include an implementation of apparatus A100 or A200 as disclosed herein. Device C100 contains a chip or chipset CS10 (e.g., an MSM chipset as described herein) that is configured to receive a radio-frequency (RF) communications signal via antenna C30 and to decode and reproduce an audio signal encoded within the RF signal via loudspeaker SP10. Chip/chipset CS10 is also configured to receive an M-channel audio signal via an array of M microphones (two are shown, MC10 and MC20), to spatially process the M-channel signal using an internal implementation of apparatus A100 or A200, to encode a resulting audio signal, and to transmit an RF communications signal that describes the encoded audio signal via antenna C30. Device C100 may also include a diplexer and one or more power amplifiers in the path to antenna C30. Chip/chipset CS10 is also configured to receive user input via keypad C10 and to display information via display C20. In this example, device C100 also includes one or more antennas C40 to support Global Positioning System (GPS) location services and/or short-range communications with an external device such as a wireless (e.g., Bluetooth™) headset. In another example, such a communications device is itself a Bluetooth headset and lacks keypad C10, display C20, and antenna C30.

The foregoing presentation of the described configurations is provided to enable any person skilled in the art to make or use the methods and other structures disclosed herein. The flowcharts, block diagrams, state diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

The various elements of an implementation of an apparatus as disclosed herein may be embodied in any combination of hardware, software, and/or firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein may also be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

Those of skill will appreciate that the various illustrative logical blocks, modules, circuits, and operations described in connection with the configurations disclosed herein may be implemented as electronic hardware, computer software, or combinations of both. Such logical blocks, modules, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein (e.g., by virtue of the descriptions of the operation of the various implementations of apparatus as disclosed herein) may be performed by a array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor readable medium or transmitted by a computer data signal embodied in a carrier wave over a transmission medium or communication link.

The implementations of methods, schemes, and techniques disclosed herein may also be tangibly embodied (for example, in one or more computer-readable media as listed herein) as one or more sets of instructions readable and/or executable by a machine including an array of logic elements (e.g., a processor, microprocessor, microcontroller, or other finite state machine). The term "computer-readable medium" may include any medium that can store or transfer information, including volatile, nonvolatile, removable and non-removable media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk, a fiber optic medium, a radio frequency (RF) link, or any other medium which can be used to store the desired information and which can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive encoded frames.

It is expressly disclosed that the various methods disclosed herein may be performed by a portable communications device such as a handset, headset, or portable digital assistant (PDA), and that the various apparatus described herein may be included with such a device. A typical real-time (e.g., online) application is a telephone conversation conducted using such a mobile device.

In one or more exemplary embodiments, the functions described may be implemented in hardware, software, firmware, or any combination thereof. If implemented in software, the functions may be stored on or transmitted over a computer-readable medium as one or more instructions or code. The term "computer-readable media" includes both computer storage media and communication media, including any medium that facilitates transfer of a computer program from one place to another. A storage media may be any available media that can be accessed by a computer. By way of example, and not limitation, such computer-readable media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An acoustic signal processing apparatus as described herein may be incorporated into an electronic device that accepts speech input in order to control certain functions, or may otherwise benefit from separation of desired noises from background noises, such as communication devices. Many applications may benefit from enhancing or separating clear desired sound from background sounds originating from multiple directions. Such applications may include human-machine interfaces in electronic or computational devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times). For example, VADs 20-1, 20-2, and/or 70 may be implemented to include the same structure at different times. In another example, one or more spatial separation filters of an implementation of filter bank 100 and/or filter bank 200 may be implemented to include the same structure at different times (e.g., using different sets of filter coefficient values at different times).

What is claimed is:

1. A method of processing an M-channel input signal that includes a speech component and a noise component, M being an integer greater than one, to produce a spatially filtered output signal, said method comprising:

applying a first spatial processing filter to the input signal;

applying a second spatial processing filter to the input signal;

at a first time, determining that the first spatial processing filter begins to separate the speech and noise components better than the second spatial processing filter;

in response to said determining at a first time, producing a signal that is based on a first spatially processed signal as the output signal;

at a second time subsequent to the first time, determining that the second spatial processing filter begins to separate the speech and noise components better than the first spatial processing filter; and in response to said determining at a second time, producing a signal that is based on a second spatially processed signal as the output signal, wherein the first and second spatially processed signals are based on the input signal.

2. The method according to claim 1, wherein a plurality of the coefficient values of at least one of the first and second spatial processing filters is based on a plurality of multichannel training signals that is recorded under a plurality of different acoustic scenarios.

3. The method according to claim 1, wherein a plurality of the coefficient values of at least one of the first and second spatial processing filters is obtained from a converged filter state that is based on a plurality of multichannel training signals, wherein the plurality of multichannel training signals is recorded under a plurality of different acoustic scenarios.

4. The method according to claim 1, wherein a plurality of the coefficient values of the first spatial processing filter is based on a plurality of multichannel training signals that is recorded under a first plurality of different acoustic scenarios, and wherein a plurality of the coefficient values of the second spatial processing filter is based on a plurality of multichannel training signals that is recorded under a second plurality of different acoustic scenarios that is different than the first plurality.

5. The method according to claim 1, wherein said applying the first spatial processing filter to the input signal produces the first spatially processed signal, and wherein said applying the second spatial processing filter to the input signal produces the second spatially processed signal.

6. The method according to claim 5, wherein said producing a signal that is based on a first spatially processed signal as the output signal comprises producing the first spatially processed signal as the output signal, and wherein said producing a signal that is based on a second spatially processed signal as the output signal comprises producing the second spatially processed signal as the output signal.

7. The method according to claim 1, wherein the first spatial processing filter is characterized by a first matrix of coefficient values and the second spatial processing filter is characterized by a second matrix of coefficient values, and wherein the second matrix is at least substantially equal to the result of flipping the first matrix about a central vertical axis.

8. The method according to claim 1, wherein said method comprises determining that the first spatial processing filter continues to separate the speech and noise components better than the second spatial processing filter over a first delay interval immediately following the first time, and wherein said producing a signal that is based on a first spatially processed signal as the output signal begins after the first delay interval.

9. The method according to claim 8, wherein said method comprises determining that the second spatial processing filter continues to separate the speech and noise components better than the first spatial processing filter over a second delay interval immediately following the second time, and wherein said producing a signal that is based on a second spatially processed signal as the output signal occurs after the second delay interval, and wherein the second delay interval is longer than the first delay interval.

10. The method according to claim 1, wherein said producing a signal that is based on a second spatially processed signal as the output signal includes transitioning the output signal, over a first merge interval, from the signal that is based on the first spatially processed signal to a signal that is based on the second spatially processed signal, and wherein said transitioning includes, during the first merge interval, producing a signal that is based on both of the first and second spatially processed signals as the output signal.

11. The method according to claim 1, wherein said method comprises:

applying a third spatial processing filter to the input signal;

at a third time subsequent to the second time, determining that the third spatial processing filter begins to separate the speech and noise components better than the first spatial processing filter and better than the second spatial processing filter; and in response to said determining at a third time, producing a signal that is based on a third spatially processed signal as the output signal, wherein the third spatially processed signal is based on the input signal.

12. The method according to claim 11, wherein said producing a signal that is based on a second spatially processed signal as the output signal includes transitioning the output signal, over a first merge interval, from the signal that is based on the first spatially processed signal to a signal that is based on the second spatially processed signal, and wherein said producing a signal that is based on a third spatially processed signal as the output signal includes transitioning the output signal, over a second merge interval, from the signal that is based on the second spatially processed signal to a signal that is based on the third spatially processed signal, wherein the second merge interval is longer than the first merge interval.

13. The method according to claim 1, wherein said applying a first spatial processing filter to the input signal produces a first filtered signal, and wherein said applying a second spatial processing filter to the input signal produces a second filtered signal, and wherein said determining at a first time includes detecting that an energy difference between a channel of the input signal and a channel of the first filtered signal is greater than an energy difference between the channel of the input signal and a channel of the second filtered signal.

14. The method according to claim 1, wherein said applying a first spatial processing filter to the input signal produces a first filtered signal, and wherein said applying a second spatial processing filter to the input signal produces a second filtered signal, and wherein said determining at a first time includes detecting that the value of a correlation between two channels of the first filtered signal is less than the value of a correlation between two channels of the second filtered signal.

15. The method according to claim 1, wherein said applying a first spatial processing filter to the input signal produces a first filtered signal, and wherein said applying a second spatial processing filter to the input signal produces a second filtered signal, and wherein said determining at a first time includes detecting that an energy difference between channels of the first filtered signal is greater than an energy difference between channels of the second filtered signal.

16. The method according to claim 1, wherein said applying a first spatial processing filter to the input signal produces a first filtered signal, and wherein said applying a second spatial processing filter to the input signal produces a second filtered signal, and wherein said determining at a first time includes detecting that a value of a speech measure for a channel of the first filtered signal is greater than a value of the speech measure for a channel of the second filtered signal.

17. The method according to claim 1, wherein said applying a first spatial processing filter to the input signal produces a first filtered signal, and wherein said applying a second spatial processing filter to the input signal produces a second filtered signal, and wherein said determining at a first time includes calculating a time difference of arrival among two channels of the input signal.

18. The method according to claim 1, wherein said method comprises applying a noise reference based on at least one channel of the output signal to reduce noise in another channel of the output signal.

19. An apparatus for processing an M-channel input signal that includes a speech component and a noise component, M being an integer greater than one, to produce a spatially filtered output signal, said apparatus comprising:

means for performing a first spatial processing operation on the input signal;

means for performing a second spatial processing operation on the input signal;

means for determining, at a first time, that the means for performing a first spatial processing operation begins to separate the speech and noise components better than the means for performing a second spatial processing operation;

means for producing, in response to an indication from said means for determining at a first time, a signal that is based on a first spatially processed signal as the output signal;

means for determining, at a second time subsequent to the first time, that the means for performing a second spatial processing operation begins to separate the speech and noise components better than the means for performing a first spatial processing operation; and means for producing, in response to an indication from said means for determining at a second time, a signal that is based on a second spatially processed signal as the output signal, wherein the first and second spatially processed signals are based on the input signal.

20. The apparatus according to claim 19, wherein a plurality of the coefficient values of at least one among (A) said means for performing a first spatial processing operation and (B) said means for performing a second spatial processing operation is based on a plurality of multichannel training signals that is recorded under a plurality of different acoustic scenarios.

21. The apparatus according to claim 19, wherein said means for performing the first spatial processing operation on the input signal is configured to produce the first spatially processed signal, and wherein said means for performing the second spatial processing operation on the input signal is configured to produce the second spatially processed signal, and wherein said means for producing a signal that is based on a first spatially processed signal as the output signal is configured to produce the first spatially processed signal as the output signal, and wherein said means for producing a signal that is based on a second spatially processed signal as the output signal is configured to produce the second spatially processed signal as the output signal.

22. The apparatus according to claim 19, wherein said apparatus comprises means for determining that the means for performing a first spatial processing operation continues to separate the speech and noise components better than the means for performing a second spatial processing operation over a first delay interval immediately following the first time, and wherein said means for producing the signal that is based on a first spatially processed signal as the output signal is configured to begin to produce said signal after the first delay interval.

23. The apparatus according to claim 19, wherein said means for producing a signal that is based on a second spatially processed signal as the output signal includes means for transitioning the output signal, over a first merge interval, from the signal that is based on the first spatially processed signal to a signal that is based on the second spatially processed signal, and wherein said means for transitioning is configured to produce, during the first merge interval, a signal that is based on both of the first and second spatially processed signals as the output signal.

24. The apparatus according to claim 19, wherein said means for performing a first spatial processing operation on the input signal produces a first filtered signal, and wherein said means for performing a second spatial processing operation on the input signal produces a second filtered signal, and wherein said means for determining at a first time includes means for detecting that an energy difference between a channel of the input signal and a channel of the first filtered signal is greater than an energy difference between the channel of the input signal and a channel of the second filtered signal.

25. The apparatus according to claim 19, wherein said means for performing a first spatial processing operation on the input signal produces a first filtered signal, and wherein said means for performing a second spatial processing operation on the input signal produces a second filtered signal, and wherein said means for determining at a first time includes means for detecting that the value of a correlation between two channels of the first filtered signal is less than the value of a correlation between two channels of the second filtered signal.

26. The apparatus according to claim 19, wherein said means for performing a first spatial processing operation on the input signal produces a first filtered signal, and wherein said means for performing a second spatial processing operation on the input signal produces a second filtered signal, and wherein said means for determining at a first time includes means for detecting that an energy difference between channels of the first filtered signal is greater than an energy difference between channels of the second filtered signal.

27. The apparatus according to claim 19, wherein said means for performing a first spatial processing operation on the input signal produces a first filtered signal, and wherein said means for performing a second spatial processing operation on the input signal produces a second filtered signal, and wherein said means for determining at a first time includes means for detecting that a value of a speech measure for a channel of the first filtered signal is greater than a value of the speech measure for a channel of the second filtered signal.

28. The apparatus according to claim 19, wherein said apparatus comprises an array of microphones configured to produce an M-channel signal upon which the input signal is based.

29. The apparatus according to claim 19, wherein said apparatus comprises means for applying a noise reference based on at least one channel of the output signal to reduce noise in another channel of the output signal.

30. An apparatus for processing an M-channel input signal that includes a speech component and a noise component, M being an integer greater than one, to produce a spatially filtered output signal, said apparatus comprising:

a first spatial processing filter configured to filter the input signal;

a second spatial processing filter configured to filter the input signal;

a state estimator configured to indicate, at a first time, that the first spatial processing filter begins to separate the speech and noise components better than the second spatial processing filter; and a transition control module configured to produce, in response to the indication at a first time, a signal that is based on a first spatially processed signal as the output signal, wherein said state estimator is configured to indicate, at a second time subsequent to the first time, that the second spatial processing filter begins to separate the speech and noise components better than the first spatial processing filter, and wherein said transition control module is configured to produce, in response to the indication at a second time, a signal that is based on a second spatially processed signal as the output signal, and wherein the first and second spatially processed signals are based on the input signal.

31. The apparatus according to claim 30, wherein a plurality of the coefficient values of at least one of the first and second spatial processing filters is obtained from a converged filter state that is based on a plurality of multichannel training signals, wherein the plurality of multichannel training signals is recorded under a plurality of different acoustic scenarios.

32. The apparatus according to claim 30, wherein said first spatial processing filter is configured to produce the first spatially processed signal in response to the input signal, and wherein said second spatial processing filter is configured to produce the second spatially processed signal in response to the input signal, wherein said transition control module is configured to produce a signal that is based on a first spatially processed signal as the output signal by producing the first spatially processed signal as the output signal, and wherein said transition control module is configured to produce a signal that is based on a second spatially processed signal as the output signal by producing the second spatially processed signal as the output signal.

33. The apparatus according to claim 30, wherein said state estimator is configured to determine that the first spatial processing filter continues to separate the speech and noise components better than the second spatial processing filter over a first delay interval immediately following the first time, and wherein said transition control module is configured to produce a signal that is based on the second spatially processed signal as the output signal during the first delay interval, and wherein said transition control module is configured to produce the signal that is based on the first spatially processed signal as the output signal after the first delay interval.

34. The apparatus according to claim 30, wherein said transition control module is configured to produce the signal that is based on a second spatially processed signal as the output signal by transitioning the output signal, over a first merge interval, from the signal that is based on the first spatially processed signal to a signal that is based on the second spatially processed signal, and wherein, during the first merge interval, said transition control module is configured to produce a signal that is based on both of the first and second spatially processed signals as the output signal.

35. The apparatus according to claim 30, wherein said first spatial processing filter is configured to produce a first filtered signal in response to the input signal, and wherein said second spatial processing filter is configured to produce a second filtered signal in response to the input signal, and wherein said state estimator is configured to determine, at the first time, that the first spatial processing filter begins to separate the speech and noise components better than the second spatial processing filter by detecting that an energy difference between a channel of the input signal and a channel of the first filtered signal is greater than an energy difference between the channel of the input signal and a channel of the second filtered signal.

36. The apparatus according to claim 30, wherein said first spatial processing filter is configured to produce a first filtered signal in response to the input signal, and wherein said second spatial processing filter is configured to produce a second filtered signal in response to the input signal, and wherein said state estimator is configured to determine, at the first time, that the first spatial processing filter begins to separate the speech and noise components better than the second spatial processing filter by detecting that the value of a correlation between two channels of the first filtered signal is less than the value of a correlation between two channels of the second filtered signal.

37. The apparatus according to claim 30, wherein said first spatial processing filter is configured to produce a first filtered signal in response to the input signal, and wherein said second spatial processing filter is configured to produce a second filtered signal in response to the input signal, and wherein said state estimator is configured to determine, at the first time, that the first spatial processing filter begins to separate the speech and noise components better than the second spatial processing filter by detecting that an energy difference between channels of the first filtered signal is greater than an energy difference between channels of the second filtered signal.

38. The apparatus according to claim 30, wherein said first spatial processing filter is configured to produce a first filtered signal in response to the input signal, and wherein said second spatial processing filter is configured to produce a second filtered signal in response to the input signal, and wherein said state estimator is configured to determine, at the first time, that the first spatial processing filter begins to separate the speech and noise components better than the second spatial processing filter by detecting that a value of a speech measure for a channel of the first filtered signal is greater than a value of the speech measure for a channel of the second filtered signal.

39. The apparatus according to claim 30, wherein said apparatus comprises an array of microphones configured to produce an M-channel signal upon which the input signal is based.

40. The apparatus according to claim 30, wherein said apparatus comprises a noise reduction filter configured to apply a noise reference based on at least one channel of the output signal to reduce noise in another channel of the output signal.

41. A computer-readable medium comprising instructions which when executed by a processor cause the processor to perform a method of processing an M-channel input signal that includes a speech component and a noise component, M being an integer greater than one, to produce a spatially filtered output signal, said instructions comprising instructions which when executed by a processor cause the processor to:

perform a first spatial processing operation on the input signal;

perform a second spatial processing operation on the input signal;

indicate, at a first time, that the first spatial processing operation begins to separate the speech and noise components better than the second spatial processing operation;

produce, in response to said indication at a first time, a signal that is based on a first spatially processed signal as the output signal;

indicate, at a second time subsequent to the first time, that the second spatial processing operation begins to separate the speech and noise components better than the first spatial processing operation; and produce, in response to said indication at a second time, a signal that is based on a second spatially processed signal as the output signal, wherein the first and second spatially processed signals are based on the input signal.

42. The computer-readable medium according to claim 41, wherein a plurality of the coefficient values of at least one of the first and second spatial processing operations is obtained from a converged filter state that is based on a plurality of multichannel training signals, wherein the plurality of multichannel training signals is recorded under a plurality of different acoustic scenarios.

43. The computer-readable medium according to claim 41, wherein said instructions which when executed by a processor cause the processor to perform the first spatial processing operation on the input signal cause the processor to produce the first spatially processed signal, and wherein said instructions which when executed by a processor cause the processor to perform the second spatial processing operation on the input signal cause the processor to produce the second spatially processed signal, wherein said instructions which when executed by a processor cause the processor to produce a signal that is based on a first spatially processed signal as the output signal cause the processor to produce the first spatially processed signal as the output signal, and wherein said instructions which when executed by a processor cause the processor to produce a signal that is based on a second spatially processed signal as the output signal cause the processor to produce the second spatially processed signal as the output signal.

44. The computer-readable medium according to claim 41, wherein said medium comprises instructions which when executed by a processor cause the processor to determine that the first spatial processing operation continues to separate the speech and noise components better than the second spatial processing operation over a first delay interval immediately following the first time, and wherein said instructions which when executed by a processor cause the processor to produce the signal that is based on a first spatially processed signal as the output signal cause the processor to begin to produce said signal after the first delay interval.

45. The computer-readable medium according to claim 41, wherein said instructions which when executed by a processor cause the processor to produce a signal that is based on a second spatially processed signal as the output signal include instructions which when executed by a processor cause the processor to transition the output signal, over a first merge interval, from the signal that is based on the first spatially processed signal to a signal that is based on the second spatially processed signal, and wherein said instructions which when executed by a processor cause the processor to transition include instructions which when executed by a processor cause the processor to produce, during the first merge interval, a signal that is based on both of the first and second spatially processed signals as the output signal.

46. The computer-readable medium according to claim 41, wherein said instructions which when executed by a processor cause the processor to perform a first spatial processing operation on the input signal cause the processor to produce a first filtered signal, and wherein said instructions which when executed by a processor cause the processor to perform a second spatial processing operation on the input signal cause the processor to produce a second filtered signal, and wherein said instructions which when executed by a processor cause the processor to indicate at a first time include instructions which when executed by a processor cause the processor to detect that an energy difference between a channel of the input signal and a channel of the first filtered signal is greater than an energy difference between the channel of the input signal and a channel of the second filtered signal.

47. The computer-readable medium according to claim 41, wherein said instructions which when executed by a processor cause the processor to perform a first spatial processing operation on the input signal cause the processor to produce a first filtered signal, and wherein said instructions which when executed by a processor cause the processor to perform a second spatial processing operation on the input signal cause the processor to produce a second filtered signal, and wherein said instructions which when executed by a processor cause the processor to indicate at a first time include instructions which when executed by a processor cause the processor to detect that the value of a correlation between two channels of the first filtered signal is less than the value of a correlation between two channels of the second filtered signal.

48. The computer-readable medium according to claim 41, wherein said instructions which when executed by a processor cause the processor to perform a first spatial processing operation on the input signal cause the processor to produce a first filtered signal, and wherein said instructions which when executed by a processor cause the processor to perform a second spatial processing operation on the input signal cause the processor to produce a second filtered signal, and wherein said instructions which when executed by a processor cause the processor to indicate at a first time include instructions which when executed by a processor cause the processor to detect that an energy difference between channels of the first filtered signal is greater than an energy difference between channels of the second filtered signal.

49. The computer-readable medium according to claim 41, wherein said instructions which when executed by a processor cause the processor to perform a first spatial processing operation on the input signal cause the processor to produce a first filtered signal, and wherein said instructions which when executed by a processor cause the processor to perform a second spatial processing operation on the input signal cause the processor to produce a second filtered signal, and wherein said instructions which when executed by a processor cause the processor to indicate at a first time include instructions which when executed by a processor cause the processor to detect that a value of a speech measure for a channel of the first filtered signal is greater than a value of the speech measure for a channel of the second filtered signal.

50. The computer-readable medium according to claim 41, wherein said medium comprises instructions which when executed by a processor cause the processor to apply a noise reference based on at least one channel of the output signal to reduce noise in another channel of the output signal.

* * * * *